United States Patent [19]
Lennen

[11] Patent Number: 5,541,606
[45] Date of Patent: Jul. 30, 1996

[54] W-CODE ENHANCED CROSS CORRELATION SATELLITE POSITIONING SYSTEM RECEIVER

[75] Inventor: Gary Lennen, San Jose, Calif.

[73] Assignee: Trimble Navigation Limited, Sunnyvale, Calif.

[21] Appl. No.: 382,889

[22] Filed: Feb. 2, 1995

[51] Int. Cl.⁶ ...................................................... G01S 5/02
[52] U.S. Cl. ............................................ 342/357; 342/352
[58] Field of Search .................................... 342/357, 352; 455/81

[56] References Cited

U.S. PATENT DOCUMENTS 4,485,383  11/1984  Maher ........................................ 343/352
4,928,106   5/1990  Ashjavee et al. ......................... 342/352
5,390,207   2/1995  Fenton et al. ................................ 375/1

*Primary Examiner*—Thomas H. Tarcza
*Assistant Examiner*—Dao L. Phan
*Attorney, Agent, or Firm*—Boris G. Tankhilevich

[57] ABSTRACT

The present invention relates to the new W code enhanced GPS receiver which allows to receive and demodulate the L1 and L2 satellite signals encrypted with the unknown Y code. No assumptions are made about the timing or the structure of the unknown Y code. The signal-to noise ration is not compromised in comparison with the reception of the L1 and L2 signals without code encryption.

69 Claims, 19 Drawing Sheets

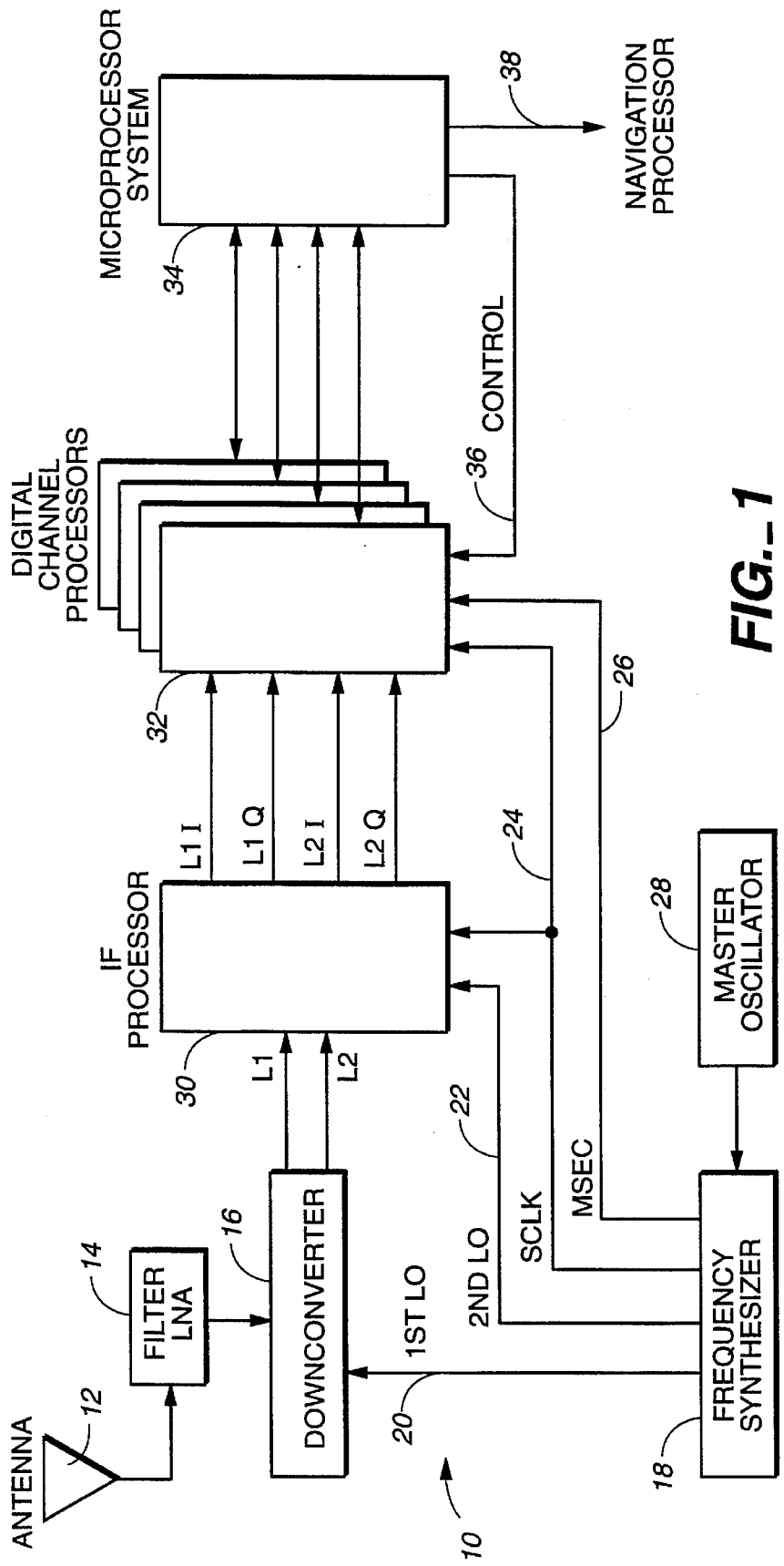
FIG._1

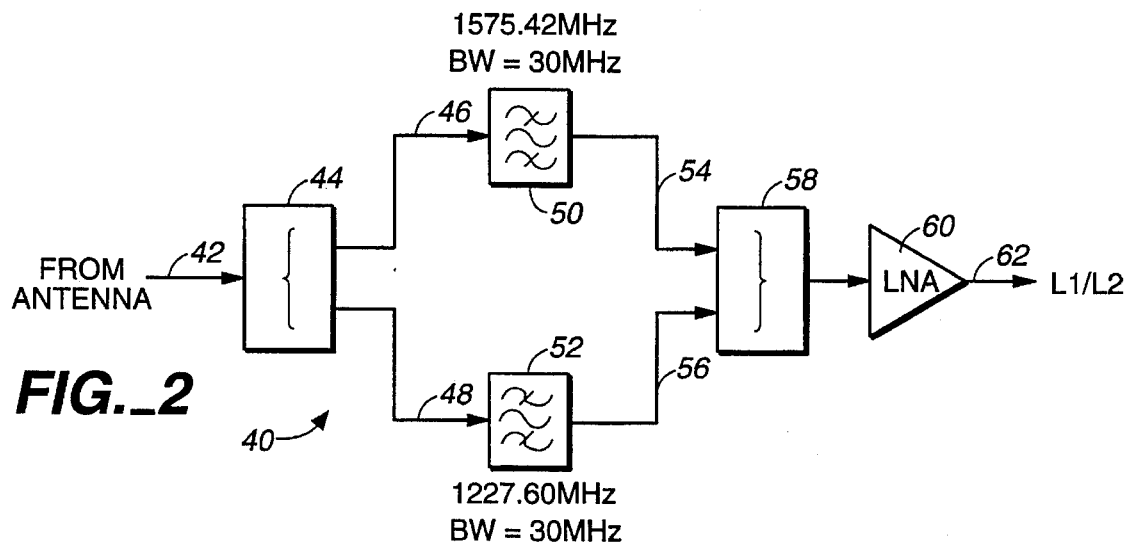
FIG._2
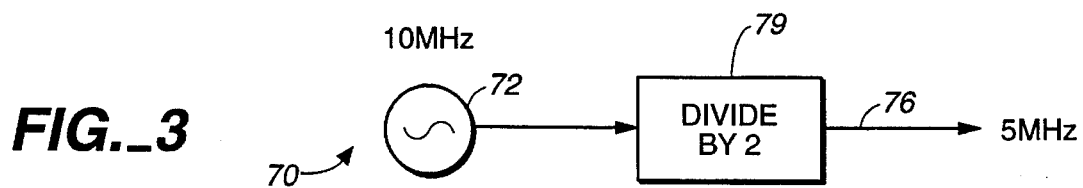
FIG._3
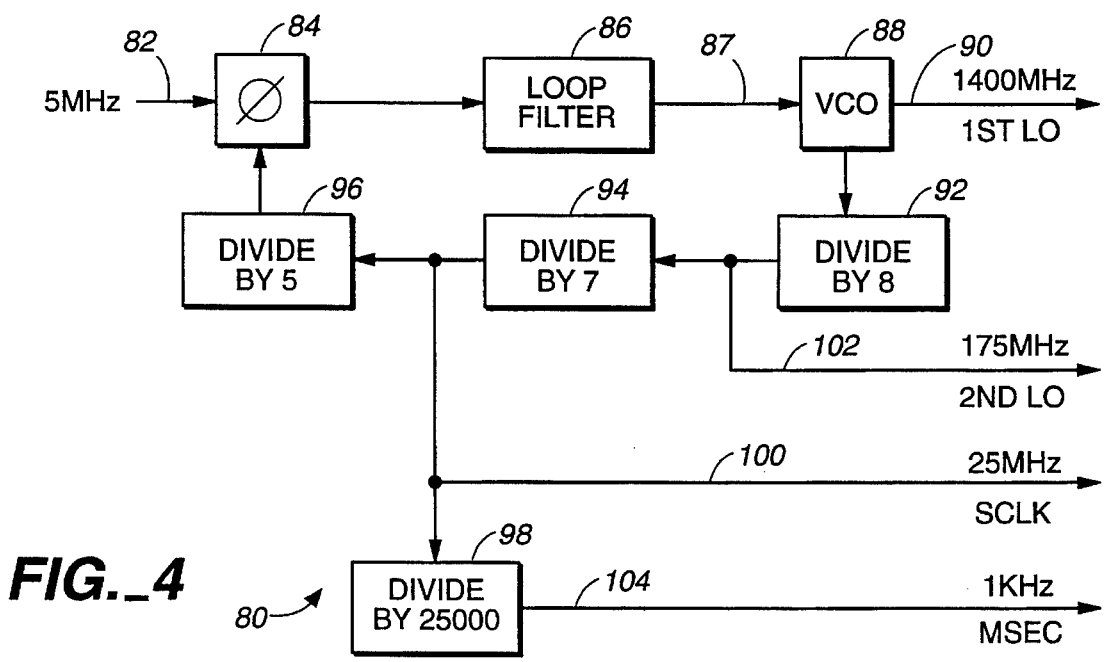
FIG._4

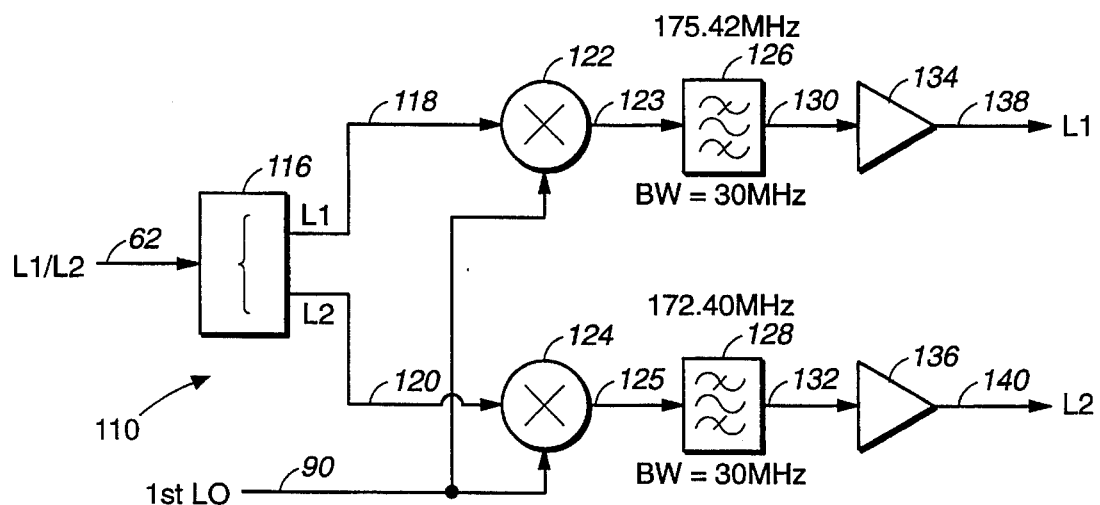
FIG._5
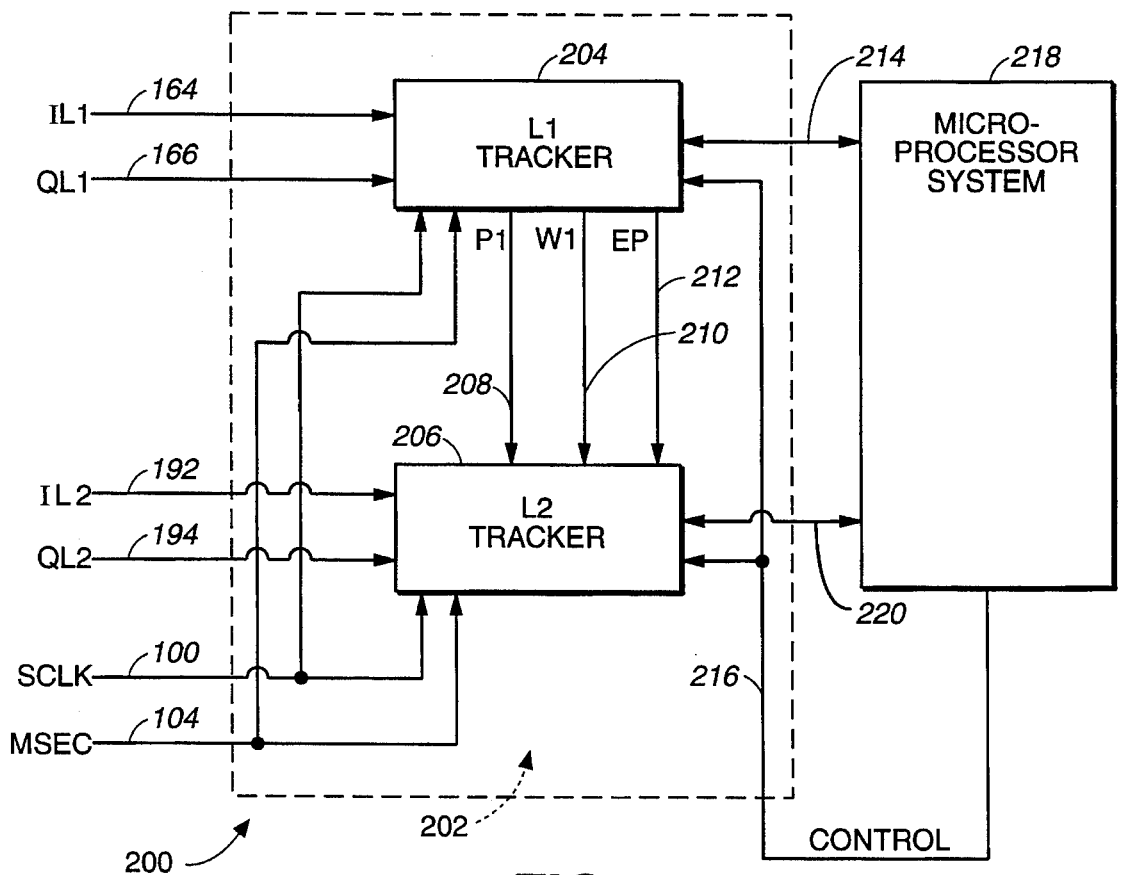
FIG._7

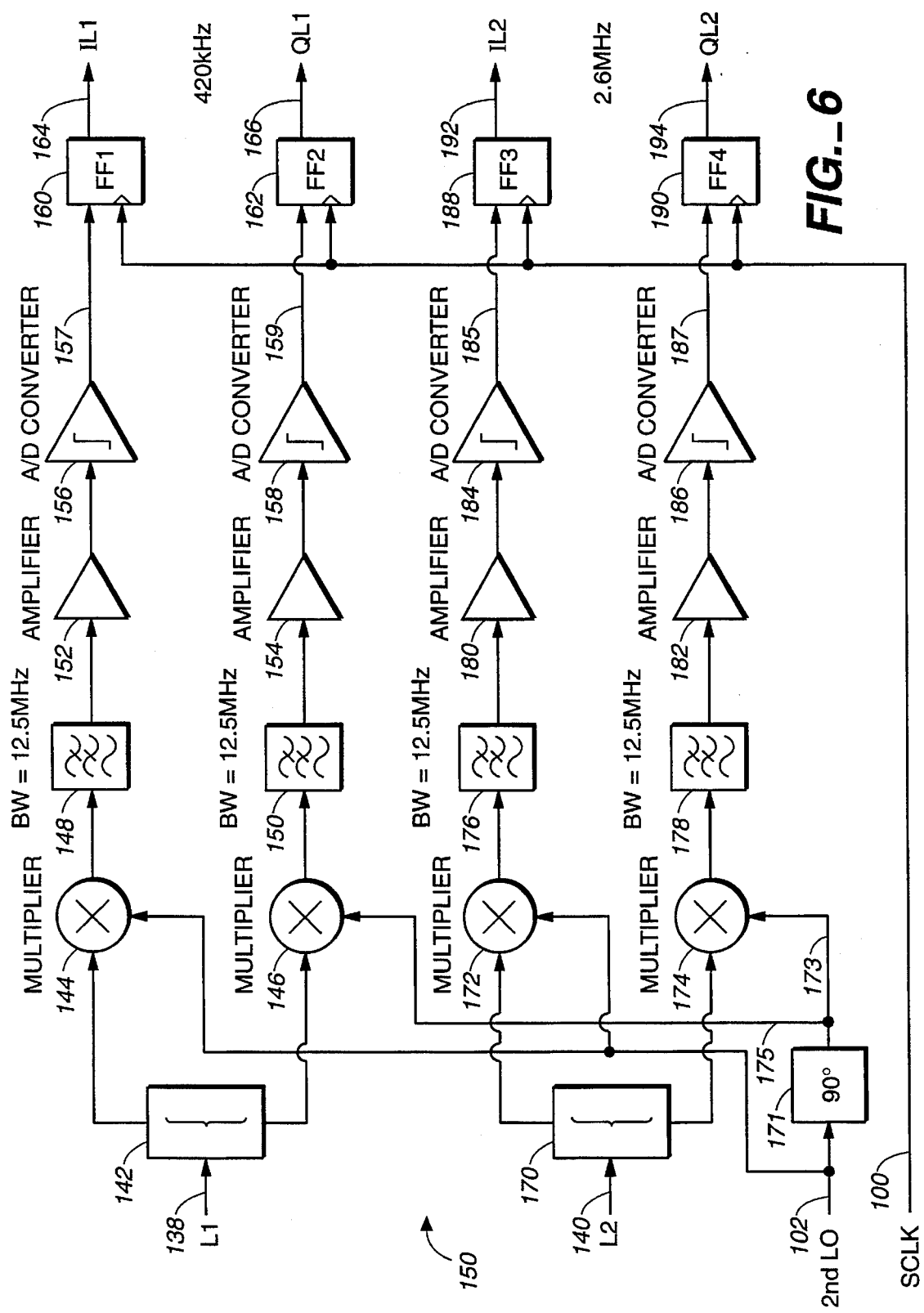
FIG._6

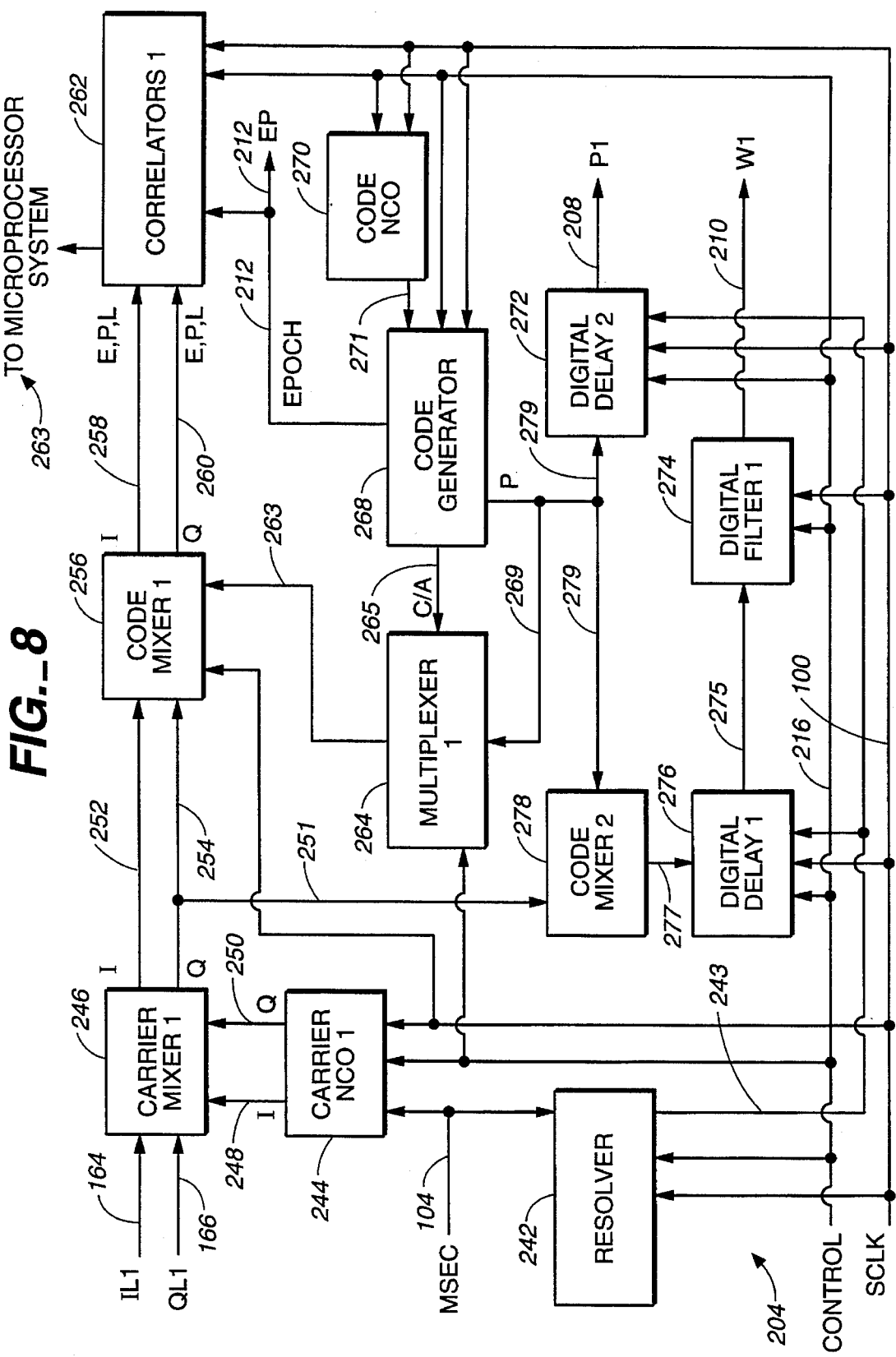
FIG._8

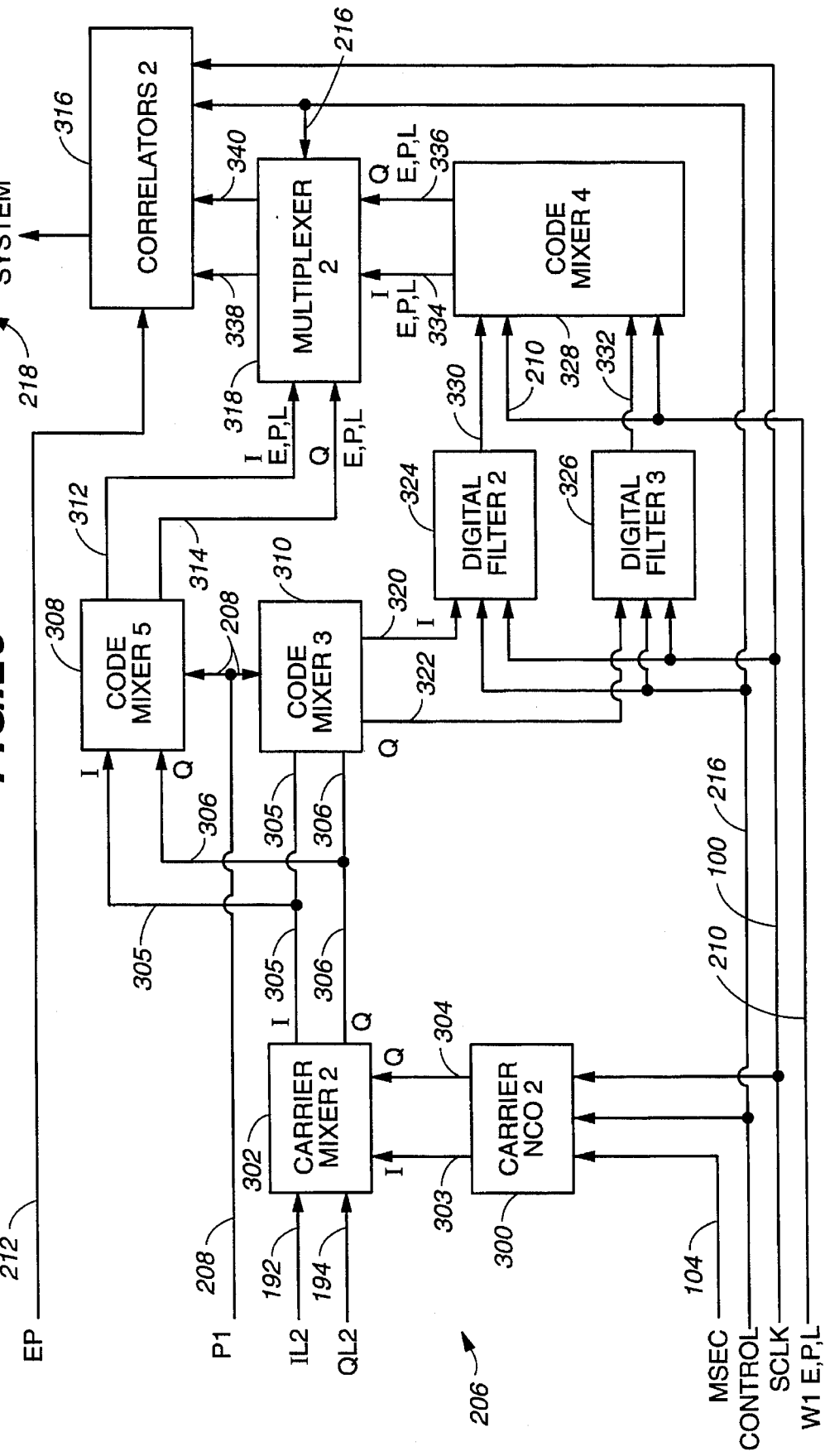
FIG._9

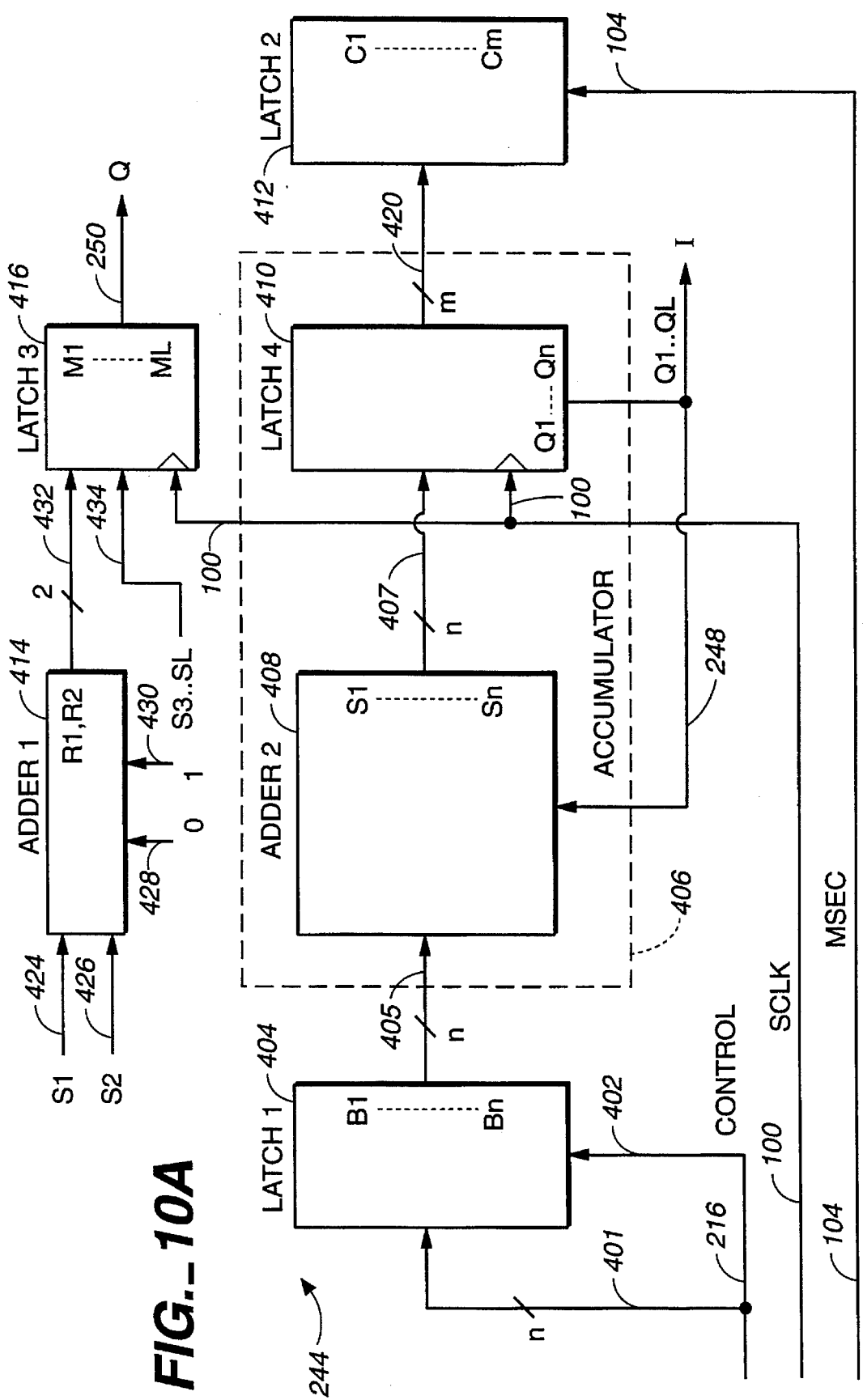
FIG._10A

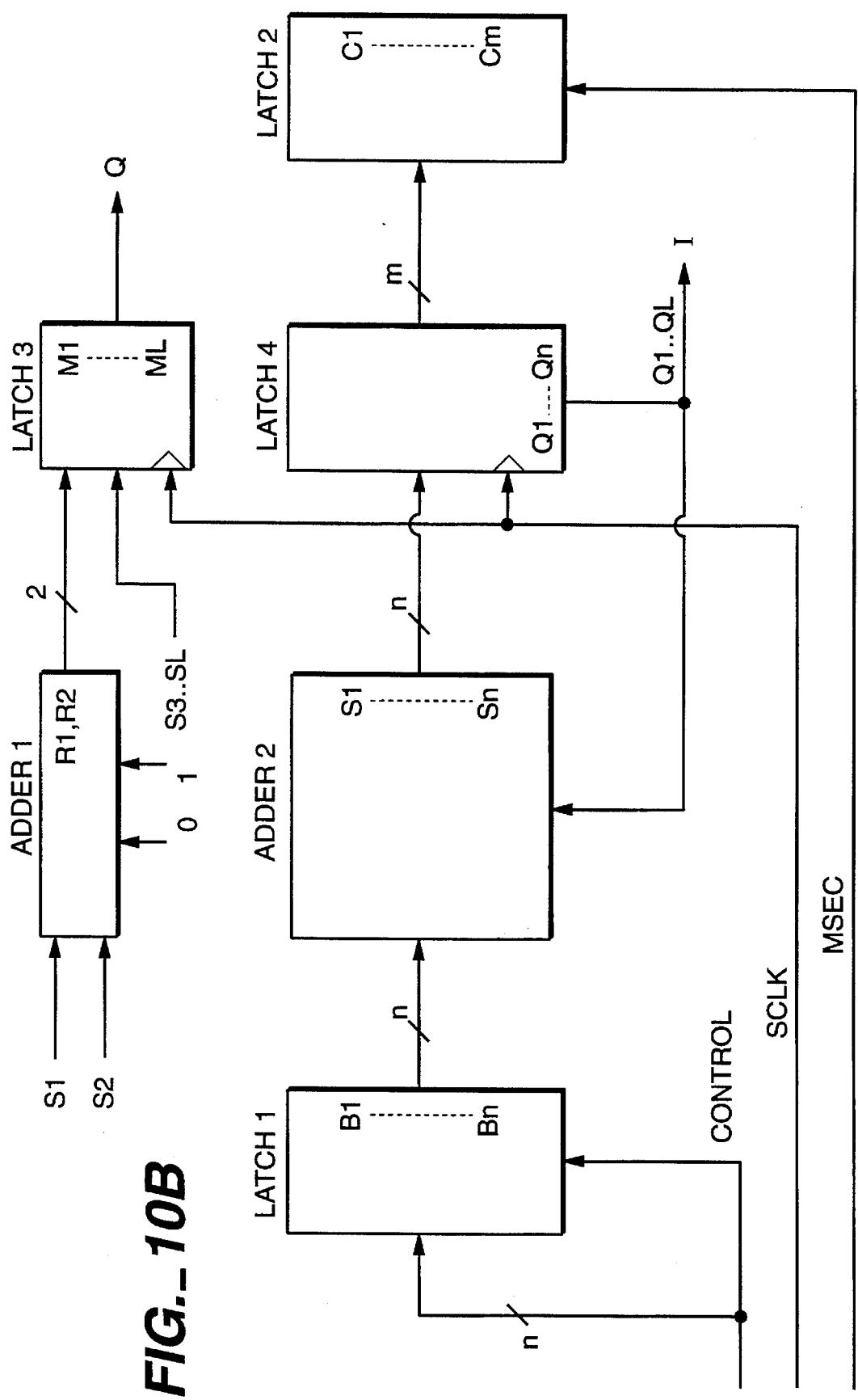
FIG._10B

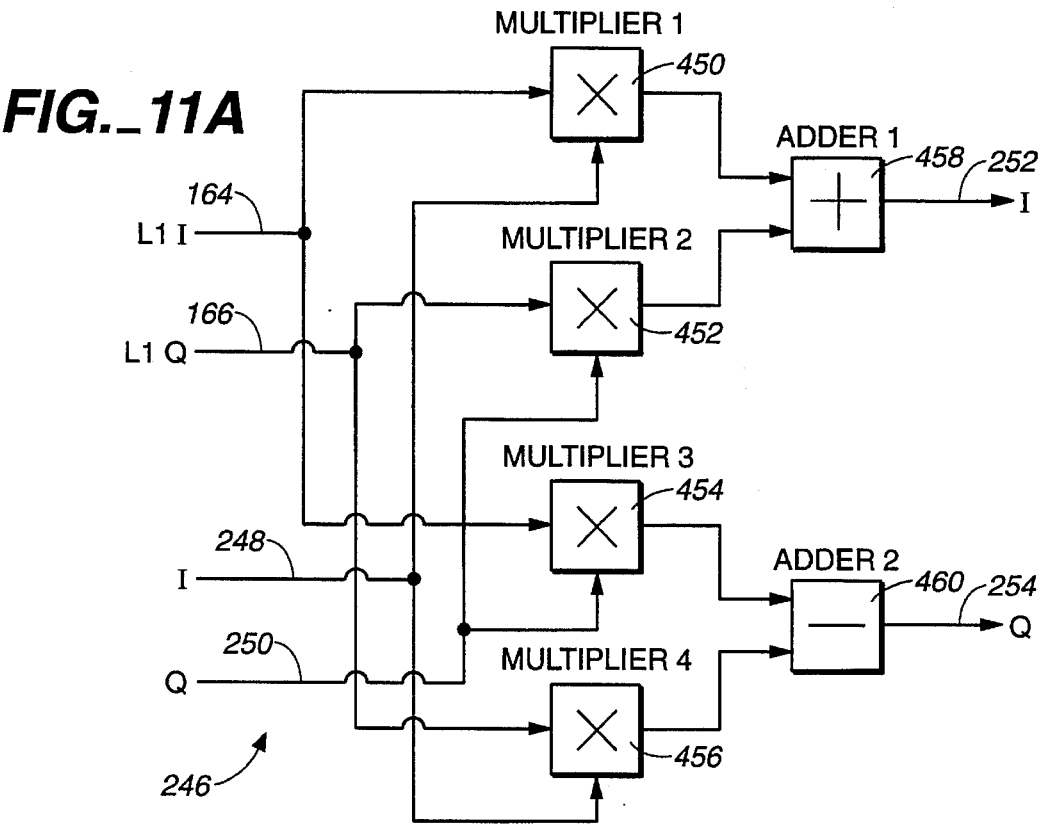
FIG._11A
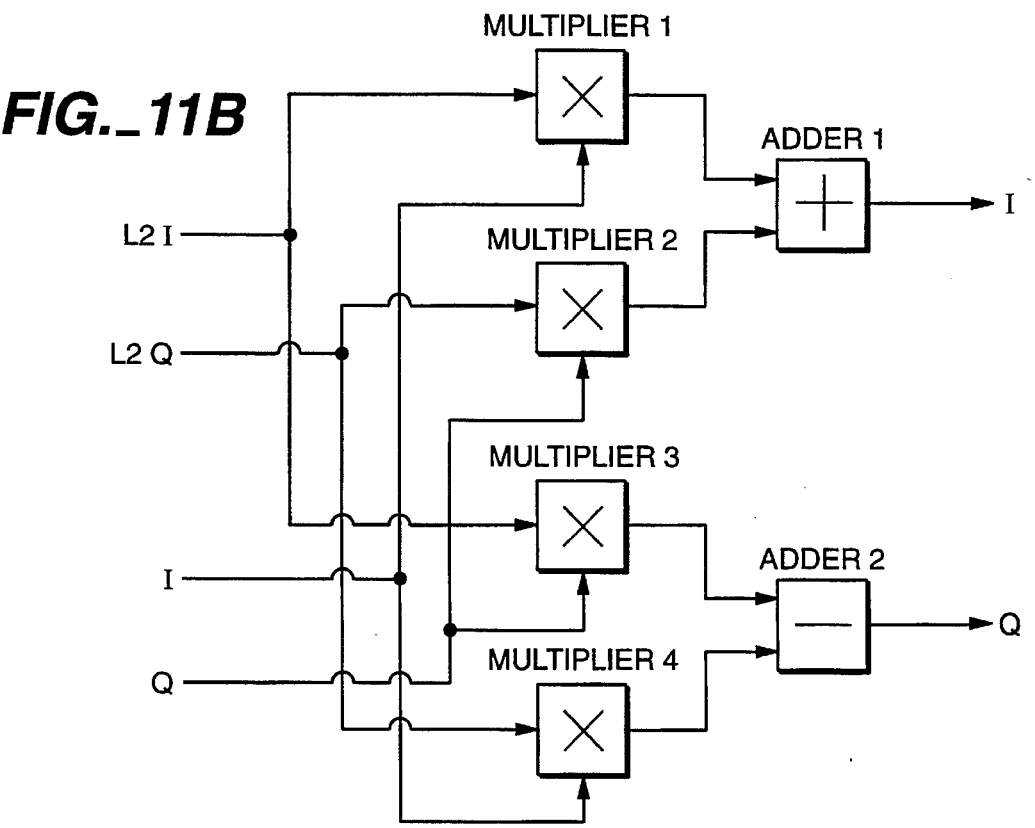
FIG._11B

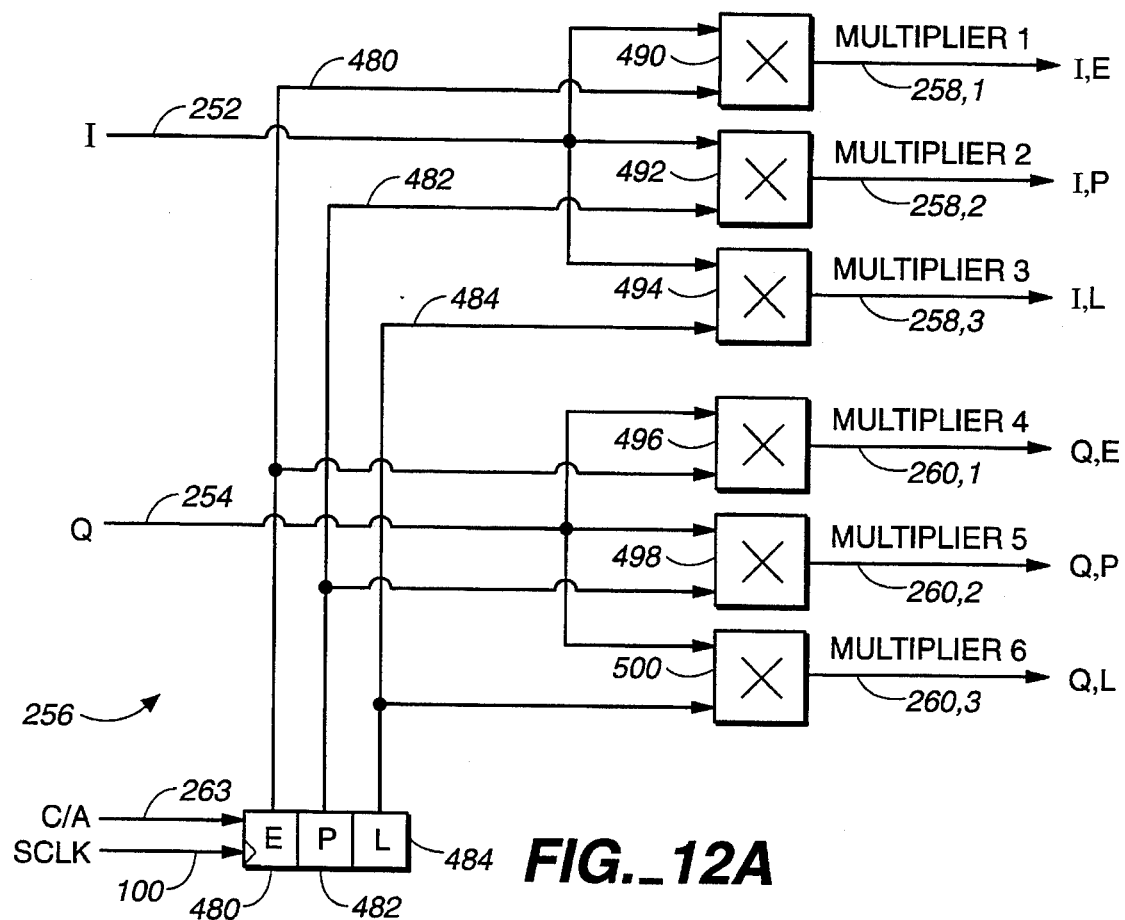
FIG._12A
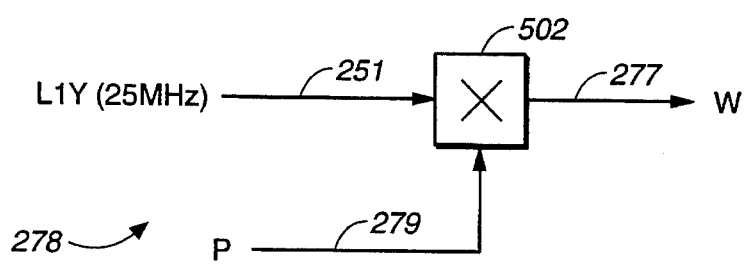
FIG._12B

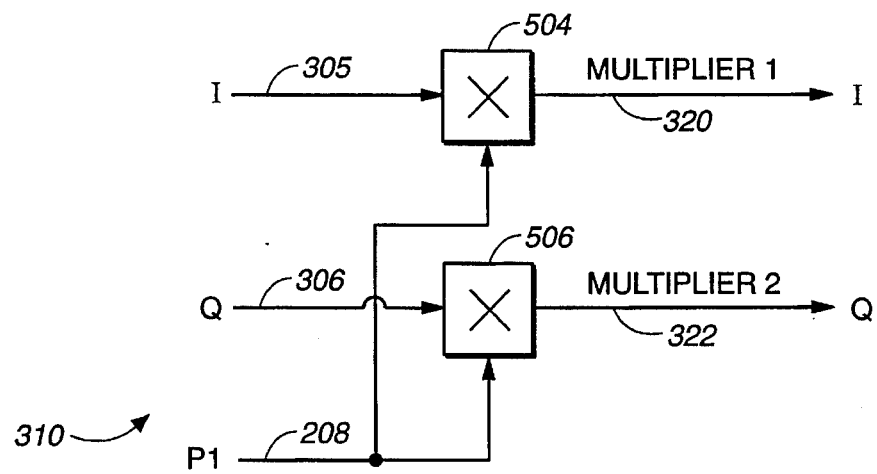
FIG._12C
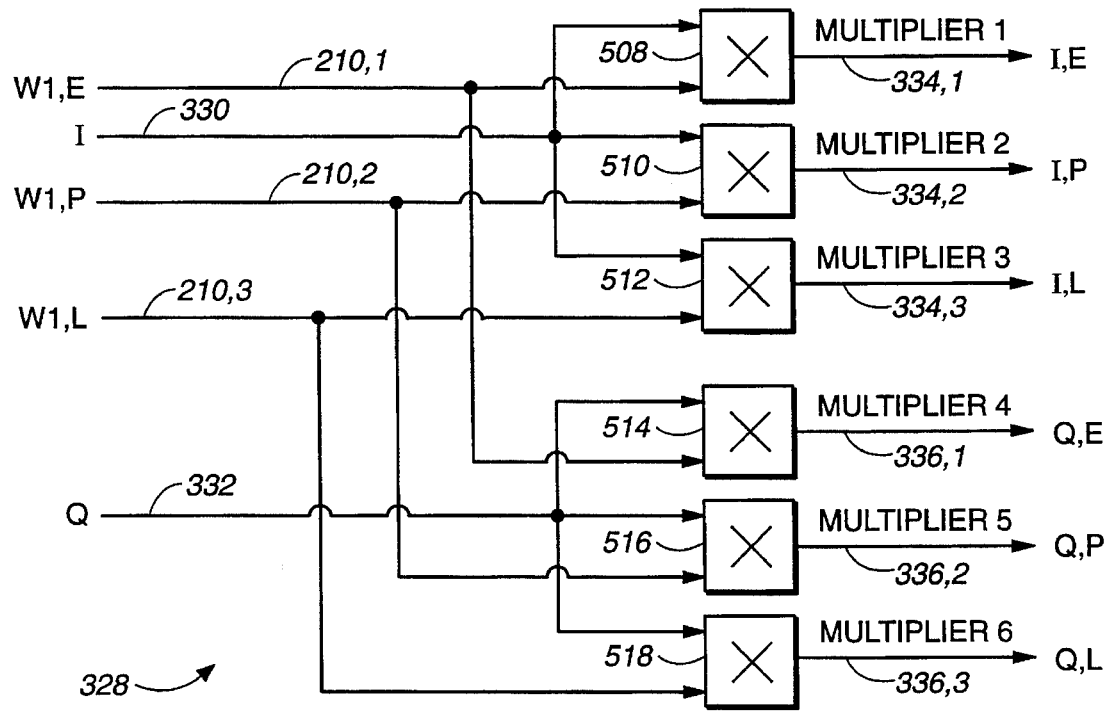
FIG._12D

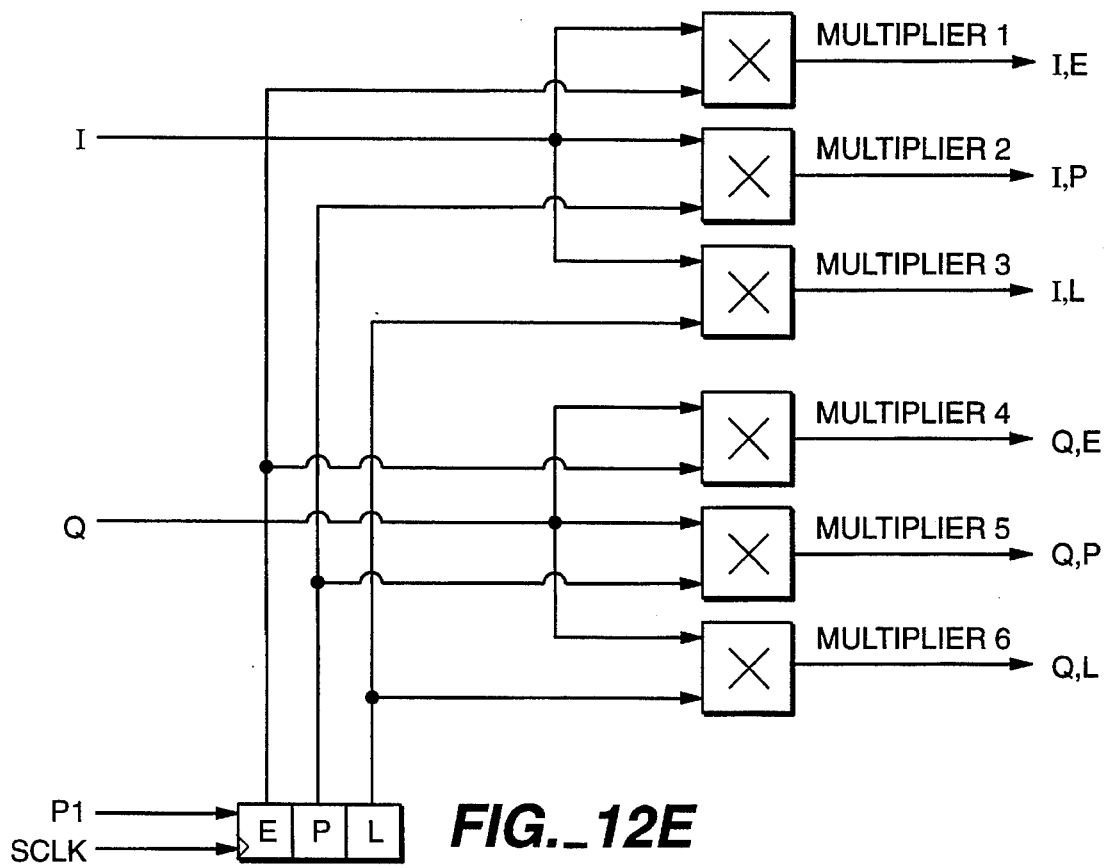
FIG._12E
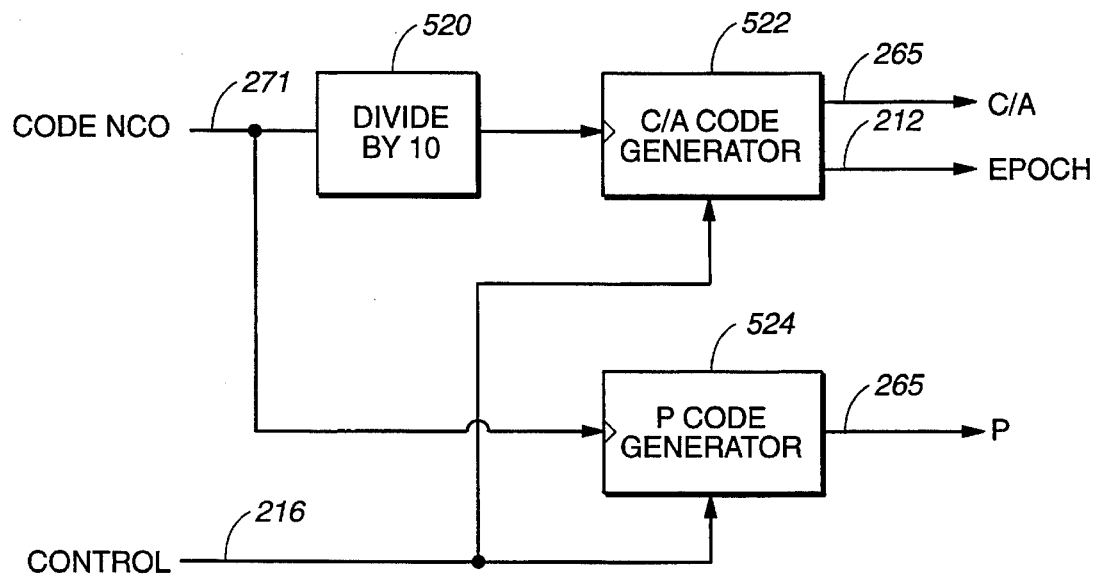
FIG._13

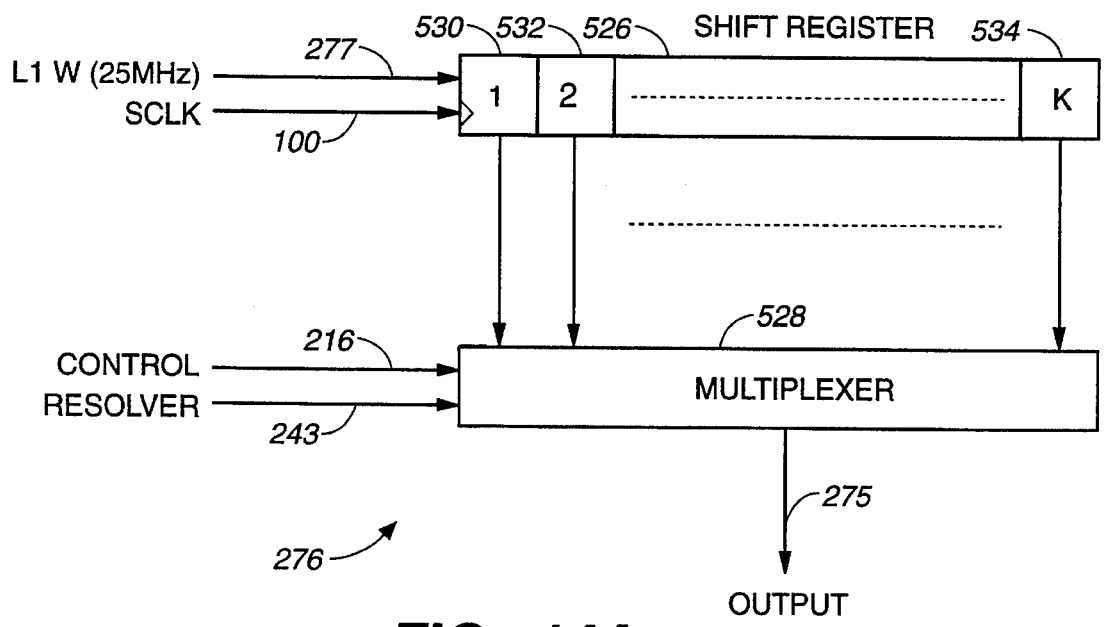
FIG._14A
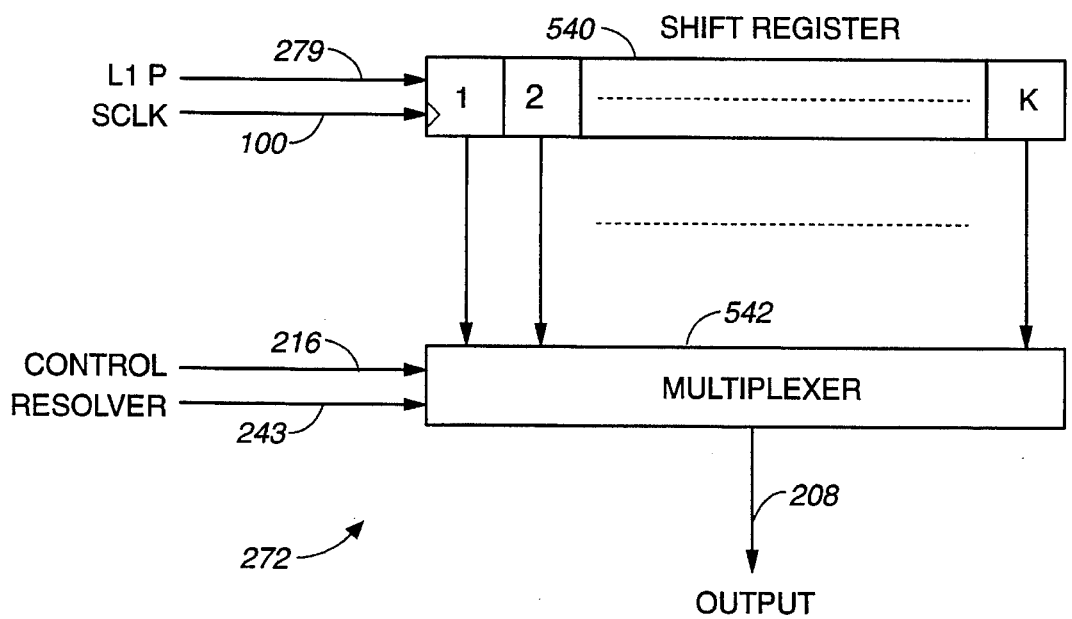
FIG._14B

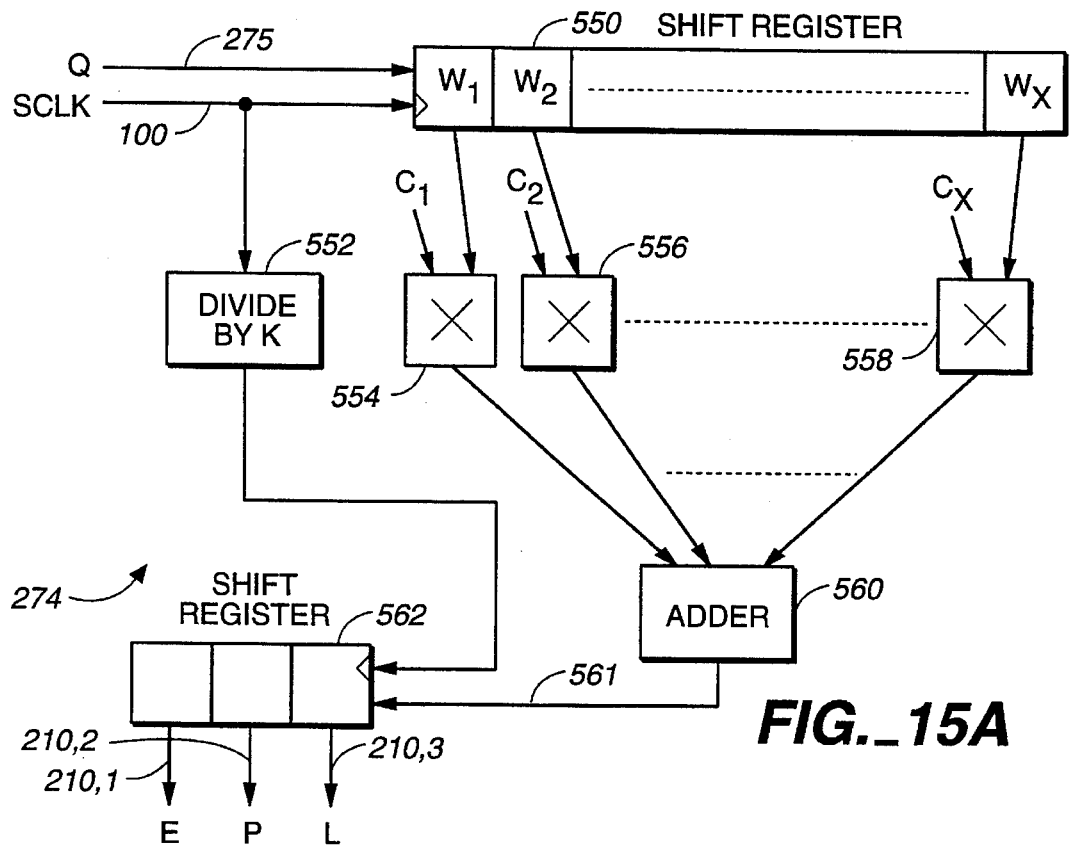
FIG._15A
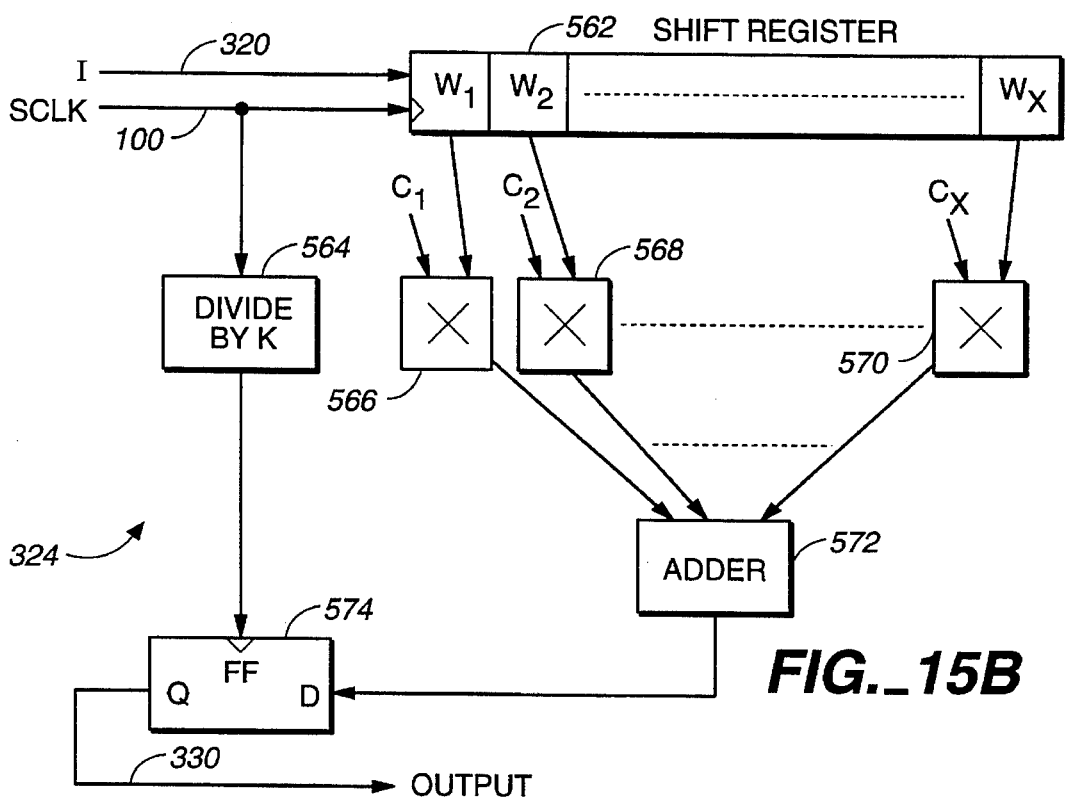
FIG._15B

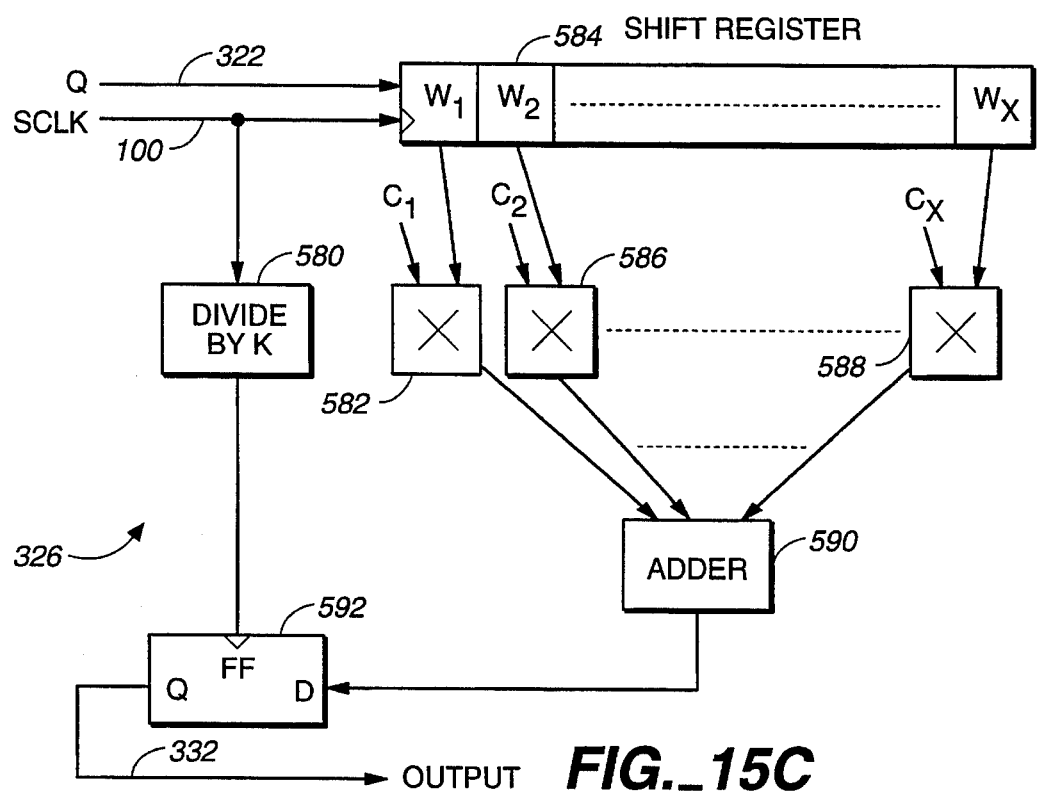
FIG._15C
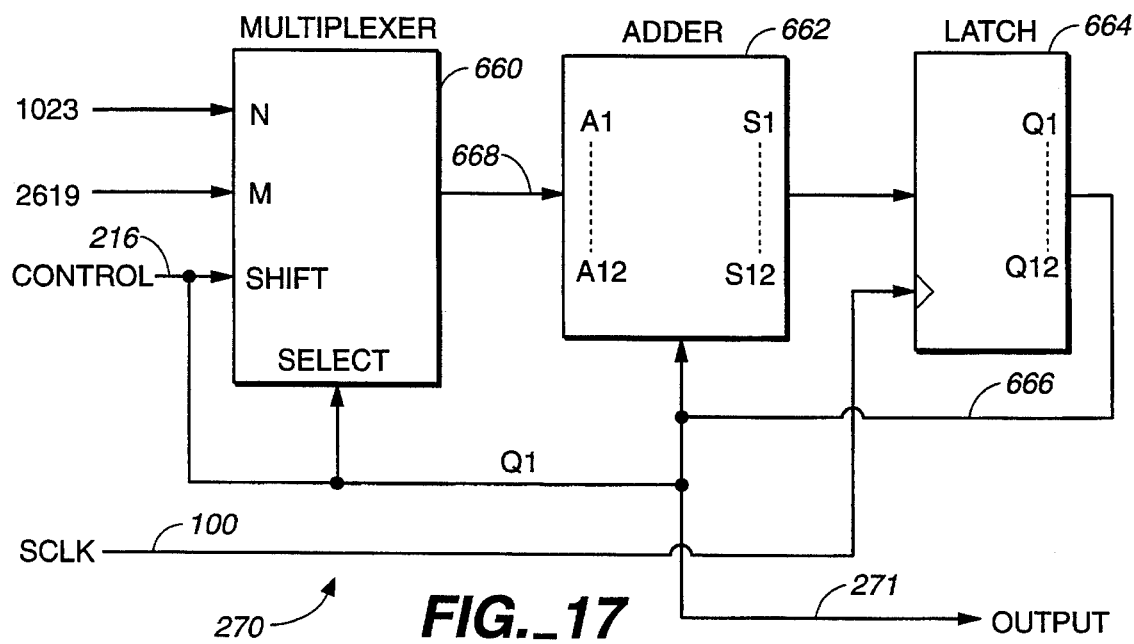
FIG._17

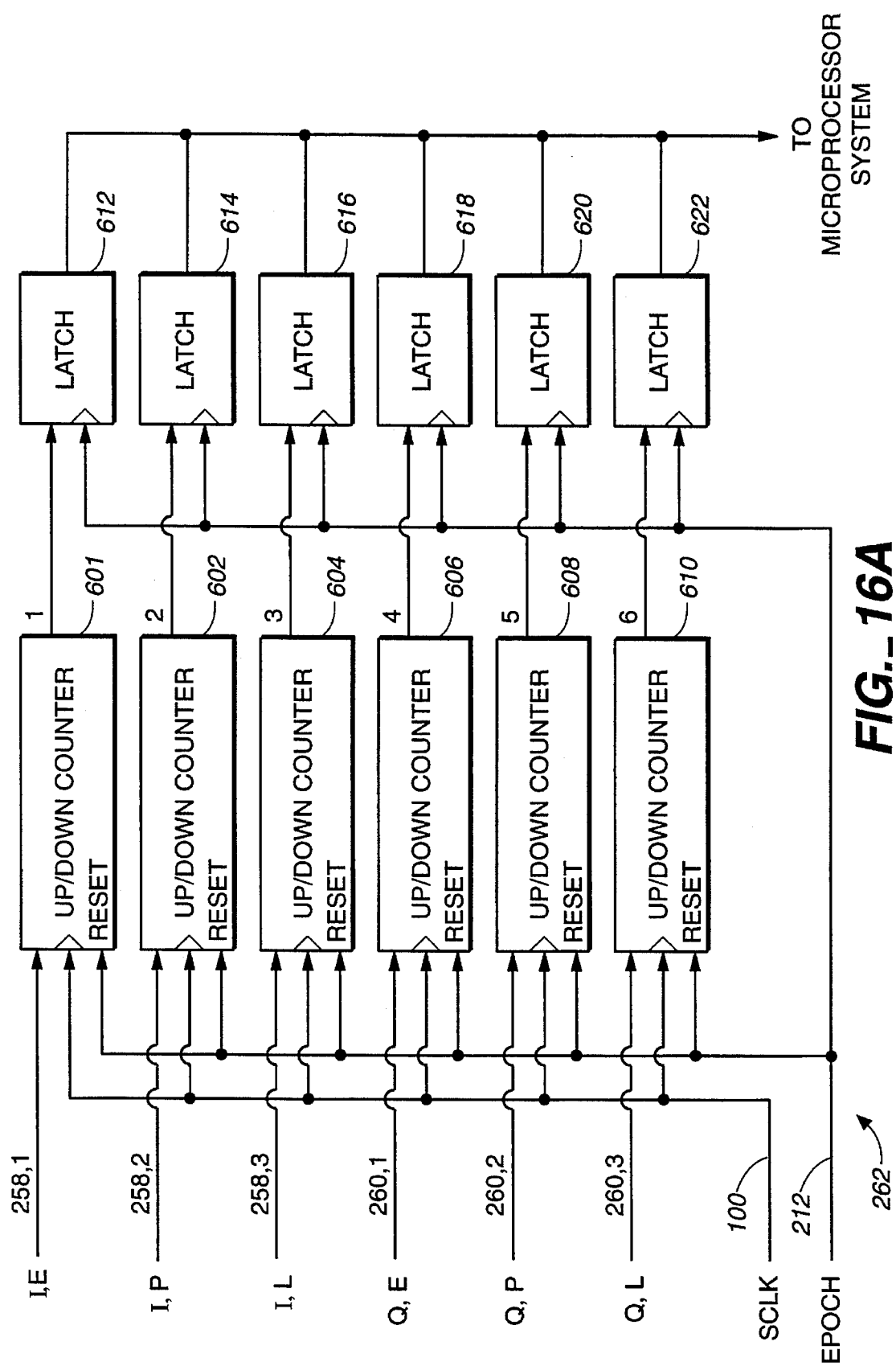
FIG._16A

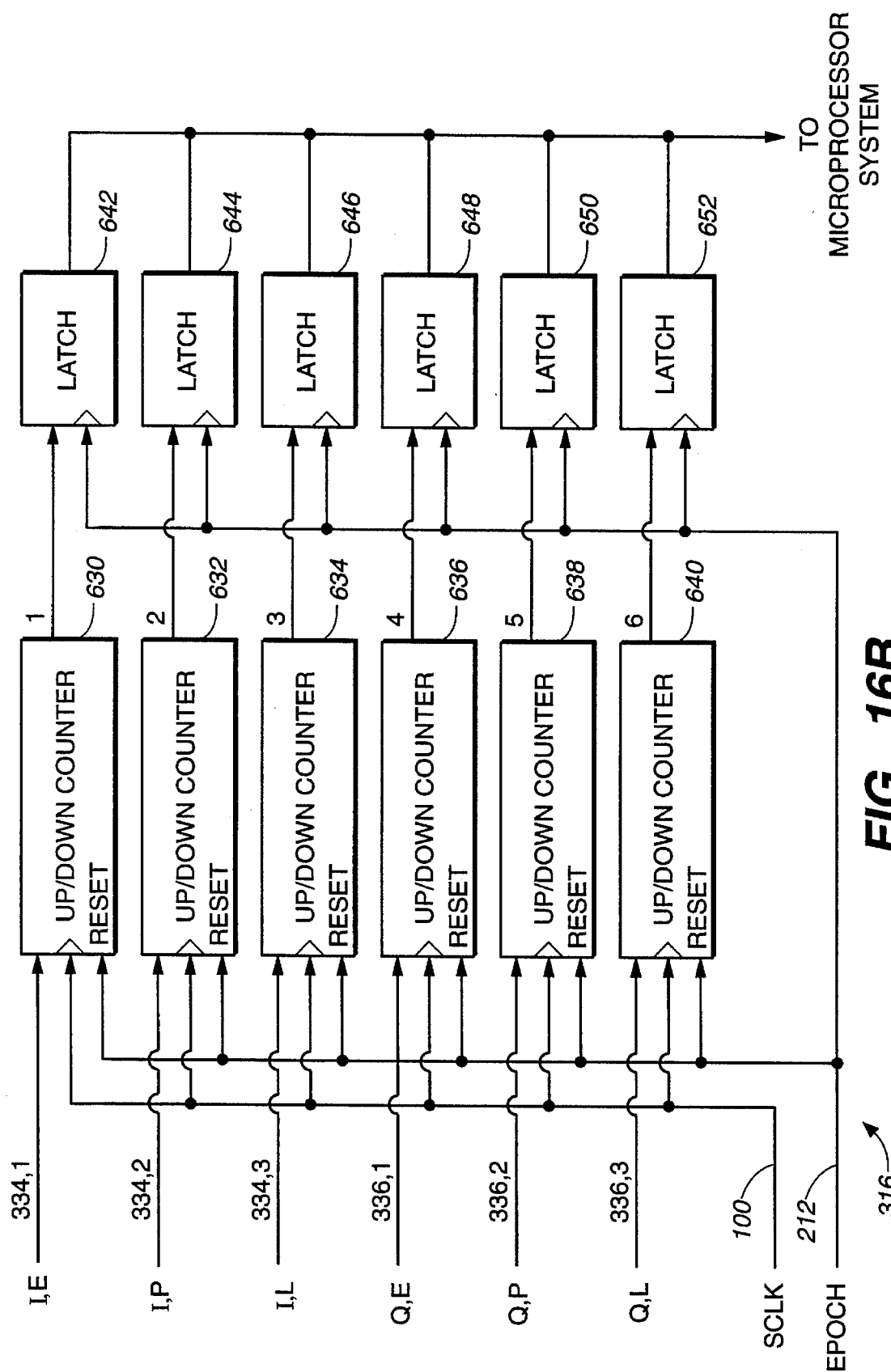
FIG._16B

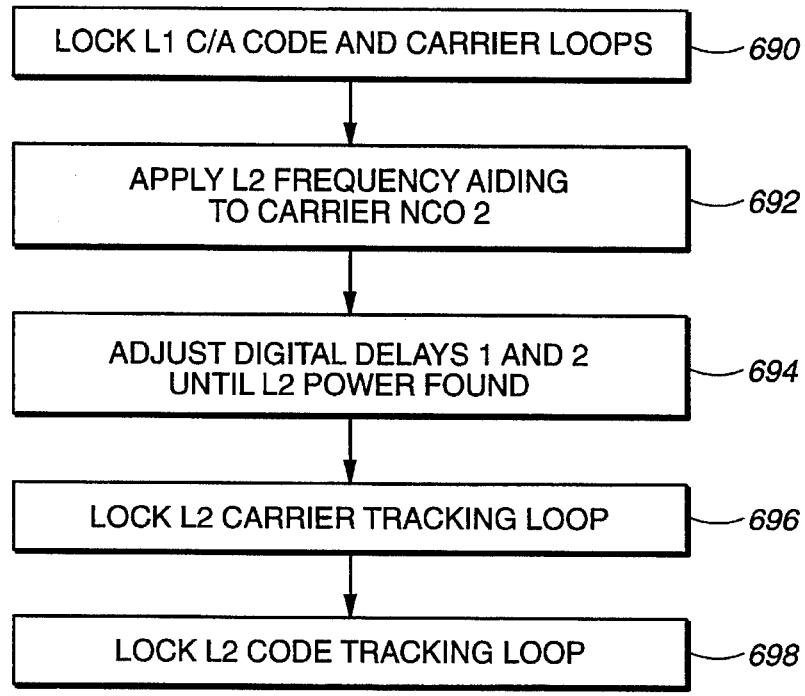
FIG._18A
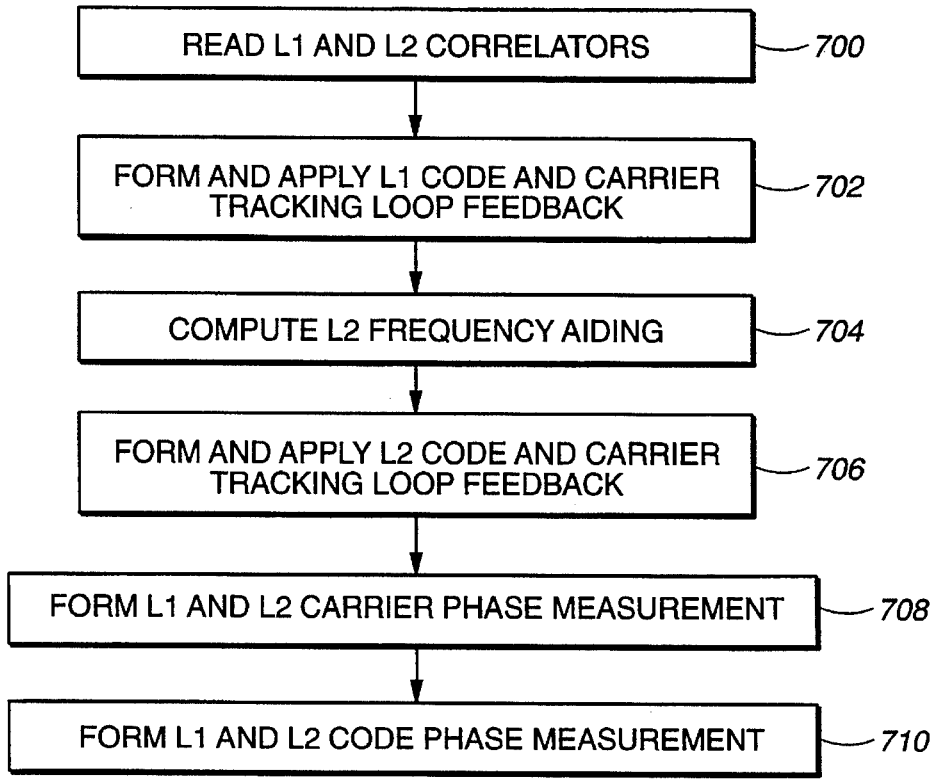
FIG._18B

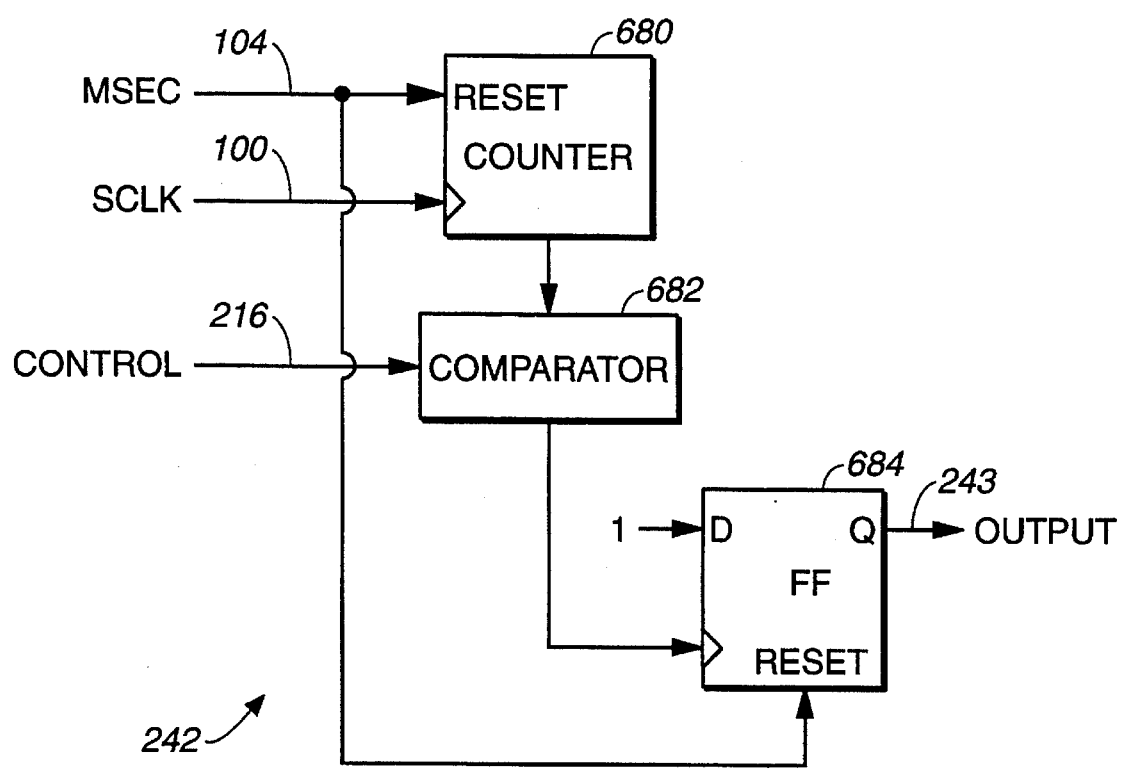
FIG._19

W-CODE ENHANCED CROSS CORRELATION SATELLITE POSITIONING SYSTEM RECEIVER

BACKGROUND

The invention relates to a satellite positioning system (SPS) receiver capable of receiving satellite signals which have been modulated with an unknown security code. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiplies $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in realtime by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of $10\ f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeries of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k(=1,2,\ldots 24)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, code GPS signal is not immediately squared. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. The result of the correlation is filtered by a bandpass filter, and the reduced-bandwidth signal is squared. The squared signal is processed in a delay lock code loop to maximize the spectral peak. An error signal is generated and is fed back to control the generator of P code signal as to maximize the peak in the frequency spectrum of the output signal and to effectively lock onto the incoming L2 P code signal. Simultaneously, the second harmonic of the suppressed carrier signal resulting from the squaring process is processed to provide L2 carrier phase measurements. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve integer ambiguities.

In U.S. Pat. No. 5,293,170 issued to Lorenz, the integration of the L1 and L2 signals after demodulation by locally generated carrier and P-code from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range (Ri) between the location of the i-th SPS satellite and the SPS receiver is equal to the speed of light c times (Δti), wherein (Δti) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range Ri to the satellite but only the pseudo-range (ri) to each SPS satellite.

After the SPS receiver determines the coordinates of the i-th SPS satellite by picking up transmitted ephemeries constants, the SPS receiver can obtain the solution of the set of the four equations for its unknown coordinates (x0,y0,z0) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast measurements are to be made, both the L1 carrier and the L2 carrier must also be used, which allows to eliminate the unknown component of the time delay of the signals by the ionosphere.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. It has been disclosed publicly that the secret Y-code is the modulo-two sum of the known P-code and the unknown W-code. Since the W-code is classified, the commercial GPS users employ different techniques to obtain the quasi-demodulation of the L2 signal.

The GPS signals are intended to be recovered by correlating each incoming signal with a locally generated replica of the code: P-code or C/A code. The result of such correlation is that the carrier in the GPS signals is totally suppressed when the modulating signal is a pseudorange code sequence like the P-code or the C/A code. Thus, the received L2 signal contains no component at the L2 frequency. For the survey applications it is important to be able to reconstruct the L2 carrier and to measure its phase. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency. The carrier recovered by correlation provides the best available signal-to-noise ratio (SNR). Although the L2 carrier can not be recovered by this correlation process when the P code is encrypted, L2 can still be recovered by squaring (multiplying the signal by itself)the incoming signal. This has an effect of removing all biphase modulation from the signal, and producing a single-frequency output signal at twice the frequency of the suppressed carrier. Thus, the L2 carrier can be obtained by squaring, regardless of whether or not the modulating P code is encrypted. However, the squaring the signal also squares the noise component of the signal. Thus, the resulting SNR is seriously degraded (by 30 dB or more) as compared with the ratio for the carrier recovered by correlation. Moreover, squaring provides the half-wavelength carrier phase which is different from the L2 real wavelength carrier phase.

The variation of the squaring technique is proposed by Counselman III in U.S. Pat. No. 4,667,203, wherein the incoming signal is divided into upper and lower sidebands, which are multiplied together to obtain the second harmonic of the carrier signal. However, the degradation of the SNR is the same as with squaring the entire signal.

U.S. Pat. No. 4,972,431 issued to Keegan, discloses a different approach to the quasi-demodulation of the L2 signal. The incoming encrypted P-signals, is repetitively accomplished over a duration that is estimated to be the period of the modulation code. And further, the modulated code period is estimated to be an integer multiple of P chips. The invention assumes the knowledge of the timing of the unknown W-code, however, such W-code timing information is not available to the commercial user and can not be recovered without knowledge of the classified W-code information.

SUMMARY

The present invention is unique because it allows to design a high SNR SPS receiver capable of processing the satellite signals with an unknown W-code without making any assumptions about the W-code timing information.

One aspect of the present invention is directed to a system for optimum correlation processing of L1 and L2 signals received from at least one SPS satellite by a SPS RECEIVER. The system includes a RECEIVER for: (1) receiving a known C/A-code modulated on L1 carrier frequency; (2) receiving an unknown Y-code modulated on L1 carrier frequency signal; and (3) receiving an unknown Y-code modulated on L2 carrier frequency signal. The received L1 and L2 signals contain propagation noise, and the Y-code includes a known P-code and an unknown W-code.

The system further includes at least one DIGITAL CHANNEL PROCESSOR for: (1) locally generating replica of the C/A -code modulated on L1 carrier frequency signal; (2) locally generating replica of the P-code modulated on L1 carrier frequency signal; (3) extracting of an estimate of the Y-code from the L1 signal, and from the L2 signal; (4) correlating a locally generated replica of C/A-code with the received L1 code for obtaining an estimate of L1 group delay (L1 pseudo-range) and L1 carrier phase; (5) removing the P-code from the locally extracted estimate of the L1 Y-code to obtain a locally extracted estimate of the L1 W-code; (6) removing the P-code from the locally extracted estimate of the L2 Y-code to obtain a locally extracted estimate of the L2 W-code; and (7) correlating the locally extracted estimate of the L1 W-code with the locally extracted estimate of the L2 W-code to obtain relative offset in group delay between L1 and L2 signals and for obtaining an independent estimate of L2 carrier phase.

The system further includes a MASTER OSCILLATOR and a FREQUENCY SYNTHESIZER, wherein the FREQUENCY SYNTHESIZER generates several timing signals (LO1, LO2, SCLK, and MSEC).

The RECEIVER includes a dual frequency patch ANTENNA for receiving the L1 and L2 satellite signals; a FILTER/low noise amplifier (LNA) for performing filtering and low noise amplification of the L1 and L2 signals; a DOWNCONVERTER for mixing and converting the L1 and L2 signals; and an IF PROCESSOR for transforming the converted L1 and L2 signals into digitally sampled quadrature versions of L1 and L2 signals (IL1, QL1, IL2, QL2).

The IF PROCESSOR includes four one-bit analog-to-digital (A/D) CONVERTERs for performing 1-bit quantization operation on the IL1, QL1, IL2 and QL2 signals. The IF PROCESSOR further includes four FLIP-FLOPs for sampling the IL1, IL2, QL1, and QL2 signals at sampling clock (SCLK) rate.

The DIGITAL CHANNEL PROCESSOR includes an L1 TRACKER for tracking L1 C/A code when Y code is ON and for tracking L1 P code when Y code is OFF; an L2 TRACKER for tracking an enhanced cross correlated W code when Y code is ON and for tracking L2 P code when Y code is OFF; and a MICROPROCESSOR system. The L1 TRACKER is fed by digitized inphase IL1 and quadrature QL1 of L1 signal outputted by the IF PROCESSOR. The L2 TRACKER is fed by digitized inphase IL2 and quadrature QL2 of L2 signal outputted by the IF PROCESSOR. The L1 TRACKER and the L2 TRACKER are synchronously clocked by the SCLK signal and synchronously referenced by the MSEC signal to local reference time. When Y code is ON the L2 TRACKER is fed from the L1 TRACKER by three signals: L1 P code, filtered estimate of L1 W code, and C/A code epoch (EP code). The MICROPROCESSOR system is fed by output signals from the L1 TRACKER and the L2 TRACKER; and the L1 TRACKER and the L2 TRACKER are fed by control signal from the MICROPROCESSOR.

The L1 TRACKER includes a CODE GENERATOR for providing a locally generated replica of C/A code and P-code; a MULTIPLEXER 1 for selecting a locally generated code C/A when Y code is ON and for selecting a locally generated P-code when Y code is OFF; and a carrier numerically controlled oscillator (CARRIER NCO 1). The L1 TRACKER further includes a CARRIER MIXER 1 for multiplying digitized inphase IL1 and QL1 signals having carrier frequency with outputted by the CARRIER NCO 1 inphase and quadrature components of digital carrier; wherein the CARRIER MIXER 1 outputs inphase IL1 and quadrature QL1 signals having zero carrier frequency. The L1 TRACKER also includes a CODE MIXER 1 for code correlating the CARRIER MIXER 1 output signals with the locally generated replica of C/A code; wherein when the L1 TRACKER's carrier tracking loop is closed via the CARRIER NCO 1 the input to the CODE MIXER I represents the satellite signal L1 C/A code; and wherein the CODE MIXER 1 performs the code correlation at 3 time points (early, punctual and late) on the autocorrelation function graph creating an early, a punctual and a late sample of the autocorrelation function.

The L1 TRACKER further includes a block CORRELATORS 1 for integrating the IE (inphase early), the IP (inphase punctual), the IL (inphase late), the QE (quadrature early), the QP (quadrature punctual), and the QL (quadrature late) versions of the correlated samples of the L1 C/A (or P) code with the locally generated version of C/A (or P) code across a time period given by a multiple of L1 C/A EPOCH codes. The CORRELATORS 1 output signal is fed to the MICROPROCESSOR system at a rate of L1 C/A code epoch, wherein the MICROPROCESSOR uses the CORRELATORS 1 output signal to develop feedback signals for the carrier tracking loop and for the code tracking loop.

The IE,IL,QE, and QL signals are used by the code tracking loop to form:: (1) a code phase estimate=K1(IE-IL), when the carrier loop is locked; or (2) a code phase estimate=K1[(IE$^2$+QE$^2$)$^{1/2}$-(IL$^2$+QL$^2$)$^{1/2}$], when the carrier loop is not locked; K1 is an L1 code loop gain factor. The IP, and QP signals are used by the carrier tracking loop by forming a carrier phase estimate=arctan(QP/IP).

The L1 TRACKER further includes the CODE NCO to provide a clock for the CODE GENERATOR which locally generates replicas of C/A code and P-code. The CODE NCO outputs under normal operation code NCO frequency=(N× SCLK)/(2$^n$−M+N), and (2) under code phase shift operation code phase shift=(M−SHIFT)/(2$^n$−M+N).

The L1 TRACKER further includes a CODE MIXER 2 for removing known L1 P code from the estimate of L1 Y code and for outputting an estimate of L1 W code; a DIGITAL DELAY 1 for delaying the L1 W code estimate; a DIGITAL FILTER 1 for reducing the bandwidth (BW) of the L1 W code estimate; a DIGITAL DELAY 2 for delaying the P code output from the CODE GENERATOR; and a RESOLVER for altering the resulting delay being a result of the relative time spent on each delay.

The L2 TRACKER includes a carrier numerically controlled oscillator (CARRIER NCO 2) for generating the inphase and quadrature components of digital carrier; a CARRIER MIXER 2 for mixing digitized inphase IL2 and QL2 signals having carrier frequency with inphase IL2 and quadrature QL2 signals having zero carrier frequency. When L2 carrier tracking loop is locked via the CARRIER NCO 2 the IL2 output signal contains an estimate of L2 Y code and the Q L2 output signal contains no signal power.

The CODE MIXER 3 is used by the L2 TRACKER further for outputting an I estimate of L2 W code and a Q estimate of L2 W code; a CODE MIXER 4 for correlating the I estimate of L2 W code and the Q estimate of L2 W code with a signal W1, wherein the signal W1 is the estimate of L1 W code sent by the L1 TRACKER. The CODE MIXER 4 performs the code correlation at 3 time points (early, punctual and late) on the autocorrelation function graph creating an early, a punctual and a late sample of the autocorrelation function.

The L2 TRACKER further includes the CODE MIXER 5 for code correlating the CARRIER MIXER 2 output I and Q signals with outputted by the L1 TRACKER P1 code, wherein said P1 code represents a locally generated replica of L2 P code. The CODE MIXER 5 also performs the code correlation at 3 time points (early, punctual and late) on the autocorrelation function graph creating an early, a punctual and a late sample of the autocorrelation function.

The MULTIPLEXER 2 is employed by the L2 TRACKER for selecting under the control of MICROPROCESSOR the mode of operation when Y code is ON and OFF. When Y code is OFF and satellite transmits the P code on L2 the MICROPROCESSOR selects the output of CODE MIXER 5. When Y code is ON the MICROPROCESSOR selects the output of CODE MIXER 4. The block CORRELATORS 2 connected to the MULTIPLEXER 2 is used for integrating the early, punctual and late samples of the autocorrelation function. The CORRELATORS 2 output signal is fed to the MICROPROCESSOR system at a rate of the L1 C/A code epoch (EP). The MICROPROCESSOR uses the CORRELATORS 2 output signal to develop feedback signals for the carrier tracking loop and for the code tracking loop.

The block CORRELATORS 2 is used by the L2 TRACKER for integrating the IE (inphase early), the IP (inphase punctual), the IL (inphase late), the QE (quadrature early), the QP (quadrature punctual), and the QL (quadrature late) version of the correlated samples between filtered estimate of L1 and L2 W-codes across a time period given by a multiple of L1 C/A EPOCH (EP) code.

The IE,IL,QE, and QL signals are used by the code tracking loop by forming: (1) a code phase estimate=K2(IE−IL), when the carrier loop is locked; or (2) a code phase estimate=$K2[(IE^2+QE^2)^{1/2}-(IL^2+QL^2)^{1/2}]$, when the carrier loop is not locked; K2 is an L2-code loop gain factor.

The PQ, and PI codes are used by the carrier tracking loop by forming a carrier phase estimate=arctan(PQ/PI).

One more aspect of the present invention is directed to a method for optimum correlation processing of L1 and L2 signals received from a SPS satellite by a correlation processing system comprising a RECEIVER and at least one DIGITAL CHANNEL PROCESSOR.

The method includes the steps of: (1) providing the RECEIVER and at least one DIGITAL CHANNEL PROCESSOR; (2) receiving a known C/A-code modulated on L1 carrier frequency, an unknown Y code modulated on L1 carrier frequency signal, and an unknown Y code modulated on L2 carrier frequency signal by the RECEIVER; wherein the received L1, and L2 signals contain propagation noise; and wherein the Y code comprises a known P-code and an unknown W-code; (3) generating local replica of the C/A-code modulated on L1 carrier frequency signal by the DIGITAL CHANNEL PROCESSOR; (4) generating local replica of the P-code modulated on L1 carrier frequency signal by the DIGITAL CHANNEL PROCESSOR; wherein said locally generated replica of L1 signal does not contain propagation noise; (5) extracting of an estimate of the Y code from the L1 signal, and from the L2 signal by the DIGITAL CHANNEL PROCESSOR; wherein the estimate signals contain propagation noise; (6) correlating a locally generated replica of C/A-code with the received L1 code for obtaining an estimate of L1 group delay (L1 pseudo-range) and L1 carrier phase; (7) removing the P-code from the locally extracted estimate of the L1 Y code by the CHANNEL PROCESSOR to obtain a locally extracted estimate of the L1 W-code; (8) removing the P-code from the locally extracted estimate of the L2 Y code by the CHANNEL PROCESSOR to obtain a locally extracted estimate of the L2 W-code; and (9) correlating the locally extracted estimate of the L1 W-code with the locally extracted estimate of the L2 W-code to obtain relative offset in group delay between L1 and L2 signals and for obtaining an independent estimate of L2 carrier phase by the CHANNEL PROCESSOR.

The step of receiving L1 and L2 satellite signals further comprises the steps of: (1) receiving said L1 and L2 satellite signals by the dual frequency patch ANTENNA; (2) performing filtering and low noise amplification of the L1 and L2 signals by the FILTER/low noise AMPLIFIER (LNA), wherein the FILTER/LNA determines the noise/signal ratio of the received signals L1 and L2; (3) mixing and converting the L1 and L2 signals by the DOWNCONVERTER; (4) transforming the converted L1 and L2 signals into digitally sampled quadrature versions of L1 and L2 signals (IL1, QL1, IL2, QL2) by the IF PROCESSOR; and (5) generating several timing signals by the FREQUENCY SYNTHESIZER.

The method further includes the steps of: (1) tracking L1 C/A-code when Y code is ON and tracking L1 P-code when Y code is OFF by the L1 TRACKER; (2) tracking an enhanced cross correlated W-code when Y code is ON and tracking L2 P-code when Y code is OFF by the L2 TRACKER; and (3) feeding the MICROPROCESSOR system by output signals from the L1 TRACKER and the L2 TRACKER.

The step of tracking L1 C/A-code when Y code is ON and tracking L1 P-code when Y code is OFF by the L1 TRACKER further comprises the steps of: (1) feeding the L1 TRACKER by digitized inphase IL1 and quadrature QL1 of L1 signal generated by the IF PROCESSOR; (2) synchronously clocking the L1 TRACKER by the SCLK signal outputted by the FREQUENCY SYNTHESIZER; (3) synchronously referencing the L1 TRACKER by the MSEC signal outputted by the FREQUENCY SYNTHESIZER to local reference time; (4) feeding the L1 TRACKER by control signal from the MICROPROCESSOR; (5) providing a locally generated replica of C/A code and locally generated replica of P-code by the CODE GENERATOR; (6) selecting a locally generated code C/A when Y code is ON and selecting a locally generated P-code when Y code is OFF by the MULTIPLEXER 1; (7) generating inphase and quadrature components of digital carrier by the CARRIER NCO 1; (8) generating inphase IL1 and quadrature QL1 signals having zero carrier frequency by mixing digitized inphase IL1 and QL1 signals having carrier frequency with inphase and quadrature components of digital carrier by the CARRIER MIXER 1; (9) performing code correlation of the inphase IL1 and quadrature QL1 signals with the locally generated replica of C/A code by the CODE MIXER 1 at 3 time points (early, punctual and late) on the autocorrelation function graph creating an early, a punctual and a late sample of the autocorrelation function; (10) integrating the early, punctual and late samples of said autocorrelation function by the block CORRELATORS 1; (11) feeding the MICROPROCESSOR system by an output signal of the CORRELATORS 1 at a rate of L1 C/A code epoch, wherein the MICROPROCESSOR uses the CORRELATORS 1 output signal to develop feedback signals for the carrier tracking loop and for the code tracking loop; (12) providing a clocking signal at C/A code rate and a clocking signal at P code rate by the code numerically controlled oscillator ( CODE NCO); (13) driving the CODE GENERATOR by the C/A code clocking rate and the P code clocking rate; (14) providing a mechanism for alignment of the locally generated replica of C/A code with the incoming satellite C/A code by the CODE NCO; (15) generating an estimate of L1 W code by removing the local replica of L1 P code from the estimate of L1 Y code by the CODE MIXER 2; (16) delaying the L1 W code estimate by the DIGITAL DELAY 1 under the MICROPROCESSOR system control; (17) reducing the bandwidth of the L1 W code estimate by the DIGITAL FILTER 1; (18) sending the delayed and filtered L1 W code estimate to the L2 TRACKER; (19) delaying the P code output from the CODE GENERATOR by the DIGITAL DELAY 2; (20) sending the delayed P code to the L2 TRACKER; (21) altering the resulting delay by the RESOLVER; and (22) sending the L1 C/A code epoch (EP) to the L2 TRACKER.

The step of tracking an enhanced cross correlated W code when Y code is ON and tracking L2 P-code when Y code is OFF by the L2 TRACKER further comprises the steps of: (1) feeding the L2 TRACKER by digitized inphase IL2 and quadrature QL2 of L2 signal outputted by the IF PROCESSOR; (2) synchronously clocking the L2 TRACKER by the SCLK signal outputted by the FREQUENCY SYNTHESIZER; (3) synchronously referencing the L2 TRACKER by the MSEC signal outputted by the FREQUENCY SYNTHESIZER to local reference time; (4) feeding the L2 TRACKER when Y code is ON by the L1 P-code, the filtered estimate of L1 W code, and the L1 C/A EP code generated by the L1 TRACKER; (5) feeding the L2 TRACKER by control signal from the MICROPROCESSOR; (6) generating IL2 and QL2 signals having carrier frequency by the CARRIER NCO MEANS 2; (7) generating inphase IL2 and quadrature QL2 signals having zero carrier frequency by mixing the digitized inphase IL2 and quadrature QL2 signals having carrier frequency with the inphase and quadrature components IL2 and QL2 of digital carrier generated by the CARRIER MIXER 2, wherein when L2 carrier tracking loop is locked via said CARRIER NCO 2 the generated IL2 output contains an estimate of L2Y code and the generated QL2 output contains no signal power; (8) performing code correlation of the IL2 and QL2 having zero frequency signals with outputted by the L1 TRACKER P1 code by the CODE MIXER 3; wherein P1 code represents a locally generated replica of L2 P-code; (9) generating an I estimate of L2 W code and a Q estimate of L2 W code by the CODE MIXER 3; (10) reducing the bandwidth of the I estimate of L2 W code by the DIGITAL FILTER 2; (11) reducing the bandwidth of the Q estimate of L2 W code by the DIGITAL FILTER 3; (12) performing code correlation of the I estimate of L2 W code and the Q estimate of L2 W code with the estimate of L1 W code by the CODE MIXER 4 at 3 time points (early, punctual and late) on the autocorrelation function graph creating an early, a punctual and a late sample of the autocorrelation function; (13) performing code correlation of the I estimate of L2 W code and the Q estimate of L2 W code with the P1 code by the CODE MIXER 5; wherein the P1 code represents a locally generated replica of L2 P code; and wherein the CODE MIXER 5 performs the code correlation at 3 time points (early, punctual and late) on the autocorrelation function graph creating an early, a punctual and a late sample of the autocorrelation function; (14) selecting under the control of MICROPROCESSOR by the MULTIPLEXER 2 the mode of operation when Y code is ON and OFF; and wherein when Y code is OFF and satellite transmits the P code on L2 the MICROPROCESSOR selects the output of CODE MIXER 5; and wherein when Y code is ON the MICROPROCESSOR selects the output of CODE MIXER 4; (15) integrating early, punctual and late samples of the autocorrelation function by the block CORRELATORS 2; and (16) feeding the MICROPROCESSOR by output signals of the CORRELATORS 2, wherein the MICROPROCESSOR uses the CORRELATORS 2 output signals to develop feedback signals for the carrier tracking loop and for the code tracking loop.

Yet one more aspect of the present invention is directed to the methods of acquisition and to the method of tracking of the satellite signals L1 and L2.

The method of acquisition comprises the steps of: (1) locking L1 C/A code tracking loop the MICROPROCESSOR; (2) locking L1 C/A carrier tracking loop by the MICROPROCESSOR; (3) computing the L2 carrier frequency aiding term by the MICROPROCESSOR using the value of L1 frequency; (4) applying the L2 frequency aiding term to CARRIER NCO 2; wherein the L1 and L2 satellite signals are separated in time by ionospheric delay; (5) adjusting the DIGITAL DELAY 1 and the DIGITAL DELAY 2 to compensate for the ionospheric delay between the L1 and said L2 signals until power is found in the L2 CORRELATORS 2; (6) locking the L2 carrier tracking loop using the MICROPROCESSOR; and (7) locking the L2 code tracking loop using the MICROPROCESSOR.

The method of tracking of the satellite signals L1 and a L2 includes the steps of: (1) reading the L1 CORRELATORS and the L2 CORRELATORS by the MICROPROCESSOR; (2) forming the L1 code tracking loop and applying the output to the CODE NCO; (3) forming the L1 carrier tracking loop and applying the output to the CARRIER NCO 1; (4) computing the L2 frequency aiding term; (5) forming the L2 code and carrier tracking loop and applying the output to the DIGITAL DELAY 1, DIGITAL DELAY 2, and CARRIER NCO 2; (6) performing the L1 and L2 carrier phase measurements by reading CARRIER NCO 1's output phase and CARRIER NCO 2's output phase at a chosen MSEC reference time; and (7) performing the L1 and L2 code phase measurements by keeping track in the MICROPROCESSOR of what shifts have been applied to the CODE NCO and DIGITAL DELAY 1 and DIGITAL DELAY 2 respectively.

Yet another aspect of the present invention is directed to a system for optimum correlation processing of L1 and L2 signals received from at least one SPS satellite by a SPS RECEIVER. The system includes an n-bit RECEIVER, n being integer, comprising an n-bit A/D CONVERTER for receiving a known C/A code modulated on L1 carrier frequency, for receiving an unknown Y code modulated on L1 carrier frequency signal, and for receiving an unknown Y code modulated on L2 carrier frequency signal, wherein the received L1, and L2 signals contain propagation noise; and wherein the Y code comprises a known PP codecode and an unknown W code; and at least one n-bit DIGITAL CHANNEL PROCESSOR for: (1) locally generating replica of the C/A code modulated on L1 carrier frequency signal; (2) locally generating replica of the P code modulated on L1 carrier frequency signal, wherein the locally generated replica of L1 signal does not contain propagation noise; (3) extracting of an estimate of the Y code from the L1 signal, and from the L2 signal, wherein the estimate signals contain propagation noise; (4) correlating a locally generated replica of C/A code with the received L1 code for obtaining an estimate of L1 group delay (L1 pseudo-range) and L1 carrier phase; (5) removing the P code from the locally extracted estimate of the L1 Y code to obtain a locally extracted estimate of the L1 W code; (6) removing the P code from the locally extracted estimate of the L2 Y code to obtain a locally extracted estimate of the L2 W code; and (7) correlating the locally extracted estimate of L1 W code with the locally extracted estimate of L2 W code to obtain relative offset in group delay between L1 and L2 signals and for obtaining an independent estimate of L2 carrier phase; wherein using the n-bit RECEIVER comprising an n-bit A/D CONVERTER and the n-bit DIGITAL CHANNEL PROCESSOR reduces quantization noise as compared to using a one-bit RECEIVER comprising a one-bit A/D CONVERTER and a one-bit DIGITAL CHANNEL PROCESSOR.

One more aspect of the present invention is directed to the method for optimum correlation processing of L1 and L2 signals received from at least one SPS satellite by a correlation processing system; wherein the system includes an n-bit RECEIVER and at least one n-bit DIGITAL CHANNEL PROCESSOR, n being an integer; and wherein using the n-bit RECEIVER and the n-bit DIGITAL CHANNEL PROCESSOR reduces quantization noise as compared to using a one-bit RECEIVER and a one-bit DIGITAL CHANNEL PROCESSOR.

BRIEF DESCRIPTION OF THE DRAWINGS.

FIG. 1 illustrates a simplified block-diagram of the W code enhanced GPS RECEIVER having two major parts—a RECEIVER and a DIGITAL CHANNEL PROCESSOR.

FIG. 2 shows a FILTER/low noise amplifier LNA for filtering and amplifying L1 and L2 signals.

FIG. 3 depicts a MASTER OSCILLATOR for generating timing signals with reference frequency 10 MHz and 5 MHz.

FIG. 4 illustrates a FREQUENCY SYNTHESIZER for outputting a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

FIG. 5 shows a DOWNCONVERTER for converting a L1 signal into a 175.42 MHz signal and for converting a L2 signal into a 172.4 MHz signal.

FIG. 6 is an illustration of a IF (intermediate frequency) PROCESSOR for generating digitized output samples of the GPS signals with carrier frequencies of 420 KHz and 2.6 MHz respectively.

FIG. 7 depicts a DIGITAL CHANNEL PROCESSOR including an L1 TRACKER, an L2 TRACKER, and a MICROPROCESSOR SYSTEM.

FIG. 8 shows a L1 TRACKER for tracking L1 C/A code when Y code is ON.

FIG. 9 illustrates a L2 TRACKER for facilitating the combining of an estimate of the L1 W code with an estimate of the L2 W code.

FIG. 10a is a depiction of a first CARRIER (numerically controlled oscillator) NCO 1 for performing the carrier phase measurements of L1 signal.

FIG. 10b is an illustration of a second CARRIER (numerically controlled oscillator) NCO 2 for performing the carrier phase measurements of L2 signal.

FIG. 11a shows a first CARRIER MIXER 1 for mixing the sampled signal L1 at 420 kHz frequency to baseband frequency.

FIG. 11b illustrates a second CARRIER MIXER 2 for mixing the sampled signals L2 at 2.6 MHz frequency to 0 Hz frequency.

FIG. 12a depicts a first CODE MIXER 1 for correlating the L1 C/A code with a locally generated version of the C/A code.

FIG. 12b is an illustration of a second CODE MIXER 2 for mixing the L1 Y code with a locally generated version of the P code.

FIG. 12c is a depiction of a third CODE MIXER 3 for removing the P code from the estimated L1 Y code by mixing the estimated L1 Y code with a local replica of the known L1 P code.

FIG. 12d shows a fourth CODE MIXER 4 for code correlating the I and Q versions of the L2 signal with the E,P, and L samples of the locally generated estimate of the W1 code.

FIG. 12e illustrates a fifth CODE MIXER 5 for code correlating the I and Q versions of the L2 signal with the locally generated estimate of the L2 P code (P1 code).

FIG. 13 depicts a CODE GENERATOR for generating a signal P1 which can be used by the L2 TRACKER to remove P code from the estimated L2 Y code to produce an estimate of the L2 W code.

FIG. 14a shows a DIGITAL DELAY 1 for bringing the filtered L1 and L2 W code estimates into alignment to measure the range offset between L1 and L2 signals.

FIG. 14b illustrates a DIGITAL DELAY 2 for providing the delay of the P code output of the CODE GENERATOR which is used as P1 code by the L2 TRACKER.

FIG. 15a depicts a DIGITAL FILTER 1 for reducing the bandwidth of the L1 W code estimate to less than 12.5 MHz.

FIG. 15b shows a DIGITAL FILTER 2 for reducing bandwidth of the I estimate of the L2 W code.

FIG. 15c is an illustration of a DIGITAL FILTER 3 for reducing the bandwidth of the Q estimate of the L2 W code.

FIG. 16a depicts a block CORRELATORS 1 for integrating the early, punctual and late samples of the autocorrelation function of the L1 C/A code (or L1 P code) signal over the period of the L1 C/A code epoch signal (1 KHz).

FIG. 16b shows a block CORRELATORS 2 for integrating the early, punctual and late samples of the autocorrelation function of the I and Q versions of the correlation between filtered estimates of L1 and L2 W codes over the period of the L1 C/A code epoch signal (1 KHz).

FIG. 17 illustrates a CODE NCO (numerically controlled oscillator) for providing a clock at C/A and P code rates that drives the CODE GENERATOR.

FIG. 18a depicts an ACQUISITION block diagram illustrating the signal acquisition phase of the MICROPROCESSOR SYSTEM.

FIG. 18b shows a TRACKING block diagram illustrating the signal tracking phase of the MICROPROCESSOR SYSTEM.

FIG. 19 illustrates a RESOLVER block for improving the hardware resolution of the L1 to L2 hardware range measurements.

FULL DESCRIPTION OF THE PREFERRED EMBODIMENT

FIG. 1 illustrates a block diagram 10 of the GPS RECEIVER capable of demodulating the L2 signal modulated by the secret W code which is the subject of the present invention. The signal L2 is-generated by at least one satellite. Each satellite generate different signals and they are processed by different DIGITAL CHANNEL PROCESSORS, which operate exactly the same way.

FIG. 1 is an overview of the GPS receiver, all elements of which are explained in detail below. The GPS signals (L1=1575.42 MHz, L2=1227.60 MHz) enter through a dual frequency patch ANTENNA 12. The GPS ANTENNA may be a magnetically mountable model 21423-00 commercially available from Trimble Navigation of Sunnyvale, Calif. The MASTER OSCILLATOR 28 provides the reference oscillator which drives all other clocks in the system. The FREQUENCY SYNTHESIZER 18 takes the output of the MASTER OSCILLATOR and generates important clock and local oscillator frequencies used throughout the system.

A FILTER/LNA 14 performs filtering and low noise amplification of both L1 and L2 signals. The noise figure of the RECEIVER system is dictated by the performance of the FILTER/LNA combination. The DOWNCONVERTER 16 mixes both L1 and L2 signals in frequency down to approximately 175 MHz and outputs the analogue L1 and L2 signals into an IF PROCESSOR 30. The IF PROCESSOR takes the analog L1 and L2 signals at approximately 175 MHz and converts them into the digitally sampled L1 and L2 inphase and quadrature signals at carrier frequencies 420 KHz for L1 and at 2.6 MHz for L2 signals respectively.

At least one DIGITAL CHANNEL PROCESSORS 32 input the digitally sampled L1 and L2 inphase and quadrature signals. All DIGITAL CHANNEL processors are identical by design and operate on identical input samples. Each DIGITAL CHANNEL PROCESSOR is designed to digitally track the L1 and L2 signals produced by one satellite by tracking code and carrier signals and to perform code and carrier phase measurements in conjunction with the MICROPROCESSOR SYSTEM 34. One DIGITAL CHANNEL PROCESSOR is capable of tracking one satellite in both L1 and L2 channels. MICROPROCESSOR SYSTEM is a general purpose computing device which facilitates tracking and measurements processes, providing pseudorange and carrier phase measurements for a NAVIGATION PROCESSOR 38. The NAVIGATION PROCESSOR performs the higher level function of combining measurements in such a way as to produce position, velocity and time information for the differential and surveying functions.

FIG. 2 shows the detailed embodiment of the FILTER/LNA 40. The L1/L2 signal from the ANTENNA 12 is power split by POWERSPLITTER 44 into L1=1575.42 MHz signal 46 and L2=1227.60 MHz signal 48. The L1 and L2 signals are separately bandpass filtered by the BANDPASS FILTERs 50 and 52 with bandwidth BW=30 MHz. Filtered L1 signal 54 and L2 signal 56 are recombined in a POWER COMBINER 58 before being fed into the low noise amplifier LNA 60. The output signal 62 represents filtered and amplified L1/L2 signal at 1575.42MHz and 1227.60 MHz respectively.

The MASTER OSCILLATOR 70 is depicted in FIG. 3. The 5 MHz signal 76 is obtained by dividing the 10 MHz oscillator output signal 72 by 2 in the DIVIDE BY 2 block 74.

FIG. 4 illustrates the FREQUENCY SYNTHESIZER 80 which takes as an input the 5 MHz signal 82 provided by the MASTER OSCILLATOR and outputs a 1st LO1 signal 90, a 2nd LO2 signal 102, a SCLK signal 100, and a MSEC signal 104; wherein these timing signals are used by different blocks of the GPS RECEIVER.

The 5 MHz signal 82 is compared with the 5 MHz signal output from a block "DIVIDE BY 5" in a PHASE DETECTOR 84. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 86 filters out the high frequency voltage noise signal having a large phase error and outputs the low frequency noise signal 87 having a small phase error which is applied to a voltage controlled oscillator (VCO) 88. The low frequency noise signal 87 causes frequency change in the VCO output signal 90. When the loop is locked, the VCO output signal having a 1400 MHz frequency is used as the 1st LO1 (local oscillator) signal. By dividing the 1st LO1 signal by 8, a block 92 "DIVIDE BY 8" outputs the 2nd LO2 local oscillator signal 102 having 175 MHz. A block 94 "DIVIDE BY 7" divides the LO2 signal and outputs the sampling clock (SCLK) signal 100 having 25 MHz. A block 98 "DIVIDE BY 25000" further divides the SCLK signal and outputs the MSEC signal 104 having 1 KHz which is used by the system for measurement of local reference time. A "DIVIDE BY 5" block 96 is used to close the LO1 loop.

The DOWNCONVERTER 110 is depicted in detail in FIG. 5 which decreases the frequency of the L1/L2 signal outputted by the FILTER/LNA The L1/L2 signal output 62 from the FILTER/LNA shown in FIG. 2 (L1=1575.42 MHz; L2=1227.60 MHz) is split in a POWER SPLITTER 116 into two signals L1 signal 118 and L2 signal 120. The L1 and L2 signals are mixed separately by the 1st LO1 1400 MHz signal 90 ( outputted by the FREQUENCY SYNTHESIZER in FIG. 4) in the MIXERs 122 and 124. The L1 signal 118 after mixing becomes an L1 signal 123 signal having 175.42 MHz frequency=(1575.42−1400) MHz which is bandpass filtered by the BANDPASS FILTER 126 having a bandwidth BW=30 MHz. This operation results in a L1 signal having a BW=30 MHz. Similarly, the L2 signal after being mixed in the BANDPASS FILTER 128 with BW=30 MHz becomes an L2 signal 132 having 172.40 MHz frequency and BW=30 MHz. The AMPLIFIERs 134 and 136 respectively amplify the L1 signal 130 and L2 signal 132 and output L1 signal 138 and L2 signal 140.

FIG. 6 describes an IF (intermediate frequency) PROCESSOR which has as input signals the L1 (175.42 MHz) signal 138 and the L2 (172.4 MHz) signal 140 outputted by the DOWNCONVERTER 110.(See FIG. 5). The IF PROCESSOR also uses the 2nd. LO2 signal 102 and the SCLK signal 100 outputted by the FREQUENCY SYNTHESIZER 80 (see FIG. 4) as its timing signals. The POWERSPLITTERs 142 and 170 split the L1 and the L2 signals into two L1 and L2 signals respectively. The inphase (I) version 102 and generated by a 171 block 90° the quadrature (Q) version 173 (175) of the 2nd LO2 signal (175 MHz) are multiplied by the L1 signal in the MULTIPLIERs 144, and 146 to produce the inphase version IL1 and the quadrature version QL1 of the L1 signal at frequency 420 KHz=175.42 MHz–175 MHz and at 25 MHz sampling rate. Similarly, the inphase IL2 and the quadrature QL2 versions of the L2 signal at frequency 2.6 MHz=(175 MHz–172.4 MHz) and at 25 MHz sampling rate are generated in the MULTIPLIERs 172 and 174. The IL1 signal is lowpass filtered by a LOWPASS FILTER 148 with the BW=12.5 MHz which satisfies the Nyquist Theorem for 25 MHz sampling rate of the IL1 signal, amplified by an AMPLIFIER 152, converted by an A/D CONVERTER 156, and sampled by clocking the input signal 157 through a 160 FLIP-FLOP 1 at sampling clock (SCLK) rate. The A/D conversion can be performed by using an L-bit quantization operation, L being an integer greater or equal to 1. If L=1, the 1-bit quantization is performed and the output signal 164 contains only the Most Significant Bit (MSB) of the IL1 signal at 420 KHz. The QL1 signal is similarly processed by a LOWPASS FILTER 150, an AMPLIFIER 154, an A/D CONVERTER 158, and a FLIP-FLOP 2, wherein the output 166 signal is a digitized QL1 signal at 420 KHz. The L2 signal is being processed by a LOWPASS FILTER 176 (178) an AMPLIFIER 180 (182), an A/D CONVERTER 184 (186), and a 188 (190) FLIP-FLOP 3(4) respectively to produce an inphase version IL2 ( quadrature version QL2) of the output signal 192 (194) at 2.6 MHz. Thus, the digital output of IF PROCESSOR block are the sampled versions of GPS signal with carrier frequencies of 420 KHz and 2.6 MHz respectively. The samples include all visible satellite carrier and codes at the respective frequencies.

A DIGITAL CHANNEL PROCESSOR 202 (the number of channels is equal to the number of satellites that are available for reception by the GPS ANTENNA) given in FIG. 7 includes two main subprocessors: an L1 TRACKER 204 and an L2 TRACKER 206 which are controlled by the MICROPROCESSOR SYSTEM 218. The inputs represent the digital signals IL1 164, IL2 192, QL1 166, and QL2 194 outputted by the IF PROCESSOR as shown in FIG. 6. The timing signals SCLK 100 and MSEC 104 are supplied by the FREQUENCY SYNTHESIZER 80 as depicted in FIG. 4. The L1 TRACKER 204 is designed to track L1 C/A code when Y code is ON (and to track L1 P code when Y code is OFF). The L2 TRACKER 206 is designed to track the enhanced W code cross correlation when Y code is ON (and to track L2 P code when Y code is OFF). Operation of the L2 TRACKER is dependent on three signals P1 208, W1 210, and EP 212 outputted by the L1 TRACKER when Y code is ON, wherein the P1 signal is a locally generated L1 P code, the W1 signal is a filtered estimate of L1 W code signal, and the EP signal is a C/A code epoch from an L1 C/A CODE GENERATOR. All signals in each digital channel processor are clocked synchronously with the sampling clock SCLK 100. MSEC signal 104 is used to synchronize each digital channel processor's measurements to local reference time. The MICROPROCESSOR SYSTEM 218 coordinates the performance of the L1 TRACKER and the L2 TRACKER by employing control signals 216, 214, and 220.

The L1 TRACKER 204 (see FIG. 7) designed for tracking L1 C/A code when Y code is ON and L1 P code when Y code is OFF is given in FIG. 8. The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block 262 CORRELATORS 1, wherein the received code is multiplied by a reference code having a time offset $\tau<T$; T being a code chip interval. The code correlation is performed at 3 time points (E-early, P-punctual and L-late) on the autocorrelation function graph. The E, P, and L samples of the autocorrelation function are integrated in the block CORRELATOR 1. However, the CORRELATORs 1 output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block 270 CODE NCO) or clock. This clock CODE NCO in turn drives the CODE GENERATOR 268 in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The RECEIVER also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the user RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be 4 T if a single RECEIVER is time sequenced over the four satellites.

Referring again to FIG. 8, the locally generated code (C/A when Y code is ON, and P code when Y code is OFF) is selected under the control of the 264 MULTIPLEXER 1. The 244 CARRIER NCO 1 has output inphase I signal 248 and quadrature Q signal 250 which are inphase and quadrature digital carrier at a rate which is phase locked to incoming signals via MICROPROCESSOR control of its output frequency. The input sampled signals IL1 164 and QL1 166 (at carrier frequency 420 KHz) are sent to the 246 CARRIER MIXER 1 which uses the output signals I 248 and Q 250 from the CARRIER NCO 1 to perform the frequency translation of the IL1 and QL1 signals from 420 KHz to baseband frequency. Thus, the carrier frequency is removed at this stage. The CARRIER NCO 1 block also performs the carrier phase measurements on the edge of MSEC signal 104. The output samples of the CARRIER MIXER 1 (I signal 252 and Q signal 254) and a locally generated by a CODE GENERATOR 268 replica of C/A code 263 are fed to a 256 CODE MIXER 1 which performs the code correlation.

When the carrier tracking loop is closed (via CARRIER NCO 1) and Y code is ON, the L1 TRACKER 204 is locked to the L1 C/A code satellite signal. Thus, the I input 252 to the 256 CODE MIXER 1 represents the satellite signal L1 C/A code, and the Q input 254 to the CODE MIXER 1 represents L1 Y code signal. When Y code is OFF, the CARRIER MIXER 1 outputs the L1 P code signal in its I channel 252, and outputs L1 C/A code in its Q channel 254. The CODE MIXER 1 performs correlation of the L1 C/A code in I channel and L1 Y code in Q channel with a locally generated version of the C/A code (when Y code is ON), or performs correlation of the L1 P code in I channel and L1 C/A code in Q channel with a locally generated P code ( when Y code is OFF). The result is the autocorrelated function of the C/A code in I channel 258 and noise in Q channel 260 when Y code is ON, and the autocorrelated function of the P code in I channel 258 and noise in Q channel 260 when Y code is OFF. The code correlation is performed at 3 time points (E-early, P-punctual and L-late) on the autocorrelation function graph. The E, P, and L samples of the autocorrelation function 258 and 260 are integrated in the block 262 CORRELATORS 1. The block CORRELATORS 1 is read by the MICROPROCESSOR SYSTEM 263 at a rate of 1 KHz, which is the rate of the L1 C/A code epoch. (The L1 C/A code epoch is the rate at which C/A code repeats itself). The correlator values are used by the MICROPROCESSOR SYSTEM to develop feedback for the carrier tracking loop via CARRIER NCO 1 and code tracking loop via CODE NCO.

The CODE NCO 270 provides the clock at C/A code rate when Y code is ON, and at P code rate when Y code is OFF, that drives the CODE GENERATOR 268. The CODE NCO also provides the mechanism by which the local code can be shifted into alignment with the incoming satellite code to achieve the code tracking loop lock.

When the L1 TRACKER is locked to L1 C/A code, the Q output 251 of the CARRIER MIXER 1 represents an estimate of the L1 Y code which is fed to a CODE MIXER 2 (278). The CODE MIXER 2 removes P code from the estimated L1 Y code by mixing it with a local replica of the known L1 P code. The output 277 of the CODE MIXER 2 thus represents an estimate of the L1 W code having a bandwidth (BW) of 12.5 MHz. A DIGITAL FILTER 1 (274) takes this L1 W code estimate signal and reduces the BW to approximately 700 kHz. Thus, the output signal 210 from the DIGITAL FILTER 1 represents a filtered estimate of the L1 W code with the reduced BW. A DIGITAL DELAY I (276) is used to delay under the MICROPROCESSOR SYSTEM control the filtered L1 W code estimate so that it becomes aligned in time with the filtered L2 W code estimate formed in the L2 TRACKER (see discussion below). The delay created by the DIGITAL DELAY 1 which is sufficient to bring the filtered L1 and L2 W code estimates into alignment represents a measurement of the range offset between L1 and L2 signals. If the resolution of the digital delay is limited to SCLK then the range resolution in hardware will be 12 meters which is the period of 25 MHz clock. The hardware resolution of this range is improved using a RESOLVER circuit 242.

The RESOLVER circuit provides an output signal 243 which can be used to create a resulting delay which is the combination of two delays, wherein each register provides a delay equal to the sample clock SCLK. The resulting delay is proportional to the relative time spent on each delay created by registers 1 and 2. (See FIG. 14a for the DIGITAL DELAY 1 and FIG. 14b for the DIGITAL DELAY 2).

EXAMPLE 1

If 50% of time is spent on delay from register 1 (one SCLK) and 50% time on delay from register 2 (two SCLK), then resulting delay will be (1SCLK+2SCLK)/2=1.5 SCLK.

The delayed and filtered L1 W code estimate 210 is outputted as signal W1 or processing by the L2 TRACKER. The CODE GENERATOR P code output 269 is delayed in DIGITAL DELAY 2 to provide a signal P1 (208) which can be used by the L2 TRACKER as its locally generated L2 P code for removing P code from the L2Y code estimate and for producing an estimate of the L2 W code. The L1 C/A code epoch (EP) 212 is also sent to the L2 TRACKER for providing a timing signal for the L2 TRACKER's block CORRELATORS 2.

The L2 TRACKER 206 illustrated in FIG. 9 is designed to facilitate the combining of an estimate of the L1 W code with an estimate of the L2 W code, wherein the code and carrier tracking of the L2 signals is accomplished and the code and carrier measurements of the L2 signals are available.

Operation of CARRIER MIXER 2, CARRIER NCO 2, CODE MIXER 3 and 4, DIGITAL FILTERs 2 and 3, and CORRELATORS 2 are functionally equivalent to their L1 TRACKER's counterparts.

The CARRIER MIXER 2 (302) performs the frequency translation of the L2 signal. It takes the inphase I version of the L2 signal 198 and the quadrature version Q of the L2 signal 194 at carrier frequency 2.6 MHz generated by the IF PROCESSOR (as shown in FIG. 6). When the carrier tracking loop is locked, the CARRIER MIXER 2 outputs an IL2 signal 305 in a 12.5 MHz bandwidth. The Q output 306 contains no signal power when the L2 carrier tracking loop is locked. The CARRIER NCO MEANS 2 (300) provides the local oscillator for this frequency transition. The IL2 output 305 and the QL2 output 306 from the CARRIER MIXER 2 are fed into a CODE MIXER 3 (310) which performs the code correlation with P1 signal 208 (locally generated by the CODE GENERATOR of FIG. 8 estimate of the L2 P code). The output signals of CODE MIXER 3 represent I estimate 320 and Q estimate 322 of the L2 W code in a 12.5 MHz bandwidth, wherein the I estimate 320 is filtered in the DIGITAL FILTER 2 (324), and wherein the Q estimate 322 is filtered in the DIGITAL FILTER 3 (326). This filtering operation is identical to the operation performed on the estimate of L1 W code by the DIGITAL FILTER 1 (see FIG. 8). The filtered version in I(330) and Q (332) channels of the estimate of L2 W code having the reduced bandwidth are fed into a CODE MIXER 4 (328) where they are correlated with the estimate of L1 W code (W1 signal 210 generated by the L1 TRACKER as shown in FIG. 8). The output of the CODE MIXER 4 represents the I version 334 and the Q version 336 of the three samples E,P, and L of the correlation function between the filtered estimates of L1 and L2 W codes. The CODE MIXER 5 (308)

performs the code correlation at 3 time points (E- early, P-punctual, and L-late) creating three samples of the correlation function between outputted by the CARRIER MIXER 2 signals in the channel I (305) and in the channel Q (306) with the P1 code 208 outputted by the L1 TRACKER.

A MULTIPLEXER 2 (318) selects under the control of the MICROPROCESSOR the mode of operation when Y code is ON and OFF. When Y code is OFF the MICROPROCESSOR selects the output of CODE MIXER 5, and when Y code is ON the MICROPROCESSOR selects the output of the CODE MIXER 4.

The signals outputted by the CODE MIXER 4 or 5 are integrated in the block 316 CORRELATORS 2 in the manner similar to the operation of the block CORRELATORS 1 in the L1 TRACKER described in FIG. 8 above. The CORRELATORS 2 is read by the MICROPROCESSOR SYSTEM 218 at a 1 KHz rate. The correlation sums (E, P, and L samples in the I and Q channels) are used by the MICROPROCESSOR SYSTEM to provide estimates of phases and to facilitate feedback signals for the code and carrier tracking loops.

FIG. 10a illustrates the CARRIER NCO 1 (244) used in the L1 TRACKER for removing the carrier frequency from the IL1 and QL1 signals. This device is described in the article "All-Digital GPS Receiver Mechanization" by Peter Ould and Robert VanWechel, pp. 25–35, "Global Positioning System", Vol. II, The Institute of Navigation, Alexandria, Va., 1984. This paper is incorporated herein by reference.

The CARRIER NCO 1 includes a 32-bit ACCUMULATOR 406 which is caused to overflow periodically at the desired output frequency. The ACCUMULATOR's L-top bits, L is an integer greater or equal to 1, can be used as the CARRIER NCO 1 output wave for producing a carrier mixing signal used by the CARRIER MIXER 1 ( see FIG. 8) for frequency translation. The L=1 results in the relatively strong quantization noise produced by the one-bit approximation of the output sine wave. For all practical purposes, L=3 is sufficient to significantly reduce the quantization noise.

The satellite speed is not constant even if the RECEIVER is not movable. The RECEIVER's quartz clock is not precise enough and keeps changing all the time. Those are the two main reasons why the frequency of the received satellite signal keeps changing. To accommodate for those changes the MICROPROCESSOR keeps the carrier tracking loop locked by continuously adjusting the frequency word outputted by the CARRIER NCO.

The average CARRIER NCO 1 output frequency Four can be expressed as: Fout=(Wc/$2^n$)Fc; where Wc is the frequency word given by (B1 ... BL), Fc is the NCO clock frequency which is SCLK (25 MHz), n is the length of NCO frequency word in bits (a typical value might be 24 bits).

EXAMPLE 2

If we wish to generate the frequency Fout=420 KHz, we should use the frequency word: Wc=(Fout*$2^n$)/Fc=(420 KHz*$2^{24}$)/25 MHz=044D01(hex). The value of Wc is being continuously adjusted by the MICROPROCESSOR SYSTEM to keep the carrier tracking loop locked.

The MICROPROCESSOR controls the CARRIER NCO frequency by latching in a new frequency word (B1 ... Bn) in a LATCH 1 (404). The frequency word (B1 ... Bn) is added to the previous CARRIER NCO 1 output sum (Q1 . . . Qn) on each sample clock (SCLK) 100. The L-top bits of the ACCUMULATOR output wave (Q1 ... QI) are used as the CARRIER NCO 1 output wave in the I channel 248.

The first two bits (R1R2) of the carrier Q output signal 432 are generated by a first ADDER 1 (414) by adding two bits (01) (428 and 430) to the two first bits S1(424) and S2 (424) of the CARRIER NCO MEANS 1 output signal 407 (S1 . . . Sn). There are the following possibilities: (S1, S2)=(0,0)=0 degrees; (0,1)=90 degrees; (1,0)=180 degrees; (1,1)=270 degrees. A third LATCH 3 (416) generates a quadrature version Q of carrier output signal L1 (250) in the form of L-bit word (R1 R2 S3 . . . SL)=(M1 . . . ML) by clocking in at the rate of SCLK signal the 2-top bits (R1 R2) and the L-2 least significant bits (S3 . . . SL).

When the carrier tracking loop is locked, the output of the CARRIER NCO represents the phase of the local carrier which provides the phase lock with the satellite signal. The top m bits (C1 . . . Cm) latched by a second LATCH 2 (412) on the MSEC timing signal represent a carrier phase measurement at this time. FIG. 10b illustrates the CARRIER NCO 2 (300 in FIG. 9) which functions in the same way as the discussed above CARRIER NCO 1.

The CARRIER MIXER 1 (246) shown in FIG. 11a is used by the L1 TRACKER to perform the frequency translation of the IL1 signal (164) and QL1 signal (166) outputted by the IF PROCESSOR to the baseband frequency signals I (252) and Q (254) using the I (248) and Q (250) output frequency words of the CARRIER NCO 1 according to the standard complex mixing operation:

$$Iout=(IL1)^*I+(QL1)^*Q;\ Qout=(IL1)^*Q-(QL1)^*I.$$

MULTIPLIERS (450, 452, 454 and 456) and ADDERS (458 and 460) are employed in the CARRIER MIXER 1 246 to perform these operations and to obtain the output signals Iout (252) and Qout (254). FIG. 11b illustrates the CARRIER MIXER 2 (300) employed by the L2 TRACKER to perform the same operation on the L2 signal.

The CODE MIXER 1 (256 in FIG. 8) depicted in FIG. 12a removes the code frequency from the satellite signals L1 and L2 and allows to demodulate the information contained in the L1 and L2 signals. The function of all CODE MIXERs is similar to the function of the CODE MIXER 1. The signals I (252) and Q (254) outputted by the CARRIER MIXER 1 are multiplied by the early (480), punctual (482), and late (484) samples of the locally generated by the CODE GENERATOR C/A code 263. This operation is performed by MULTIPLIERs 1 (490), (492), (494), (496), (498), and (500) resulting in the early (258,1), punctual (258,2) and late (258,3) samples of the I signal; and in the early (260, 1), punctual (260,2) and late (260,3) samples of the Q signal. The operation of the CODE MIXER 5 shown in FIG. 12e is analogous to the operation of the CODE MIXER 1.

FIG. 12b illustrates the CODE MIXER 2 (278 in FIG. 8), wherein the incoming L1 Y signal 251 is multiplied with the locally generated L1 P code (279) by the MULTIPLIER 502 to produce the W code signal 277. The CODE MIXER 3 (310 in FIG. 9) is shown in FIG. 12c, wherein the outputted by the CARRIER MIXER 2 inphase I signal 305 and quadrature Q signal 306 is multiplied by the MUPTIPLIERs 504 and 506 with the P1 signal 208 outputted by the L1 TRACKER. FIG. 12d depicts the CODE MIXER 4 (328 in FIG. 9). The early sample 210, 1 of the W 1 signal outputted by the L1 TRACKER is multiplied by the MULTIPLIER I (508) with the I signal 330 produced by the DIGITAL FILTER 2 to generate the early sample of the I signal 334, 1. The MULTIPLIERs 510, and 512 operate in the same way producing the punctual samples of I signal 334,2 and the late sample of I signal 334, 3. The early, punctual and late samples of the Q signal are produced by the MULTIPLIERs 514, 516, and 518.

The CODE GENERATOR (268 in FIG. 8) shown in FIG. 13 is employed by the L1 TRACKER to locally generate replica of the C/A code 265, replica of P code 269, and EPOCH signal 212 which are used for the purposes of code correlation. The input 271 of the CODE NCO 270 provides the clock and is a nominal 10.23 MHz- the P code rate. The input signal 271 is divided by 10 by the block DIVIDE BY 10 (520) to provide the C/A code generator clock at 1.023 MHz. The C/A CODE GENERATOR 522 and the P CODE GENERATOR 524 are the standard shift register sequences described in the "Interface Control Document" of Rockwell International Corporation entitled "Navstar GPS Space Segment/Navigation User Interfaces", dated Sep. 26, 1984, as revised Dec. 19, 1986, hereinafter referred to as the "ICD-GPS-200". The C/A code repeats every millisecond and produces a standard timing signal at this rate known as a timing signal for both CORRELATORS 1 and 2.

The DIGITAL DELAY 1 (276 in FIG. 8) given in FIG. 14a is employed by the L1 TRACKER for digitally delaying the L1 (1575.42 MHz) signal relatively to the L2 (1227.60 MHz) signal in order to compensate for the ionospheric delay. The L2 signal is delayed more by the ionosphere than L1 signal. Thus, to align L1 and L2 signals inside the RECEIVER it is sufficient to artificially delay L1.

The L1 W signal 277 can be delayed by different sampling clock delays as dictated by the MICROPROCESSOR SYSTEM. A SHIFT REGISTER (1, 2, ... k) 526 includes k different registers, k is an integer, wherein one register shifts the signal by one sample clock (25 MHz).

The DIGITAL DELAY 2 of FIG. 14b (272 in FIG. 8) has the same design as the DIGITAL DELAY 1. The DIGITAL DELAY 2 is used for delaying the L1 locally generated P code 279 by 2 sample clocks to obtain the clock signal P1 208 employed by the L2 TRACKER.

The DIGITAL FILTERs 1,2 and 3 are used to reduce the BW of the input signals (12.5 MHz) such that the output signals have the BW that is approximately equal to 700 KHz. The DIGITAL FILTER 1 (274 of FIG. 8) given in FIG. 15a is used to filter the estimate of the L1. W code 275. The output W signal (561) is given by: Wout=C1W1+C2W2+...+CxWx; wherein Cx is the Xth filter coefficient (558) and Wx is the Xth input which is the input W (275) shifted by X samples in the SHIFT REGISTER 550. The filter coefficients C1, C2, ... Cx are multiplied by W1, W2, ... Wn in the MULTIPLIERS 554, 556, ... 558 respectively. The Wout signal 561 is reduced in sample frequency by a factor K by using a DIVIDE by K block 552. Early (210, 1), punctual (210,2) and late (210,3) samples of the estimated L1 W code signal are formed in the SHIFT REGISTER 562 using the Wout signal 561. The DIGITAL FILTER 2 (324) of FIG. 15b is similar to the DIGITAL CHANNEL 1, but only the single sample of the output signal 330 in the inphase I channel is formed. The DIGITAL FILTER 3 of FIG. 15c outputs the signal 332 in the Q channel.

The function of the CORRELATORS I (262 of FIG. 8) given in FIG. 16a is to integrate the correlated samples IE (inphase early), IP (inphase punctual), IL (inphase late), QE (quadrature early), QP (quadrature punctual), and QL (quadrature late) of the L1 C/A (or P) satellite code with the locally generated version of C/A (or) P code across a time period given by a multiple of C/A EPOCH signals. The input sample IE (334, 1) is integrated in an UP/DOWN COUNTER 630 across a period defined by the C/A EPOCH signal.212, wherein the COUNTER adds if the input is positive and subtracts if it is negative. At the end of the integration period the correlator summations are read by the MICROPROCESSOR using a LATCH 642. Each of the IP,IL,QE,QP,and QL samples is similarly integrated by a separate UP/DOWN COUNTER.

The resulting alter integration values of IE,IL,QE, and QL are used by the code tracking loop by forming a code phase estimate=K1(IE–IL), when the carrier loop is locked, or by forming a code phase estimate=K1[(IE$^2$+QE$^2$)$^{1/2}$–(IL$^2$+QL$^2$)$^{1/2}$], when the carrier loop is not locked. K1 is a L1 code loop gain factor. The IP and QP are used by the carrier tracking loop which forms a carrier phase estimate= arctan(QP/IP). The block CORRELATORS 2 (316 of FIG. 9) given in FIG. 16b is functionally similar to the block CORRELATORS 1.

The CODE NCO (270 of FIG. 8) given in FIG. 17 provides a clock at 10.23 MHz for the CODE GENERATOR in its NORMAL mode of operation. It can also shift the CODE GENERATOR early or late under the MICROPROCESSOR control by shifting its output phase in its SHIFT mode. The CODE NCO output 271 controls the phase of the locally generated codes (P and C/A) and provides the code tracking loop feedback adjustment. The CODE NCO includes a 12-bit ADDER 662 and a 12-bit LATCH. On each sample clock edge the output of the LATCH 666 is added to the output of the MULTIPLEXER 660. In the NORMAL mode of operation the output of the MULTIPLEXER is a 12-bit number N unless Q12 is 1; if Q12 is equal to 1 the output is a 12-bit number M. Thus, in the NORMAL mode the CODE NCO outputs a frequency: CODE NCO out=(N× SCLK)/(2$^{12}$–M+N).

EXAMPLE 3

Given the clock SCLK=25 MHz, in order to obtain the CODE NCO output frequency=P code rate=10.23 MHz it is sufficient to choose N=1023 and M=2619. Under the SHIFT mode the shifting of the CODE NCO output frequency is accomplished by replacing the NORMAL mode MULTIPLEXER output (N or M) by SHIFT under the MICROPROCESSOR control. If this is the case, the code phase shift is given by: code phase shift=(M–SHIFT)/(2$^{12}$–M+N), where the code shift is measured in units of sample clocks. The code shift allows to accommodate for the shift in the CODE GENERATOR frequency required for the locking of the code tracking loop.

The RESOLVER of FIG. 19 (see 242 of FIG. 8) has the function to improve the hardware resolution of the L1 to L2 hardware range measurement. The (L2–L1) range is formed by aligning the L1 W code with the L2 W code via DIGITAL DELAY 1 and 2. The delay value is the offset range between L1 and L2. The digital delays being clocked at SCLK=25 MHz have the resolution of 12 meters=(speed_of_light/ SCLK). In order to gain more precision, it is sufficient to toggle the digital delay between the two delays, wherein the resulting delay is the average of the relative time spent on each delay. The RESOLVER output 243 provides a signal with a controllable mark/space ratio to toggle between the two delays. The COUNTER 680 and the FLIP-FLOP 684 are reset to digital 0 on the MSEC signal 104. The COUNTER counts until it reaches a COMPARATOR's (682) input value which is given by the CONTROL signal 216 provided by the MICROPROCESSOR. At this point the FLIP-FLOP is clocked to digital 1. This process is repeated every millisecond. The resulting delay is given by:
digital delay=delay 1+(25000–m)/25000 in sample clock units;
where m is a mark/space ratio.

The operation of the MICROPROCESSOR system is illustrated in FIGS. 18a and 18b. FIG. 18a depicts the signal acquisition phase. At first, the L1 C/A code is locked in the code and carrier tracking loops (690). The 50 Baud data message modulated in the C/A code contains a bit flag which indicates whether Y code is ON or OFF. If Y code is OFF, the RECEIVER will attempt to lock to L1 and L2 P codes in the normal manner. If Y code is ON, the L1 TRACKER will maintain the lock on the L1 C/A code while the RECEIVER attempts to lock the L2 signal in W code enhanced cross-correlation mode. With the L1 C/A code locked, the MICROPROCESSOR computes the L2 frequency from the L1 frequency. The L1 frequency is obtained from the current value of the frequency word written to the CARRIER NCO 1. The L2 carrier frequency is computed from the L1 carrier frequency: L2 carrier freq.=L1 carrier freq.×120/154. The input to the CARRIER NCO 2 is computed as follows:

CARRIER NCO 2 input=[(CARRIER NCO 1input–$W_{L1n}$)×120/154]+$W_{L2n}$; where

CARRIER NCO 2 input=input word to CARRIER NCO 2;

CARRIER NCO 1 input=input word to CARRIER NCO 1;

$W_{L1n}$=zero Doppler L1 frequency word;

$W_{L2n}$=zero Doppler L2 frequency word;

120/154=frequency ratio between L1 and L2 carriers.

This process is called aiding (692). With the frequency aiding term applied to the CARRIER NCO 2 the L2 carrier will be very close in frequency to the incoming L2 signal frequency (<1.0 Hz difference) to accommodate for the L2 signal low signal-to-noise (SNR) ratio. After the aiding process all dynamics from the L2 carrier is removed except the relatively slow ionospheric offset between L1 and L2.

The next step is the adjustment (694) of the DIGITAL DELAYS 1 and 2 to compensate for the ionospheric offset between the L1 and L2 until the L2 power is found in the CORRELATORS 2. The MICROPROCESSOR forms three values to look for power in the CORRELATORS 2:

power1=$EI^2+EQ^2$;
power2=$PI^2+PQ^2$;
power3=$LI^2+LQ^2$.

If any power1,2, or 3 surpass a preset threshold, the power is declared found.

After the power is found in the L2 CORRELATORS, the L2 carrier tracking loop (696) is closed using: L2 estimated carrier phase=arctan (PQ/PI); and the L2 code tracking loop (698) is closed using: L2 estimated code phase=EI–LI. Thus, the acquisition of the satellite signals L1 and L2 has been accomplished.

FIG. 18b depicts the signal tracking operation. At first, both sets of CORRELATORS L1 and L2 are read by the MICROPROCESSOR system (700). Secondly, the L1 code and carrier tracking loops are formed and the digital voltage feedback signals are applied to the CODE NCO and to the CARRIER NCO 1 (702). The next step is the computation of the L2 frequency aiding term (704). The following step is the formation of the L2 code and carrier tracking loops and the application of the digital feedback signals to the DIGITAL DELAYS 1 and 2 and to the CARRIER NCO 2 (706). The L1 and L2 carrier and code phase measurements are then performed. The carrier phase measurements (708) are performed on L1 and L2 by reading the CARRIER NCO 1 and 2 output phase at a chosen MSEC reference time. The L1 and L2 code measurements (710) are performed by keeping track in the MICROPROCESSOR of what shifts have been applied to the CODE NCO and to the DIGITAL DELAYs respectively.

A system and a method for optimum correlation processing of L1 and L2 satellite signals which includes an n-bit RECEIVER, n being integer, and at least one n-bit DIGITAL CHANNEL PROCESSOR is also within the scope of the present invention. The n-bit RECEIVER comprising an n-bit A/D CONVERTER and the n-bit DIGITAL CHANNEL PROCESSOR reduces quantization noise as compared to the one-bit RECEIVER comprising a one-bit A/D CONVERTER and a one-bit DIGITAL CHANNEL PROCESSOR because the n-bit digital approximation of the sine signals is more precise than the 1-bit approximation.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal do not contain propagation noise;

(3) extracting of an estimate of said Y code from said L1 signal, and from said L2 signal, wherein said estimate signals contain propagation noise;

(4) correlating a locally generated replica of C/A code with the received L1 code for obtaining an estimate of L1 group delay (L1 pseudo-range) and L1 carrier phase;

(5) removing said P code from said locally extracted estimate of said L1 Y code to obtain a locally extracted estimate of said L1 W code;

(6) removing said P code from said locally extracted estimate of said L2 Y code to obtain a locally extracted estimate of said L2 W code; and (7) correlating said locally extracted estimate of said L1 W code with said locally extracted estimate of said L2 W code to obtain relative offset in group delay between L1 and L2 signals and for obtaining an independent estimate of L2 carrier phase.

2. The system of claim 1, wherein said RECEIVING MEANS further comprises:

a dual frequency patch ANTENNA MEANS for receiving said L1 and L2 satellite signals;

a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;

a DOWNCONVERTER MEANS conductively connected to said FILTER/LNA MEANS for mixing and converting said L1 and L2 signals; and an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2).

3. The system of claim 2 further comprising a MASTER OSCILLATOR MEANS and a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL, CHANNEL PROCESSING MEANS, wherein said FREQUENCY SYNTHESIZER MEANS generates several timing signals.

4. The system of claim 3, wherein said FILTER/LNA MEANS further comprises:

a POWER SPLITTER MEANS connected to said ANTENNA MEANS for power splitting a single L1/L2 signal received by said ANTENNA MEANS into two separate L1 and L2 signals;

two separate BANDPASS FILTER MEANS connected to said POWER SPLITTER MEANS for filtering said L1 and L2 signals independently; and a POWER COMBINER MEANS connected to said separate BANDPASS FILTER MEANS for power combining said L1 and L2 signals into one combined signal L1/L2 before feeding said combined L1/L2 signal into said LNA;

wherein said LNA outputs amplified and filtered combined L1/L2 signal.

5. The system of claim 3, wherein said FREQUENCY SYNTHESIZER MEANS further comprises:

a PHASE DETECTOR MEANS for comparing phases of two signals, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

a LOOP FILTER MEANS connected to said PHASE DETECTOR MEANS for filtering out high frequency voltage noise, wherein an output LOOP FILTER MEANS voltage signal includes a low frequency voltage noise;

a VOLTAGE CONTROLLED OSCILLATOR (VCO) MEANS connected to said LOOP FILTER MEANS, wherein a voltage signal at the input of said VCO causes frequency change in said VCO output signal, and wherein said VCO nominal output signal is locked to said reference signal; and wherein said VCO nominal output signal is used as 1st local oscillator (LO1) signal;

a first DIVIDER MEANS connected to said VCO to divide said VCO output signal to obtain 2nd local oscillator (LO2) signal;

a second DIVIDER MEANS connected to said first DIVIDER MEANS to divide said 2nd LO2 signal to obtain sampling clock (SCLK); and a third DIVIDER MEANS connected to said second DIVIDER MEANS to divide said 2nd LO2 signal to obtain a signal MSEC, wherein said signal MSEC is used for measurement of local reference time.

6. The system of claim 3, wherein said FREQUENCY SYNTHESIZER MEANS further comprises:

a "Divide by 5" block;

a PHASE DETECTOR MEANS connected to said block "Divide by 5" for comparing 5 MHz input signal from said MASTER OSCILLATOR MEANS with 5 MHz signal from said "Divide by 5" block, wherein minimum voltage output signal from said PHASE DETECTOR MEANS represents maximum phase alignment of two said 5 MHz signals;

a LOOP FILTER MEANS connected to said PHASE DETECTOR MEANS for filtering out high frequency voltage noise;

a VOLTAGE CONTROLLED OSCILLATOR (VCO) MEANS connected to said LOOP FILTER MEANS, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as a 1st local oscillator (LO1);

a "Divide by 8" block connected to said VCO to divide said 1400MHz VCO output signal by 8 to obtain a 175 MHz signal used as a 2nd LO2;

a "Divide by 7" block connected to said "Divide by 8" block to divide said 175 MHz signal by 7 to obtain a 25 MHz signal used as a sampling clock (SCLK); and a "Divide by 25000" block connected to said "Divide by 7" block to divide said 25 MHz signal by 25000 to obtain a 1 KHz signal (MSEC), wherein said MSEC signal is used for measurement of local reference time.

7. The system of claim 2, wherein said DOWNCONVERTER MEANS further comprises: a POWER SPLITTER MEANS connected to said FILTER/LNA MEANS and to said frequency/synthesizer for power splitting said FILTER/LNA MEANS output L1/L2 signal into two signals;

a first MULTIPLIER MEANS connected to said POWER SPLITTER MEANS for multiplying said L1 signal with said 1st LO1 signal, wherein a first mixed signal is produced;

a second MULTIPLIER MEANS connected to said POWER SPLITTER MEANS for multiplying said L2 signal with said 1st LO1 signal, wherein a second mixed signal is produced;

a first BANDPASS FILTER MEANS connected to said first MULTIPLIER MEANS for filtering said first mixed signal;

a second BANDPASS FILTER MEANS connected to said second MULTIPLIER MEANS for filtering said second mixed signal;

a first AMPLIFIER MEANS connected to said first BANDPASS FILTER MEANS for amplifying said first filtered signal; and a second AMPLIFIER MEANS connected to said second BANDPASS FILTER MEANS for amplifying said second filtered signal.

8. The system of claim 3, wherein said IF PROCESSOR MEANS further comprises:

a first POWER SPLITTER MEANS connected to said DOWNCONVERTER MEANS and to said FREQUENCY SYNTHESIZER MEANS for power splitting said L1 signal into two signals;

a second POWER SPLITTER MEANS connected to said DOWNCONVERTER MEANS and to said FREQUENCY SYNTHESIZER MEANS for power splitting said L2 signal into two signals;

a first MULTIPLIER MEANS for multiplying said L1 signal with an inphase (I) version of said 2nd LO2 signal to produce an IL1 signal;

a second MULTIPLIER MEANS for multiplying said L1 signal with a quadrature (Q) version of said 2nd LO2 signal to produce a QL1 signal;

a third MULTIPLIER MEANS for multiplying said L2 signal with an inphase (I) version of said 2nd LO2 signal to produce an IL2 signal;

a fourth MULTIPLIER MEANS for multiplying said L2 signal with a quadrature (Q) version of said 2nd LO2 signal to produce a QL2 signal;

a first AMPLIFIER MEANS connected to said first MULTIPLIER MEANS for amplifying said IL1 signal;

a second AMPLIFIER MEANS connected to said second MULTIPLIER MEANS for amplifying said QL1 signal;

a third AMPLIFIER MEANS connected to said third MULTIPLIER MEANS for amplifying said IL2 signal;

a fourth AMPLIFIER MEANS connected to said fourth MULTIPLIER MEANS for amplifying said QL2 signal;

a first one-bit analog-to-digital (A/D) CONVERTER MEANS connected to said first AMPLIFIER MEANS for performing 1-bit quantization operation on said IL1 signal;

a second one-bit analog-to-digital (A/D) CONVERTER MEANS connected to said second AMPLIFIER MEANS for performing 1-bit quantization operation on said QL1 signal;

a third one-bit analog-to-digital (A/D) CONVERTER MEANS connected to said third AMPLIFIER MEANS for performing 1-bit quantization operation on said IL2 signal;

a fourth one-bit analog-to-digital (A/D) CONVERTER MEANS connected to said fourth AMPLIFIER MEANS for performing 1-bit quantization operation on said QL2 signal;

a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK) rate; and.

a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate.

9. The system of claim 8, wherein each said DIGITAL CHANNEL PROCESSING MEANS further comprises:

an L1 TRACKER MEANS for tracking L1 C/A code when Y code is ON and for tracking L1 P code when Y code is OFF;

an L2 TRACKER MEANS connected to said L1 TRACKER MEANS for tracking an enhanced cross correlated W code when Y code is ON and for tracking L2 P code when Y code is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase IL2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and wherein said MICROPROCESSOR MEANS system is fed by output signals from said L1 TRACKER MEANS and said L2 TRACKER MEANS; and wherein said L1 TRACKER MEANS and said L2 TRACKER MEANS are fed by control signal from said MICROPROCESSOR MEANS.

10. The system of claim 9, wherein said L1 TRACKER MEANS further comprises:

a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS1) connected to said MULTIPLEXER MEANS 1;

a CARRIER MIXER MEANS 1 connected to said CARRIER NCO MEANS1 for multiplying outputted by said IF PROCESSOR MEANS digitized inphase IL1 and Q L1 signals having carrier frequency with outputted by said CARRIER NCO MEANS1 inphase and quadrature components of digital carrier; wherein said CARRIER MIXER MEANS I outputs inphase IL1 and quadrature Q L1 signals having zero carrier frequency;

a CODE MIXER MEANS 1 connected to said CARRIER MIXER MEANS 1, connected to said CODE GENERATOR MEANS and connected to said CARRIER NCO MEANS1 for code correlating said CARRIER MIXER MEANS 1 output signals with said locally generated replica of C/A code; wherein when said L1 TRACKER MEANS's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELA- TORS MEANS 1 output signal to develop feedback signals for the carrier tracking loop and for the code tracking loop;

a code numerically controlled oscillator ( CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS, said CARRIER MIXER MEANS I outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICROPROCESSOR MEANS system control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay; and wherein said L1 C/A code epoch (EP) is sent to said L2 TRACKER MEANS.

11. The system of claim 10, said L2 TRACKER MEANS further comprising:

a carrier numerically controlled oscillator (CARRIER NCO MEANS2);

a CARRIER MIXER MEANS 2 connected to said CARRIER NCO MEANS2 for mixing outputted by said IF PROCESSOR MEANS digitized inphase I L2 and Q L2 signals having carrier frequency with outputted by said CARRIER NCO MEANS2 inphase and quadrature components of digital carrier; wherein said CARRIER MIXER MEANS 2 outputs inphase I L2 and quadrature Q L2 signals having zero carrier frequency; and wherein when L2 carrier tracking loop is locked via said CARRIER NCO MEANS2 said I L2 output contains an estimate of L2 Y code and said Q L2 output contains no signal power;

a CODE MIXER MEANS 3 connected to said CARRIER MIXER MEANS 2 for code correlating said CARRIER MIXER MEANS 2 output I and Q signals with outputted by said L1 TRACKER MEANS P 1 code, wherein said P 1 code represents a locally generated replica of L2 P code, and wherein said CODE MIXER MEANS 3 outputs an I estimate of L2 W code and a Q estimate of L2 W code;

a DIGITAL FILTER MEANS 2 connected to said CODE MIXER MEANS 3 for reducing the bandwidth of said I estimate of L2 W code;

a DIGITAL FILTER MEANS 3 connected to said CODE MIXER MEANS 3 for reducing the bandwidth of said Q estimate of L2 W code;

a CODE MIXER MEANS 4 connected to said DIGITAL FILTER MEANS 2 and connected to said DIGITAL FILTER MEANS 3 for correlating said I estimate of L2 W code and said Q estimate of L2 W code with a signal W1, wherein said signal W1 is said estimate of L1 W code sent by said L1 TRACKER MEANS; and wherein said CODE MIXER MEANS 4 performs said code correlation at 3 time points (early, punctual and late) on the autocorrelation function graph creating an early, a punctual and a late sample of the autocorrelation function;

a CODE MIXER MEANS 5 connected to said CARRIER MIXER MEANS 2 for code correlating said CARRIER MIXER MEANS 2 output I and Q signals with outputted by said L1 TRACKER MEANS PI code, wherein said P1 code represents a locally generated replica of L2 P code, and wherein said CODE MIXER MEANS 5 performs said code correlation at 3 time points (early, punctual and late) on the autocorrelation function graph creating an early, a punctual and a late sample of the autocorrelation function;

a MULTIPLEXER MEANS 2 connected to said CODE MIXER MEANS 5 and connected to said CODE MIXER MEANS 4 for selecting under the control of MICROPROCESSOR MEANS the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4: and a block CORRELATORS MEANS 2 connected to said MULTIPLEXER MEANS 2 for integrating said early, punctual and late samples of said autocorrelation function; wherein said CORRELATORS MEANS 2 output signal is fed to said MICROPROCESSOR MEANS system at a rate of sent by said L1 TRACKER MEANS said L1 C/A code epoch (EP), and wherein said MICROPROCESSOR MEANS uses said CORRELATORS MEANS 2 output signal to develop feedback signals for the carrier tracking loop and for the code tracking loop.

12. The system of claim 10, wherein said CARRIER NCO MEANS 1 further comprises:

an n-bit ACCUMULATOR MEANS, n being an integer, for adding a new frequency word (B1 ... Bn), B1 being the most significant bit (MSB), to a previous CARRIER NCO MEANS 1 output frequency word (Q1 .. . Qn) on each sample clock, wherein said ACCUMULATOR MEANS is caused to overflow periodically at the predetermined output frequency;

a first LATCH MEANS 1 connected to said ACCUMULATOR MEANS for latching in said new frequency word B1 . . . Bn under the control signal of said MICROPROCESSOR MEANS, wherein L-top bits of said ACCUMULATOR MEANS output wave are used as said CARRIER NCO MEANS 1 (I) output wave; L being an integer, L being less than n, L being greater or equal to 1; and wherein when the carrier tracking loop is locked L-top bits of said CARRIER NCO MEANS 1 output wave are used as the inphase version (I) of the carrier signal L1 which is phase locked with the satellite signal;

a first ADDER MEANS 1 for adding (01) to the 2-top bits (S1 S2) of the CARRIER NCO MEANS 1 output (S1 ... Sn) frequency word to obtain 2-top bits (R1 R2);

a third LATCH MEANS 3 connected to said first ADDER MEANS 1 for generating a quadrature version Q of carrier signal L1 by clocking in at the rate of SCLK signal said 2-top bits (R1 R2); and wherein said LATCH MEANS 3 generates said QL1 signal in the form of L-bit word (R1 R2 S3 ... SL);

a second LATCH MEANS 2 connected to said ACCUMULATOR MEANS for latching top m bits (C1 ... Cm), m being an integer (m<n), of the CARRIER NCO MEANS 1 output signal on the edge of the MSEC timing signal, wherein said (C1 ... Cm) signal represents a carrier phase measurement signal.

13. The system of claim 12, wherein said n-bit ACCUMULATOR MEANS with said L-bit output wave further comprises:

a second ADDER MEANS 2 connected to said first LATCH MEANS 1 for adding a frequency word (B1 ... Bn), B1 being the most significant bit (MSB), to a previous CARRIER NCO MEANS1 frequency output (Q1 ... Qn) on each sample clock; and a fourth LATCH MEANS 4 connected to said second ADDER MEANS 2 for generating said output CARRIER NCO MEANS1 signal (Q1 ... Qn), wherein said fourth LATCH MEANS is caused to overflow at the rate of SCLK signal, and wherein L-top output bits of said fourth LATCH MEANS are used as said CARRIER NCO MEANS 1 output signal.

14. The system of claim 11, wherein said CARRIER NCO MEANS2 further comprises:

an n-bit ACCUMULATOR MEANS, n being an integer, for adding a new frequency word (B1 ... Bn), B1 being the most significant bit (MSB), to a previous CARRIER NCO MEANS2 output frequency word (Q1 ... Qn) on each sample clock, wherein said ACCUMULATOR MEANS is caused to overflow periodically at the predetermined output frequency;

a first LATCH MEANS I connected to said ACCUMULATOR MEANS for latching in said new frequency word B1 ... Bn under the control signal of said MICROPROCESSOR MEANS, wherein L-top bits of said ACCUMULATOR MEANS output wave are used as said CARRIER NCO MEANS2 (I) output wave; L being an integer, L being less than n, L being greater or equal to 1; and wherein when the carrier tracking loop is locked L-top bits of said CARRIER NCO MEANS2 output wave are used as the inphase version (I) of the carrier signal L2 which is phase locked with the satellite signal;

a first ADDER MEANS 1 for adding (01) to the 2-top bits (S1 S2) of the CARRIER NCO MEANS2 output (S1 ... Sn) frequency word to obtain 2-top bits (R1 R2);

a third LATCH MEANS 3 connected to said first ADDER MEANS 1 for generating a quadrature version Q of carrier signal L2 by clocking in at the rate of SCLK signal said 2-top bits (R1 R2); and wherein said LATCH MEANS 3 generates said QL2 signal in the form of L-bit word (R1 R2 S3 ... SL);

a second LATCH MEANS 2 connected to said ACCUMULATOR MEANS for latching top m bits (C1 ... Cm) of the CARRIER NCO MEANS1 output signal on the edge of the MSEC timing signal, m being an integer, m being less than n; wherein said (C1 ... Cm) signal represents a carrier phase measurement signal.

15. The system of claim 14, wherein said n-bit ACCUMULATOR MEANS with said L-bit output wave further comprises:

a second ADDER MEANS 2 connected to said first LATCH MEANS 1 for adding a frequency word (B1 ... Bn), B1 being the most significant bit (MSB), to a previous CARRIER NCO MEANS2 frequency output (Q1 ... Qn) on each sample clock; and a fourth LATCH MEANS 4 connected to said second ADDER MEANS 2 for generating said output CARRIER NCO MEANS2 signal (Q1 ... Qn), wherein said fourth LATCH MEANS 4 is caused to overflow at the rate of SCLK signal, and wherein L-top output bits of said fourth LATCH MEANS are used as said CARRIER NCO MEANS2 output signal.

16. The system of claim 10, wherein said CARRIER MIXER MEANS 1 further comprises:

a first MULTIPLIER MEANS 1, wherein said first MULTIPLIER MEANS 1 performs a multiplication operation of L-bits of IL1 satellite carrier signal and L-bits of inphase version I of carrier frequency, and wherein said first MULTIPLIER MEANS 1 outputs a $(IL1)^*I$ signal;

a second MULTIPLIER MEANS 2, wherein said second MULTIPLIER MEANS 2 performs a multiplication operation of L-bits of QL1 satellite carrier signal and L-bits of quadrature version Q of carrier frequency, and wherein said second MULTIPLIER MEANS 2 outputs a $(QL1)^*Q$ signal;

a first ADDER MEANS 1 connected to said first MULTIPLIER MEANS 1 and connected to said second MULTIPLIER MEANS 2 for adding said $(IL1)^*I$ signal and said $(QL1)^*Q$ signal;

a third MULTIPLIER MEANS 3, wherein said third MULTIPLIER MEANS 3 performs a multiplication operation of L-bits of IL1 satellite carrier signal and L-bits of quadrature version Q of carrier frequency, and wherein said third MULTIPLIER MEANS 3 outputs a $(IL1)^*Q$ signal;

a fourth MULTIPLIER MEANS 4, wherein said fourth MULTIPLIER MEANS 4 performs a multiplication operation of L-bits of QL1 satellite carrier signal and L-bits of inphase version I of carrier frequency, and wherein said fourth MULTIPLIER MEANS 4 outputs a $(QL1)^*I$ signal; and a second ADDER MEANS 2 connected to said third MULTIPLIER MEANS 3 and connected to said fourth MULTIPLIER MEANS 4 for subtracting said $(QL1)^*I$ signal from said $(IL1)^*Q$ signal.

17. The system of claim 11, wherein said CARRIER MIXER MEANS 2 further comprises:

a first MULTIPLIER MEANS 1, wherein said first MULTIPLIER MEANS 1 performs a multiplication operation of L-bits of IL2 satellite carrier signal and L-bits of inphase version I of carrier frequency, and wherein said first MULTIPLIER MEANS 1 outputs a $(IL2)^*I$ signal;

a second MULTIPLIER MEANS 2, wherein said second MULTIPLIER MEANS 2 performs a multiplication operation of L-bits of QL2 satellite carrier signal and L-bits of quadrature version Q of carrier frequency, and wherein said second MULTIPLIER MEANS 2 outputs a (QL2)*Q signal;

a first ADDER MEANS 1 connected to said first MULTIPLIER MEANS 1 and connected to said second MULTIPLIER MEANS 2 for adding said (IL2)*I signal and said (QL2)*Q signal;

a third MULTIPLIER MEANS 3, wherein said third MULTIPLIER MEANS 3 performs a multiplication operation of L-bits of IL2 satellite carrier signal and L-bits of quadrature version Q of carrier frequency, and wherein said third MULTIPLIER MEANS 3 outputs a (IL2)*Q signal;

a fourth MULTIPLIER MEANS 4, wherein said fourth MULTIPLIER MEANS 4 performs a multiplication operation of L-bits of QL2 satellite carrier signal and L-bits of inphase version I of carrier frequency, and wherein said fourth MULTIPLIER MEANS 4 outputs a (QL2)*I signal; and a second ADDER MEANS 2 connected to said third MULTIPLIER MEANS 3 and connected to said fourth MULTIPLIER MEANS 4 for subtracting said (QL2)*I signal from said (IL2)*Q signal.

18. The system of claim 10, wherein said CODE MIXER MEANS 1 further comprises:

a first MULTIPLIER MEANS 1 for multiplying said incoming I signal with an early version (E) of said local C/A code;

a second MULTIPLIER MEANS 2 for multiplying said incoming I signal with a punctual version (P) of said local C/A code;

a third MULTIPLIER MEANS 3 for multiplying said incoming I signal with a late version (L) of said local C/A code;

a fourth MULTIPLIER MEANS 4 for multiplying said incoming Q signal with an early version (E) of said local C/A code;

a fifth MULTIPLIER MEANS 5 for multiplying said incoming Q signal with a punctual version (P) of said local C/A code; and a sixth MULTIPLIER MEANS 6 for multiplying said incoming Q signal with a late version (L) of said local C/A code.

19. The system of claim 10, wherein said CODE MIXER MEANS 2 further comprises:

a MULTIPLIER MEANS for multiplying said incoming L1Y code estimate with said locally generated L1P code, wherein said MULTIPLIER MEANS outputs an L1W code estimate.

20. The system of claim 11, wherein said CODE MIXER MEANS 3 further comprises:

a first MULTIPLIER MEANS 1 for multiplying said incoming I estimate of L2Y code with said locally generated P code (P1), wherein said first MULTIPLIER MEANS 1 outputs an I estimate of L2 W code; and a second MULTIPLIER MEANS 2 for multiplying said incoming Q estimate of L2Y code with said locally generated P code (P1), wherein said second MULTIPLIER MEANS 2 outputs a Q estimate of L2 W code.

21. The system of claim 11, wherein said CODE MIXER MEANS 4 further comprises:

a first MULTIPLIER MEANS 1 for multiplying L-bit of said I estimate of L2 W code at early time point (E) on the autocorrelation function graph with L-bit of estimate of L1W code, said first MULTIPLIER MEANS creating an early (E) I correlation between estimate of L2 W code and estimate of L1W code;

a second MULTIPLIER MEANS 2 for multiplying L-bit of said I estimate of L2 W code at punctual time point (P) on the autocorrelation function graph with L-bit of said estimate of L1W code, said second MULTIPLIER MEANS creating a punctual (P) I correlation between estimate of L2 W code and estimate of L1W code;

a third MULTIPLIER MEANS 3 for multiplying L-bit of said I estimate of L2 W code at late time point (L) on the autocorrelation function graph with L-bit of said estimate of L1W code, said third MULTIPLIER MEANS 3 creating a late (L) I correlation between estimate of L2 W code and estimate of L1W code;

a fourth MULTIPLIER MEANS 4 for multiplying L-bit of said Q estimate of L2 W code at early time point (E) on the autocorrelation function graph with L-bit of said estimate of L1W code, said fourth MULTIPLIER MEANS 4 creating an early (E) Q correlation between estimate of L2 W code and estimate of L1W code;

a fifth MULTIPLIER MEANS 5 for multiplying L-bit of said Q estimate of L2 W code at punctual time point (P) on the autocorrelation function graph with L-bit of said estimate of L1W code, said fifth MULTIPLIER MEANS 5 creating a punctual (P) Q correlation between estimate of L2 W code and estimate of L1W code; and a sixth MULTIPLIER MEANS 6 for multiplying L-bit of said Q estimate of L2 W code at late time point (L) on the autocorrelation function graph with L-bit of said estimate of L1W code, said sixth MULTIPLIER MEANS creating a late (L) Q correlation between estimate of L2 W code and estimate of L1W code.

22. The system of claim 12, wherein said CODE MIXER MEANS 5 further comprises:

a first MULTIPLIER MEANS 1 for multiplying said I estimate of L2 W code with an early version (E) of said local P1 code;

a second MULTIPLIER MEANS 2 for multiplying said I estimate of L2 W code with a punctual version (P) of said local P1 code;

a third MULTIPLIER MEANS 3 for multiplying said I estimate of L2 W code with a late version (L) of said local P1 code;

a fourth MULTIPLIER MEANS 4 for multiplying said I estimate of L2 W code with an early version (E) of said local C/A code;

a fifth MULTIPLIER MEANS 5 for multiplying said Q estimate of L2 W code with a punctual version (P) of said local C/A code; and a sixth MULTIPLIER MEANS 6 for multiplying said Q estimate of L2 W code with a late version (L) of said local C/A code.

23. The system of claim 10, wherein said CODE GENERATOR MEANS further comprises:

a first dividing means for dividing an input signal from said CODE NCO MEANS to provide a C/A CODE GENERATOR MEANS clock signal;

a C/A CODE GENERATOR MEANS connected to said first dividing means for clocking said C/A CODE GENERATOR MEANS clock signal into a C/A code signal and into an EPOCH signal under the control of said MICROPROCESSOR MEANS, wherein said EPOCH signal is used as a timing signal for said CORRELATORS MEANS 1 and said CORRELATORS MEANS 2; and a P CODE GENERATOR MEANS, wherein said P CODE GENERATOR MEANS is clocked by said CODE NCO MEANS signal under the control of said MICROPROCESSOR MEANS.

24. The system of claim 10, wherein said DIGITAL DELAY MEANS 1 further comprises:

a SHIFT REGISTER MEANS (1 ... k) for delaying said L-bit L1W code estimate by i-sample clocks, wherein said (i) is an integer greater or equal to 1 and less or equal to k, and wherein said integer (i) is selected under the control of said MICROPROCESSOR MEANS, and wherein said delayed L1W code estimate is aligned with said filtered L2 W code estimate; and a MULTIPLEXER MEANS for outputting said delayed L1W code estimate.

25. The system of claim 10, wherein said DIGITAL DELAY MEANS 2 further comprises:

a SHIFT REGISTER MEANS (1 ... k) for delaying said locally generated L1 P code by i-sample clocks, wherein said (i) is an integer greater or equal to 1 and less or equal to k, and wherein said integer (i) is selected under the control of said MICROPROCESSOR MEANS, wherein said delayed locally generated P1 code is aligned with said L2 P code; and a MULTIPLEXER MEANS for outputting said delayed locally generated P1 code.

26. The system of claim 10, wherein said DIGITAL FILTER MEANS 1 further comprises:

a first L-bit SHIFT REGISTER MEANS (W1,W2, ... Wx), X being an integer, for making an X- number of delayed copies of said estimate of L1 W code, wherein a first copy L1 W1-code is delayed by one sample clock, a second copy L1 W2-code is delayed by two sample clocks, an (i) copy L1 Wi is delayed by (i) sample clocks, i being an integer, and an x-copy L1 Wx-code is delayed by (x) sample clocks;

an X-number of MULTIPLIER MEANS (C1, ... Cx), wherein a first MULTIPLIER MEANS C1 transforms said first L1 W1-code into a L1 C1W1-code, wherein a second MULTIPLIER MEANS C2 transforms said second L1 W2-code into a L1 C2W2-code, and wherein an (i) MULTIPLIER MEANS Ci transform said L1 Wi-code into a L1 CiWi code, and wherein an (x) MULTIPLIER MEANS transforms said L1 Wx-code into a L1 CxWx-code;

an ADDER MEANS connected to each of said Ci MULTIPLIER MEANS for adding each said L1 CiWi-codes into an estimate of the output code function L1 Wout code, wherein said output code function is equal to:

Wout=C1W1+C2W2+ ... CxWx;

a dividing means for dividing said SCLK signal by K to reduce the rate of said output code function, K being an integer; and a second k-bit SHIFT REGISTER MEANS, k being an integer (k>1), connected to said ADDER MEANS for producing an early (E), punctual (P), and a late (L) versions of said estimate L1 of Wout code;

wherein said DIGITAL FILTER MEANS 1 reduces the bandwidth of said L1 W code estimate.

27. The system of claim 11, wherein said DIGITAL FILTER MEANS 2 further comprises:

a first L-bit SHIFT REGISTER MEANS (W1 ,W2, ... Wx), X being an integer, for making an X- number of delayed copies of said I estimate of L2 W code, wherein a first copy of I estimate of L2 W1-code is delayed by one sample clock, a second copy of I estimate of L2 W2-code is delayed by two sample clocks, an (i) copy of I estimate of L2 Wi is delayed by (i) sample clocks, i being an integer, and an x-copy of I estimate of L2 Wx-code is delayed by (x) sample clocks;

an X-number of MULTIPLIER MEANS (C1, ... Cx), wherein a first MULTIPLIER MEANS C1 transforms said first I estimate of L2 W 1-code into a L2 C1W1-code, wherein a second MULTIPLIER MEANS C2 transforms said second I estimate of L2 W2-code into a L2 C2W2-code, and wherein an (i) MULTIPLIER MEANS Ci transform said I estimate of L2 Wi-code into a L2 CiWi code, and wherein an (x) MULTIPLIER MEANS transforms said I estimate of L2 Wx -code into an L2 CxWx-code;

an ADDER MEANS connected to each of said Ci MULTIPLIER MEANS for adding each said L2 CiWi-codes into an I estimate of the output code function L2 Wout code, wherein said output code function is equal to:

Wout=C1W1+C2W2+ ... CxWx;

a DIVIDING MEANS for dividing said SCLK signal by K to reduce the rate of said output code function, K being an integer; and a FLIP-FLOP MEANS connected to said DIVIDING MEANS and connected to said ADDER MEANS for reducing the rate of said output code function;

wherein said DIGITAL FILTER MEANS 2 reduces the bandwidth of said I estimate of L2 W code.

28. The system of claim 11, wherein said DIGITAL FILTER MEANS 3 further comprises:

a first L-bit SHIFT REGISTER MEANS (W1,W2, ... Wx), X being an integer, for making an X- number of delayed copies of said Q estimate of L2 W code, wherein a first copy of Q estimate of L2 W1-code is delayed by one sample clock, a second copy of Q estimate of L2 W2-code is delayed by two sample clocks, an (i) copy of Q estimate of L2 Wi is delayed by (i) sample clocks, i being an integer, and an x-copy of Q estimate of L2 Wx-code is delayed by (x) sample clocks;

an X-number of MULTIPLIER MEANS (C1, ... Cx), wherein a first MULTIPLIER MEANS C1 transforms said first Q estimate of L2 W1-code into a L2 C1W1-code, wherein a second MULTIPLIER MEANS C2 transforms said second Q estimate of L2 W2-code into a L2 C2W2-code, and wherein an (i) MULTIPLIER MEANS Ci transform said Q estimate of L2 Wi-code into a L2 CiWi code, and wherein an (x) MULTIPLIER MEANS transforms said Q estimate of L2 Wx-code into an L2 CxWx-code;

an ADDER MEANS connected to each of said Ci MULTIPLIER MEANS for adding each said L2 CiWi-codes into a Q estimate of the output code function L2 Wout code, wherein said output code function is equal to:

Wout=C1W1+C2W2+ ... CxWx;

a DIVIDING MEANS for dividing said SCLK signal by K to reduce the rate of said output code function; K being an integer; and a FLIP-FLOP MEANS connected to said dividing means and connected to said ADDER MEANS for reducing the rate of said output code function;

wherein said DIGITAL FILTER MEANS 3 reduces the bandwidth of said Q estimate of L2 W code.

29. The system of claim 10, wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A (or P) code with said locally generated version of C/A (or P) code across a time period given by a multiple of L1 C/A EPOCH code; and wherein said IE,IL,QE, and QL are used by said code tracking loop by forming:

a code phase estimate=K1(IE–IL), when said carrier loop is locked; or a code phase estimate=K1[$(IE^2+QE^2)^{1/2} - (IL^2+QL^2)^{1/2}$], when said carrier loop is not locked; where K1 is a L1 code loop gain factor; and wherein said IP, and QP are used by said carrier tracking loop by forming:

a carrier phase estimate=arctan(QP/IP); said block CORRELATORS MEANS 1 further comprising:

a first UP/DOWN COUNTER MEANS 1 for integrating said IE across a period defined by said C/A EPOCH signal; wherein said UP/DOWN COUNTER MEANS 1 adds if the input is positive and subtracts if it is negative and is reset on EPOCH; and a first LATCH MEANS connected to said first UP/DOWN COUNTER MEANS 1 for reading by said MICROPROCESSOR MEANS system said integrated by said UP/DOWN COUNTER MEANS 1 said IE signal;

a second UP/DOWN COUNTER MEANS 2 for integrating said IP across a period defined by said C/A EPOCH signal; wherein said UP/DOWN COUNTER MEANS 2 adds if the input is positive and subtracts if it is negative and is reset on EPOCH; and a second LATCH MEANS connected to said second UP/DOWN COUNTER MEANS 2 for reading by said, MICROPROCESSOR MEANS system said integrated by said UP/DOWN COUNTER MEANS 2 said IP signal;

a third UP/DOWN COUNTER MEANS 3 for integrating said IL signal across a period defined by said C/A EPOCH signal; wherein said UP/DOWN COUNTER MEANS 3 adds if the input is positive and subtracts if it is negative and is reset on EPOCH; and a third LATCH MEANS connected to said third UP/DOWN COUNTER MEANS 3 for reading by said MICROPROCESSOR MEANS system said integrated by said UP/DOWN COUNTER MEANS 3 said IL signal;

a fourth UP/DOWN COUNTER MEANS 4 for integrating said QE signal across a period defined by said C/A EPOCH signal; wherein said UP/DOWN COUNTER MEANS 4 adds if the input is positive and subtracts if it is negative and is reset on EPOCH; and a fourth LATCH MEANS connected to said fourth UP/DOWN COUNTER MEANS 4 for reading by said MICROPROCESSOR MEANS system said integrated by said UP/DOWN COUNTER MEANS 4 said QE signal;

a fifth UP/DOWN COUNTER MEANS 5 for integrating said QP signal across a period defined by said C/A EPOCH signal; wherein said UP/DOWN COUNTER MEANS 5 adds if the input is positive and subtracts if it is negative and is reset on EPOCH; and a fifth LATCH MEANS connected to said fifth UP/DOWN COUNTER MEANS 5 for reading by said MICROPROCESSOR MEANS system said integrated by said UP/DOWN COUNTER MEANS 5 said QP signal;

a sixth UP/DOWN COUNTER MEANS 6 for integrating said QL across a period defined by said C/A EPOCH signal; wherein said UP/DOWN COUNTER MEANS 6 adds if the input is positive and subtracts if it is negative and is reset on EPOCH; and a sixth LATCH MEANS connected to said sixth UP/DOWN COUNTER MEANS 6 for reading by said MICROPROCESSOR MEANS system said integrated by said UP/DOWN COUNTER MEANS 6 said QL signal.

30. The system of claim 11, wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the correlated samples between filtered estimate of L1 and L2 W codes across a time period given by a multiple of L1 C/A EPOCH (EP) code; and wherein said IE,IL,QE, and QL are used by said code tracking loop by forming:

a code phase estimate=K2(IE–IL), when said carrier loop is locked; or a code phase estimate=K2[$(IE^2+QE^2)^{1/2} - (IL^2+QL^2)^{1/2}$], when said carrier loop is not locked; K2 being an L2-code loop gain factor; and wherein said PQ, and PI codes are used by said carrier tracking loop by forming:

a carrier phase estimate=arctan(PQ/PI); said block CORRELATORS MEANS 2 further comprising:

a first UP/DOWN COUNTER MEANS 1 for integrating said IE across a period defined by said C/A EPOCH signal; wherein said UP/DOWN COUNTER MEANS 1 adds if the input is positive and subtracts if it is negative and is reset on EPOCH; and a first LATCH MEANS connected to said first UP/DOWN COUNTER MEANS 1 for reading by said MICROPROCESSOR MEANS system said integrated by said UP/DOWN COUNTER MEANS 1 said IE signal;

a second UP/DOWN COUNTER MEANS 2 for integrating said IP across a period defined by said C/A EPOCH signal; wherein said UP/DOWN COUNTER MEANS 2 adds if the input is positive and subtracts if it is negative and is reset on EPOCH; and a second LATCH MEANS connected to said second UP/DOWN COUNTER MEANS 2 for reading by said MICROPROCESSOR MEANS system said integrated by said UP/DOWN COUNTER MEANS 2 said IP signal;

a third UP/DOWN COUNTER MEANS 3 for integrating said IL across a period defined by said C/A EPOCH signal; wherein said UP/DOWN COUNTER MEANS 3 adds if the input is positive and subtracts if it is negative and is reset on EPOCH; and a third LATCH MEANS connected to said third UP/DOWN COUNTER MEANS 3 for reading by said MICROPROCESSOR MEANS system said integrated by said UP/DOWN COUNTER MEANS 3 said IL signal;

a fourth UP/DOWN COUNTER MEANS 4 for integrating said QE across a period defined by said C/A EPOCH signal; wherein said UP/DOWN COUNTER MEANS 4 adds if the input is positive and subtracts if it is negative and is reset on EPOCH; and a fourth LATCH MEANS connected to said fourth UP/DOWN COUNTER MEANS 4 for reading by said MICROPROCESSOR MEANS system said integrated by said UP/DOWN COUNTER MEANS 4 said QE signal;

a fifth UP/DOWN COUNTER MEANS 5 for integrating said QP across a period defined by said C/A EPOCH signal; wherein said UP/DOWN COUNTER MEANS 5 adds if the input is positive and subtracts if it is negative and is reset on EPOCH; and a fifth LATCH MEANS connected to said fifth UP/DOWN COUNTER MEANS 5 for reading by said. MICROPROCESSOR MEANS system said integrated by said UP/DOWN COUNTER MEANS 5 QP signal;

a sixth UP/DOWN COUNTER MEANS 6 for integrating said QL code across a period defined by said C/A EPOCH signal; wherein said UP/DOWN COUNTER MEANS 6 adds if the input is positive and subtracts if it is negative and is reset on EPOCH; and a sixth LATCH MEANS connected to said sixth UP/DOWN COUNTER MEANS 6 for reading by said MICROPROCESSOR MEANS system said integrated by said UP/DOWN COUNTER MEANS 6 said QL signal.

31. The system of claim 10, wherein said CODE NCO MEANS provides a clock for said CODE GENERATOR MEANS which generates said locally generated replica of C/A code and P code; said CODE NCO MEANS further comprising:

a n-bit ACCUMULATOR MEANS, n being an integer, comprising:

a n-bit ADDER MEANS; and a n-bit LATCH MEANS connected to said n-bit ADDER MEANS; and a MULTIPLEXER MEANS connected to said n-bit ACCUMULATOR MEANS;

wherein on each sample clock edge the output of said LATCH MEANS is added to the output of said MULTIPLEXER MEANS by said ADDER MEANS;

and wherein said MULTIPLEXER MEANS outputs one of three n-bit values (N,M or SHIFT); and wherein said CODE NCO MEANS under normal operation outputs:

CODE NCO MEANS frequency=$(N \times SCLK)/(2^n-M+N)$;

and wherein said CODE NCO MEANS under code phase shift operation outputs:

code phase shift=$(M-SHIFT)/(2^n-M+N)$.

32. The system of claim 10, wherein said CODE NCO MEANS provides a clock for said CODE GENERATOR MEANS which generates said locally generated replica of C/A code and P code; said CODE NCO MEANS further comprising:

a 12-bit ACCUMULATOR MEANS comprising:

a 12-bit ADDER MEANS; and a 12-bit LATCH MEANS connected to said 12-bit ADDER MEANS; and a MULTIPLEXER MEANS connected to said 12-bit ACCUMULATOR MEANS; wherein on each sample clock edge the output of said LATCH MEANS is added to the output of said MULTIPLEXER MEANS by said ADDER MEANS; and wherein said MULTIPLEXER MEANS outputs one of three 12-bit values (N=1023, M=2619, or SHIFT); and wherein said CODE NCO MEANS under normal operation outputs:

CODE NCO MEANS frequency=10.23 MHz;

and wherein said CODE NCO MEANS under code phase shift operation outputs:

code phase shift=(2619-SHIFT)/2500 sample clocks.

33. The system of claim 10, wherein said RESOLVER MEANS further comprises:

a COUNTER MEANS;

a COMPARATOR MEANS connected to said COUNTER MEANS; and a FLIP-FLOP MEANS connected to said. COMPARATOR MEANS;

wherein said COUNTER MEANS is reset every millisecond on the MSEC signal; and wherein the output state of said FLIP-FLOP MEANS is set to digital 0 every millisecond on the MSEC signal; and wherein when said COUNTER MEANS reaches a value equal to said COMPARATOR MEANS input value said FLIP-FLOP MEANS is clocked by said COMPARATOR MEANS to the output state equal to digital 1; and wherein said process is repeated every millisecond; and wherein said resulting digital delay=(delay 1+(2500-m)/25000), m being a controllable mark/space ratio; and wherein said RESOLVER MEANS is used for providing a signal with said controllable mark/space ratio to toggle between said delay 1 and said delay 2.

34. A method for optimum correlation processing of L1 and L2 signals received from a SPS satellite by a correlation processing system; said system comprising a RECEIVING MEANS and at least one DIGITAL CHANNEL PROCESSING MEANS; said method comprising the steps of:

providing said RECEIVING MEANS and at least one said DIGITAL, CHANNEL PROCESSING MEANS;

receiving a known C/A code modulated on L1 carrier frequency, an unknown Y code modulated on L1 carrier frequency signal, an unknown Y code modulated on L2 carrier frequency signal by said RECEIVING MEANS; wherein said received L1, and L2 signals contain propagation noise; and wherein said Y code comprises a known P code and an unknown W code;

generating local replica of said C/A code modulated on L1 carrier frequency signal by each said DIGITAL, CHANNEL PROCESSING MEANS;

generating local replica of said P code modulated on L1 carrier frequency signal by said DIGITAL CHANNEL PROCESSING MEANS; wherein said locally generated replica of L1 signal do not contain propagation noise;

extracting of an estimate of said Y code from said L1 signal, and from said L2 signal by said DIGITAL CHANNEL PROCESSING MEANS; wherein said estimate signals contain propagation noise;

correlating a locally generated replica of C/A code with the received L1 code for obtaining an estimate of L1 group delay (L1 pseudo-range) and L1 carrier phase;

removing said P code from said locally extracted estimate of said L1 Y code by said CHANNEL PROCESSOR to obtain a locally extracted estimate of said L1 W code;

removing said P code from said locally extracted estimate of said L2 Y code by said DIGITAL CHANNEL PROCESSOR MEANS to obtain a locally extracted estimate of said L2 W code; and correlating said locally extracted estimate of said L1 W code with said locally extracted estimate of said L2 W code to obtain relative offset in group delay between L1 and L2 signals and for obtaining an independent estimate of L2 carrier phase by said CHANNEL PROCESSOR.

35. The method of claim 34, said RECEIVING MEANS comprising a dual frequency patch ANTENNA MEANS, a FILTER/LNA MEANS, a DOWNCONVERTER MEANS, an IF PROCESSOR MEANS, a MASTER OSCILLATOR MEANS, and a FREQUENCY SYNTHESIZER MEANS; wherein said step of receiving L1 and L2 satellite signals further comprises the steps of:

receiving said L1 and L2 satellite signals by said dual frequency patch ANTENNA MEANS;

performing filtering and low noise amplification of said L1 and L2 signals by said FILTER/LNA MEANS, wherein said FILTER/LNA MEANS determines the noise/signal ratio of the received signals L1 and L2;

mixing and converting said L1 and L2 signals by said DOWNCONVERTER MEANS;

transforming said converted L1 and L2 signals into digitally sampled quadrature versions of L I and L2 signals (IL1, QL1, IL2, QL2) by said IF PROCESSOR MEANS; and generating several timing signals by said FREQUENCY SYNTHESIZER MEANS.

36. The method of claim 35, said FILTER/LNA MEANS comprising a POWER SPLITTER MEANS, two separate BANDPASS FILTER MEANS, and a POWER COMBINER MEANS; said step of performing filtering and low noise amplification of said L1 and L2 signals by said FILTER/LNA MEANS further comprises the steps of:

power splitting said single L1/L2 signal received by said ANTENNA MEANS into two separate L1 and L2 signals by said POWER SPLITTER MEANS;

filtering said L1 and L2 signals independently by said two separate BANDPASS FILTER MEANS;

combining said. L1 and L2 signals into one combined signal L l/L2 before feeding said combined L1/L2 signal into said LNA by said POWER COMBINER MEANS.

37. The method of claim 36, said FREQUENCY SYNTHESIZER MEANS further comprising a PHASE DETECTOR MEANS, a LOOP FILTER MEANS, a VOLTAGE CONTROLLED OSCILLATOR (VCO) MEANS, a first DIVIDER MEANS, a second DIVIDER MEANS, and a third DIVIDER MEANS; wherein said step of generating several timing signals by said FREQUENCY SYNTHESIZER MEANS further comprises the steps of:

comparing phases of two signals by said PHASE DETECTOR MEANS, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

filtering out high frequency voltage noise by said LOOP FILTER MEANS, wherein output LOOP FILTER MEANS voltage signal includes a low frequency voltage noise;

generating a 1st local oscillator (LO) signal by said VCO, wherein voltage signal at the input of said VCO causes frequency change in said VCO output signal, and wherein said VCO nominal output signal is locked to said reference signal;

dividing said 1st LO1 signal by said first DIVIDER MEANS to obtain a 2nd local oscillator (LO2) signal;

dividing said 2nd LO2 signal by said second DIVIDER MEANS to obtain a sampling clock (SCLK); and dividing said 2nd LO2 signal by said third DIVIDER MEANS to obtain a signal used for measurement of local reference time.

38. The method of claim 36, said FREQUENCY SYNTHESIZER MEANS further comprising a "Divide by 5" block, a PHASE DETECTOR MEANS, a LOOP FILTER MEANS , a VOLTAGE CONTROLLED OSCILLATOR (VCO) MEANS, a "Divide by 8" block, a "Divide by 7" block, and a "Divide by 25000" block; wherein said step of generating several timing signals by said FREQUENCY SYNTHESIZER MEANS further comprises the steps of:

comparing 5 MHz input signal from said MASTER OSCILLATOR MEANS with 5 MHz signal from said "Divide by 5" block by said PHASE DETECTOR MEANS, wherein a minimum voltage output signal from said PHASE DETECTOR MEANS represents maximum phase alignment of two said 5 MHz signals;

filtering out high frequency voltage noise by said LOOP FILTER MEANS;

generating a 1st local oscillator (LO1) signal by said VOLTAGE CONTROLLED OSCILLATOR (VCO) MEANS, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as said 1st local oscillator (LO1);

dividing said 1st LO1 1400 MHz signal by said "Divide by 8" block to obtain a 175 MHz signal, wherein said 175 MHz signal is used as a 2nd LO2 signal;

dividing said 2nd LO2 175 MHz signal by said "Divide by 7" block to obtain a 25 MHz signal, wherein said 25 MHz signal is used as a sampling clock (SCLK); and dividing said 25 MHz signal by said "Divide by 25000" block to obtain a 1 KHz signal, wherein said 1 KHz signal (MSEC) is used for measurement of local reference time.

39. The method of claim 35, said DOWNCONVERTER MEANS comprising a POWER SPLITTER MEANS, a first MULTIPLIER MEANS, a second MULTIPLIER MEANS, a first BANDPASS FILTER MEANS, a second BANDPASS FILTER MEANS, a first AMPLIFIER MEANS, and a second AMPLIFIER MEANS; wherein said step of mixing and converting said L1 and L2 signals by said DOWNCONVERTER MEANS further comprises the steps of:

splitting said FILTER/LNA MEANS output L1/L2 signal into two signals L1 and L2 by said POWER SPLITTER MEANS;

producing a first mixed signal by multiplying said L1 signal with said 1st LO1 signal by said first MULTIPLIER MEANS;

producing a second mixed signal by multiplying said L2 signal with said 1st LO1 signal by said second MULTIPLIER MEANS;

filtering said first mixed signal by said first BANDPASS FILTER MEANS;

filtering said second mixed signal by said second BANDPASS FILTER MEANS;

amplifying said first filtered signal by said first AMPLIFIER MEANS; and amplifying said second filtered signal by said second AMPLIFIER MEANS.

40. The method of claim 35, said IF PROCESSOR MEANS comprising a first POWER SPLITTER MEANS, a second POWER SPLITTER MEANS, a first MULTIPLIER MEANS, a second MULTIPLIER MEANS, a third MULTIPLIER MEANS, a fourth MULTIPLIER MEANS, a first AMPLIFIER MEANS, a second AMPLIFIER MEANS, a third AMPLIFIER MEANS, a fourth AMPLIFIER MEANS, a first one-bit A/D CONVERTER, a second one-bit A/D CONVERTER, a third one-bit A/D CONVERTER, a fourth one-bit A/D CONVERTER, a first FLIP-FLOP MEANS (FF1), a second FF2, a third FF3, and a fourth FF4; wherein said step of transforming said converted L1 and L2 signals into digitally sampled quadrature versions of L1 and L2 signals (IL1, QL1, IL2, QL2) further comprises the steps of:

splitting said L1 signal into two signals by said first POWER SPLITTER MEANS;

splitting said L2 signal into two signals by said second POWER SPLITTER MEANS;

producing an IL1 signal by multiplying said L1 signal with an inphase (I) version of said 2nd LO2 signal by said first MULTIPLIER MEANS;

producing a QL1 signal by multiplying said L1 signal with a quadrature (Q) version of said 2nd LO2 signal by said second MULTIPLIER MEANS;

producing an IL2 signal by multiplying said L2 signal with an inphase (I) version of said 2nd LO2 signal by said third MULTIPLIER MEANS;

producing a QL2 signal by multiplying said L2 signal with a quadrature (Q) version of said 2nd LO2 signal by said fourth MULTIPLIER MEANS;

amplifying said IL1 signal by said first AMPLIFIER MEANS;

amplifying said QL1 signal by said second AMPLIFIER MEANS;

amplifying said IL2 signal by said third AMPLIFIER MEANS;

amplifying said QL2 signal by said fourth AMPLIFIER MEANS;

performing one-bit quantization operation on said IL1 signal by said first one-bit analog-to-digital (A/D) CONVERTER MEANS;

performing one-bit quantization operation on said QL1 signal by said second one-bit analog-to-digital (A/D) CONVERTER MEANS;

performing one-bit quantization operation on said IL2 signal by said third one-bit analog-to-digital (A/D) CONVERTER MEANS;

performing one-bit quantization operation on said QL2 signal by said fourth one-bit analog-to-digital (A/D) CONVERTER MEANS;

sampling said IL1 signal by clocking said IL1 signal through said FF1 at sampling clock (SCLK) rate;

sampling said QL1 signal by clocking said QL1 signal through said FF2 at sampling clock (SCLK) rate;

sampling said IL2 signal by clocking said IL2 signal through said FF3 at sampling clock (SCLK) rate; and sampling said QL2 signal by clocking said QL2 signal through said FF4 at sampling clock (SCLK) rate.

41. The method of claim 34, each said DIGITAL CHANNEL PROCESSING MEANS comprising a L1 TRACKER MEANS, a L2 TRACKER MEANS, and a MICROPROCESSOR MEANS system; said method further comprising the steps of:

tracking L1 C/A code when Y code is ON and tracking L1 P code when Y code is OFF by said L1 TRACKER MEANS;

tracking an enhanced cross correlated W code when Y code is ON and tracking L2 P code when Y code is OFF by said L2 TRACKER MEANS; and feeding said MICROPROCESSOR MEANS system by output signals from said L1 TRACKER MEANS and said L2 TRACKER MEANS.

42. The method of claim 41, said L1 TRACKER MEANS comprising a MULTIPLEXER MEANS 1, a carrier numerically controlled oscillator (CARRIER NCO MEANS1), a CARRIER MIXER MEANS 1, a CODE GENERATOR MEANS, a CODE MIXER MEANS 1, a block CORRELATORS MEANS 1, a code numerically controlled oscillator (CODE NCO MEANS), a CODE MIXER MEANS 2, a DIGITAL DELAY MEANS 1, a DIGITAL FILTER MEANS 1, a RESOLVER MEANS, and a DIGITAL DELAY MEANS 2; wherein said step of tracking L1 C/A code when Y code is ON and tracking L1 P code when Y code is OFF by said L1 TRACKER MEANS further comprises the steps of:

feeding said L1 TRACKER MEANS by digitized inphase IL1 and quadrature QL1 of L1 signal generated by said IF PROCESSOR MEANS;

synchronously clocking said L1 TRACKER MEANS by said SCLK signal outputted by said FREQUENCY SYNTHESIZER MEANS;

synchronously referencing said L1 TRACKER MEANS by said MSEC signal to local reference time, said MSEC signal being outputted by said FREQUENCY SYNTHESIZER MEANS;

feeding said L1 TRACKER MEANS by control signal from said MICROPROCESSOR MEANS;

providing a locally generated replica of C/A code and locally generated replica of P code by said CODE GENERATOR MEANS;

selecting a locally generated code C/A when Y code is ON and selecting a locally generated P code when Y code is OFF by said MULTIPLEXER MEANS 1;

generating inphase and quadrature components of digital carrier by said CARRIER NCO MEANS1;

generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1;

performing code correlation of said inphase IL1 and quadrature QL1 signals with said locally generated replica of C/A code by said CODE MIXER MEANS 1; wherein when said L1 TRACKER MEANS carrier tracking loop is closed via said CARRIER NCO MEANS1; and wherein said CODE MIXER MEANS 1 performs said code correlation at 3 time points (early, punctual and late) on the autocorrelation function graph creating an early, a punctual and a late sample of the autocorrelation function;

integrating said early, punctual and late samples of said autocorrelation function by said block CORRELATORS MEANS 1;

feeding said MICROPROCESSOR MEANS system by an output signal of said CORRELATORS MEANS 1 at a rate of L1 C/A code epoch, wherein said MICROPROCESSOR MEANS uses said CORRELATORS MEANS 1 output signal to develop feedback signals for the carrier tracking loop and for the code tracking loop;

providing a clocking signal at C/A code rate and a clocking signal at P code rate by said code numerically controlled oscillator (CODE NCO MEANS);

driving said CODE GENERATOR MEANS by said C/A code clocking rate and said P code clocking rate;

providing a mechanism for alignment of said locally generated replica of C/A code with said incoming satellite C/A code by said CODE NCO MEANS;

generating an estimate of L1 W code by removing said local replica of L1 P code from said estimate of L1 Y code by said CODE MIXER MEANS 2;

delaying said L1 W code estimate by said DIGITAL DELAY MEANS 1 under said MICROPROCESSOR MEANS system control;

reducing the bandwidth of said L1 W code estimate by said DIGITAL FILTER MEANS 1;

sending said delayed and filtered L1 W code estimate to said L2 TRACKER MEANS;

delaying said P code output from said CODE GENERATOR MEANS by said DIGITAL DELAY MEANS 2;

sending said delayed P code to said L2 TRACKER MEANS;

altering the resulting delay by said RESOLVER MEANS; and sending said L1 C/A code epoch (EP) to said L2 TRACKER MEANS.

43. The method of claim 41, said L2 TRACKER MEANS comprising a CARRIER NCO MEANS 2, a CARRIER MIXER MEANS 2, a CODE MIXER MEANS 3, a DIGITAL FILTER MEANS 2, a DIGITAL FILTER MEANS 3, a CODE MIXER MEANS 4, a CODE MIXER MEANS 5, a MULTIPLEXER MEANS 2, and a block CORRELATORS MEANS 2; wherein said step of tracking an enhanced cross correlated W code when Y code is ON and tracking L2 P code when Y code is OFF by said L2 TRACKER MEANS further comprises the steps of:

feeding said L2 TRACKER MEANS by digitized inphase IL2 and quadrature QL2 of L2 signal outputted by said IF PROCESSOR MEANS;

synchronously clocking said L2 TRACKER MEANS by said SCLK signal outputted by said FREQUENCY SYNTHESIZER MEANS;

synchronously referencing said L2 TRACKER MEANS by said MSEC signal to local reference time, said MSEC signal being outputted by said FREQUENCY SYNTHESIZER MEANS;

feeding said L2 TRACKER MEANS when Y code is ON by said L1 P code, said filtered estimate of L1 W code, and said C/A EP code generated by said L1 TRACKER MEANS;

feeding said L2 TRACKER MEANS by control signal from said MICROPROCESSOR MEANS;

generating IL2 and QL2 signals having carrier frequency by said CARRIER NCO MEANS2;

generating inphase IL2 and quadrature QL2 signals having zero carrier frequency by mixing said digitized inphase IL2 and quadrature QL2 signals having carrier frequency with said inphase and quadrature components IL2 and QL2 of digital carrier generated by said CARRIER MIXER MEANS 2, wherein when L2 carrier tracking loop is locked via said CARRIER NCO MEANS2 said generated IL2 output contains an estimate of L2Y code and said generated QL2 output contains no signal power;

performing code correlation of said IL2 and QL2 having zero frequency signals with outputted by said L1 TRACKER MEANS P1 code by said CODE MIXER MEANS 3; wherein said P1 code represents a locally generated replica of L2 P code;

generating an I estimate of L2 W code and a Q estimate of L2 W code by said CODE MIXER MEANS 3;

reducing the bandwidth of said I estimate of L2 W code by said DIGITAL FILTER MEANS 2;

reducing the bandwidth of said Q estimate of L2 W code by said DIGITAL FILTER MEANS 3;

performing code correlation of said I estimate of L2 W code and said Q estimate of L2 W code with said estimate of L I W code by said CODE MIXER MEANS 4; wherein said CODE MIXER MEANS 4 performs said code correlation at 3 time points (early, punctual and late) on the autocorrelation function graph creating an early, a punctual and a late sample of the autocorrelation function;

performing code correlation of said I estimate of L2 W code and said Q estimate of L2 W code with said P1 code by said CODE MIXER MEANS 5; wherein said P1 code represents a locally generated replica of L2 P code; and wherein said CODE MIXER MEANS 5 performs said code correlation at 3 time points (early, punctual and late) on the autocorrelation function graph creating an early, a punctual and a late sample of the autocorrelation function;

selecting under the control of MICROPROCESSOR MEANS by said MULTIPLEXER MEANS 2 the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4;

integrating early, punctual and late samples of said autocorrelation function by said block CORRELATORS MEANS 2; and feeding said MICROPROCESSOR MEANS by output signals of said CORRELATORS MEANS 2, wherein said MICROPROCESSOR MEANS uses said CORRELATORS MEANS 2 output signals to develop feedback signals for the carrier tracking loop and for the code tracking loop.

44. The method of claim 42, said CARRIER NCO MEANS1 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS1 further comprises the steps of:

adding a new frequency word (B1 ... Bn), B1 being the most significant bit (MSB), to a previous CARRIER NCO MEANS1 output frequency word (Q1 ... Qn) on each sample clock by said n-bit ACCUMULATOR MEANS; wherein said ACCUMULATOR MEANS is caused to overflow periodically at the predetermined output frequency;

latching in said new frequency word (B1 ... Bn) under the control signal of said MICROPROCESSOR MEANS by said first LATCH MEANS 1; wherein L-top bits of said ACCUMULATOR MEANS output wave are used as an inphase version I of said CARRIER NCO MEANS1 output wave; L being an integer equal or greater to 1; and wherein when the carrier tracking loop is locked L-top bits of said CARRIER NCO MEANS1 output wave are used as the inphase version I of the carrier signal L1 which is phase locked with the satellite signal;

adding (01) binary code to the two top bits (S1 S2) of the CARRIER NCO MEANS1 output (S1 . . . Sn) frequency word to obtain 2-top bits (R1 R2) by said first ADDER MEANS 1;

generating a quadrature version Q of carrier signal L1 by clocking in at the rate of the SCLK signal said 2-top bits (R1 R2) by said third LATCH MEANS; wherein said LATCH MEANS 3 generates said QL1 signal in the from of L-bit word (R1 R2 S3 . . . SL); and latching top m bits (C1 . . . Cm) of the CARRIER NCO MEANS1 output signal on the edge of the MSEC timing signal by said second LATCH MEANS 2; m being an integer less than n; wherein said (C1 . . . Cm) signal represents a carrier phase measurement signal.

45. The method of claim 44, said n-bit ACCUMULATOR MEANS comprising a second ADDER MEANS 2, and a fourth LATCH MEANS 4, wherein said step of adding a new frequency word (B1 . . . Bn), B1 being the most significant bit (MSB), to a previous CARRIER NCO 1 output frequency word (Q1 . . . Qn) on each sample clock by said n-bit ACCUMULATOR MEANS further comprises the steps of:

adding said frequency word (B1 . . . Bn) to a previous CARRIER NCO 1 frequency output (Q1 . . . Qn) on each sample clock by said second ADDER MEANS; and generating said CARRIER NCO MEANS 1 output signal (Q1 . . . Qn) by said fourth LATCH MEANS; wherein said fourth LATCH MEANS is caused to overflow at the rate of SCLK signal; and wherein L-top output bits of said fourth LATCH MEANS 4 are used as said CARRIER NCO MEANS 1 output signal.

46. The method of claim 43, said CARRIER NCO MEANS 2 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS 1 further comprises the steps of:

adding a new frequency word (B1 . . . Bn), B1 being the most significant bit (MSB), to a previous CARRIER NCO MEANS 2 output frequency word (Q1 . . . Qn) on each sample clock by said n-bit ACCUMULATOR MEANS; wherein said ACCUMULATOR MEANS is caused to overflow periodically at the predetermined output frequency;

latching in said new frequency word (B1. . . Bn) under the control signal of said MICROPROCESSOR MEANS by said first LATCH MEANS 1; wherein L-top bits of said ACCUMULATOR MEANS output wave are used as an inphase version I of said CARRIER NCO MEANS 2 output wave; L being an integer equal or greater to 1; and wherein when the carrier tracking loop is locked L-top bits of said CARRIER NCO MEANS 2 output wave are used as the inphase version I of the carrier signal L2 which is phase locked with the satellite signal;

adding (01) binary code to the two top bits (S1 S2) of the CARRIER NCO MEANS 2 output (S1 . . . Sn) frequency word to obtain 2-top bits (R1 R2) by said first ADDER MEANS 1;

generating a quadrature version Q of carrier signal L2 by clocking in at the rate of the SCLK signal said 2-top bits (R1 R2) by said third LATCH MEANS; wherein said LATCH MEANS 3 generates said QL2 signal in the from of L-bit word (R1 R2 S3 . . . SL); and latching top m bits (C1 . . . Cm) of the CARRIER NCO MEANS 2 output signal on the edge of the MSEC timing signal by said second LATCH MEANS 2; m being an integer less than n; wherein said (C1 . . . Cm) signal represents a carrier phase measurement signal.

47. The method of claim 46, said n-bit ACCUMULATOR MEANS comprising a second ADDER MEANS 2, and a fourth LATCH MEANS 4, wherein said step of adding a new frequency word (B1 . . . Bn), B1 being the most significant bit (MSB), to a previous CARRIER NCO MEANS 2 output frequency word (Q1 . . . Qn) on each sample clock by said n-bit ACCUMULATOR MEANS further comprises the steps of:

adding said frequency word (B1 . . . Bn) to a previous CARRIER NCO MEANS 2 frequency output (Q1 . . . Qn) on each sample clock by said second ADDER MEANS; and generating said CARRIER NCO MEANS 2 output signal (Q1 . . . Qn) by said fourth LATCH MEANS; wherein said fourth LATCH MEANS is caused to overflow at the rate of SCLK signal; and wherein L-top output bits of said fourth LATCH MEANS 4 are used as said CARRIER NCO MEANS 2 output signal.

48. The method of claim 42, said CARRIER MIXER MEANS 1 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1 further comprises the steps of:

generating a $(IL1)^*I$ signal by performing a multiplication operation of an inphase version I of L1 satellite carrier signal and an inphase version I of carrier frequency by said first MULTIPLIER MEANS 1;

generating a $(QL1)^*Q$ signal by performing a multiplication operation of a quadrature version Q of L1 satellite carrier signal and a quadrature version Q of carrier frequency by said second MULTIPLIER MEANS 2, adding said $(IL1)^*I$ signal and said $(QL1)^*Q$ signal by said first ADDER MEANS 1;

generating a $(IL1)^*Q$ signal by performing a multiplication operation of an inphase version I of L1 satellite carrier signal and a quadrature version Q of carrier frequency by said third MULTIPLIER MEANS 3;

generating a $(QL1)^*I$ signal by performing a multiplication operation of a quadrature version Q of L1 satellite carrier signal and an inphase version I of carrier frequency by said fourth MULTIPLIER MEANS 4; and subtracting said $(QL1)^*I$ signal from said $(IL1)*Q$ signal by said second ADDER MEANS 2.

49. The method of claim 43, said CARRIER MIXER MEANS 2 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL2 and quadrature QL2 signals having zero carrier frequency by mixing digitized inphase IL2 and QL2 signals having carrier frequency with inphase and quadrature components of digital carrier by said CARRIER MIXER MEANS 2 further comprises the steps of:

generating a (IL2)*I signal by performing a multiplication operation of an inphase version I of L2 satellite carrier signal and an inphase version I of carrier frequency by said first MULTIPLIER MEANS 1;

generating a (QL2)*Q signal by performing a multiplication operation of a quadrature version Q of L2 satellite carrier signal and a quadrature version Q of carrier frequency by said second MULTIPLIER MEANS 2, adding said (IL2)*I signal and said (QL2)*Q signal by said first ADDER MEANS 1;

generating a (IL2)*Q signal by performing a multiplication operation of an inphase version I of L2 satellite carrier signal and a quadrature version Q of carrier frequency by said third MULTIPLIER MEANS 3;

generating a (QL2)*I signal by performing a multiplication operation of a quadrature version Q of L2 satellite carrier signal and an inphase version I of carrier frequency by said fourth MULTIPLIER MEANS 4; and subtracting said (QL2)*I signal from said (IL2)*Q signal by said second ADDER MEANS 2.

50. The method of claim 42, said CODE MIXER MEANS 1 comprising a first MULTIPLIER MEANS 1, a second MULTIPLIER MEANS 2, a third MULTIPLIER MEANS 3, a fourth MULTIPLIER MEANS, a fifth MULTIPLIER MEANS, and a sixth MULTIPLIER MEANS; wherein the step of performing code correlation of said inphase IL1 and quadrature QL1 signals with said locally generated replica of C/A code by said CODE MIXER MEANS 1 at 3 time points (early, punctual and late) on the autocorrelation function graph creating an early, a punctual and a late sample of the autocorrelation function, further comprises the steps of:

multiplying said incoming I signal with an early version (E) of said local C/A code by said first MULTIPLIER MEANS;

multiplying said incoming I signal with a punctual version (P) of said local C/A code by said second MULTIPLIER MEANS;

multiplying said incoming I signal with a late version (L) of said local C/A code by said third MULTIPLIER MEANS;

multiplying said incoming Q signal with an early version (E) of said local C/A code by said fourth MULTIPLIER MEANS;

multiplying said incoming Q signal with a punctual version (P) of said local C/A code by said fifth MULTIPLIER MEANS; and multiplying said incoming Q signal with a late version (L) of said local C/A code by said sixth MULTIPLIER MEANS.

51. The method of claim 42, said CODE MIXER MEANS 2 comprising a MULTIPLIER MEANS, said step of generating an estimate of L1 W code by removing said local replica of L1 P code from said estimate of L1 Y code by said CODE MIXER MEANS 2 further comprises the step of:

generating a L1 W code estimate by multiplying said incoming L1 Y code estimate with said locally generated L1 P code by said MULTIPLIER MEANS.

52. The method of claim 43, said CODE MIXER MEANS 3 comprising a first MULTIPLIER MEANS, and a second MULTIPLIER MEANS, wherein said step of performing code correlation of said IL2 and QL2 having zero frequency signals with a locally generated replica L2 P code (P1 code) by said CODE MIXER MEANS 3, further comprises the steps of:

generating an I estimate of L2 W code by multiplying said incoming I estimate of L2 Y code with said locally generated L2 P code (P1 code) by said first MULTIPLIER MEANS; and generating a Q estimate of L2 W code by multiplying said incoming Q estimate of L2 Y code with said locally generated L2 P code (P1) by said second MULTIPLIER MEANS.

53. The method of claim 43, said CODE MIXER MEANS 4, comprising a first MULTIPLIER MEANS, a second MULTIPLIER MEANS, a third MULTIPLIER MEANS, a fourth MULTIPLIER MEANS, a fifth MULTIPLIER MEANS, and a sixth MULTIPLIER MEANS; wherein said step of performing correlation of said I estimate of L2 W code and said Q estimate of L2 W code with said estimate of L1 W code by said CODE MIXER MEANS 4 at 3 time points (early, punctual and late) on the autocorrelation graph creating an early, a punctual and a late sample of the autocorrelation function, further comprises the steps of:

multiplying said I estimate of L2 W code at early time point (E) on the autocorrelation function graph with said estimate of L1 W code and creating an early (E) I correlation between estimate of L2 W code and estimate of L1 W code by said first MULTIPLIER MEANS;

multiplying said I estimate of L2 W code at punctual time point (P) on the autocorrelation function graph with said estimate of L1 W code and creating a punctual (P) I correlation between estimate of L2 W code and estimate of L1 W code by said second MULTIPLIER MEANS;

multiplying said I estimate of L2 W code at late time point (L) on the autocorrelation function graph with said estimate of L1 W code and creating a late (L) I correlation between estimate of L2 W code and estimate of L1 W code by said third MULTIPLIER MEANS;

multiplying said Q estimate of L2 W code at early time point (E) on the autocorrelation function graph with said estimate of L1 W code and creating an early (E) Q correlation between estimate of L2 W code and estimate of L1 W code by said fourth MULTIPLIER MEANS;

multiplying said Q estimate of L2 W code at punctual time point (P) on the autocorrelation function graph with said estimate of L1 W code and creating a punctual (P) Q correlation between estimate of L2 W code and estimate of L1 W code by said fifth MULTIPLIER MEANS; and multiplying said Q estimate of L2 W code at late time point (L) on the autocorrelation function graph with said estimate of L1 W code and creating a late (L) Q correlation between estimate of L2 W code and estimate of L1 W code by said sixth MULTIPLIER MEANS.

54. The method of claim 43, said CODE MIXER MEANS 5 further comprising a first MULTIPLIER MEANS 1, a second MULTIPLIER MEANS 2, a third MULTIPLIER MEANS 3, a fourth MULTIPLIER MEANS 4, a fifth MULTIPLIER MEANS 5, and a sixth MULTIPLIER MEANS 6; wherein said step of performing of code correlation by said CODE MIXER MEANS 5 at 3 time points (early, punctual and late) on the autocorrelation function graph creating an early, a punctual and a late sample of the autocorrelation function, further comprises the steps of:

multiplying said I estimate of L2 W code with an early version (E) of said local P1 code by said first MULTIPLIER MEANS 1;

multiplying said I estimate of L2 W code with a punctual version (P) of said local P1 code by said second MULTIPLIER MEANS 2;

multiplying said I estimate of L2 W code with a late version (L) of said local P1 code by said third MULTIPLIER MEANS 3;

multiplying said I estimate of L2 W code with an early version (E) of said local C/A code by said fourth MULTIPLIER MEANS 4;

multiplying said Q estimate of L2 W code with a punctual version (P) of said local C/A code by said fifth MULTIPLIER MEANS 5; and multiplying said Q estimate of L2 W code with a late version (L) of said local C/A code by said sixth MULTIPLIER MEANS 6.

55. The method of claim 42, said CODE GENERATOR MEANS comprising a first dividing means, a C/A CODE GENERATOR MEANS, and a P CODE GENERATOR MEANS; wherein said step of providing a locally generated replica of C/A code by said CODE GENERATOR MEANS further comprises the steps of:

providing a C/A CODE GENERATOR MEANS clock signal by dividing an input signal from said CODE NCO MEANS by said first dividing means;

transforming said C/A CODE GENERATOR MEANS clock signal into a C/A code signal and into an EPOCH signal under the control of said MICROPROCESSOR MEANS by said C/A CODE GENERATOR MEANS, wherein said EPOCH signal is used as a timing signal for said CORRELATORS MEANS 1 and said CORRELATORS MEANS 2; and clocking said P CODE GENERATOR MEANS by said CODE NCO MEANS signal under the control of said MICROPROCESSOR MEANS.

56. The method of claim 42, said DIGITAL DELAY MEANS 1 comprising a SHIFT REGISTER MEANS (1 . . . k) and a MULTIPLEXER MEANS, wherein said step of delaying said L1 W code estimate by said DIGITAL DELAY MEANS 1 under said MICROPROCESSOR MEANS system control further comprises the steps of:

delaying said locally generated L1 W code estimate by i-sample clocks by said SHIFT REGISTER MEANS (1 . . . k), wherein said (i) is an integer greater or equal to 1 and less or equal to k, and wherein said integer (i) is selected under the control of said MICROPROCESSOR MEANS, and wherein said delayed locally generated L1 W code estimate is aligned with said filtered L2 W code estimate; and outputting said delayed locally generated L1 W code estimate by said MULTIPLEXER MEANS.

57. The method of claim 42, said DIGITAL DELAY MEANS 2 comprising a SHIFT REGISTER MEANS (1 . . . k), and a MULTIPLEXER MEANS, wherein said step of delaying said P code output from said CODE GENERATOR MEANS by said DIGITAL DELAY MEANS 2 further comprises the steps of:

delaying said locally generated L1 P code by i-sample clocks by said SHIFT REGISTER MEANS (1 . . . k), wherein said (i) is an integer greater or equal to 1 and less or equal to k, and wherein said integer (i) is selected under the control of said. MICROPROCESSOR MEANS, and wherein said delayed locally generated P1 code is aligned with said L2 P code; and outputting said delayed locally generated P1 code by said MULTIPLEXER MEANS.

58. The method of claim 42, said DIGITAL FILTER MEANS 1 comprising a first L-bit SHIFT REGISTER MEANS, L being an integer, an X-number of MULTIPLIER MEANS, X being an integer, an ADDER MEANS, a dividing means, and a second SHIFT REGISTER MEANS; wherein said step of reducing the bandwidth of said L1 W code estimate by said DIGITAL FILTER MEANS 1 further comprises the steps of:

making an X- number of delayed copies of said estimate of L1 W code by said first SHIFT REGISTER MEANS (W1,W2, . . . Wx), wherein a first copy L1 W1-code is delayed by one sample clock, a second copy L1 W2-code is delayed by two sample clocks, an (i) copy L1 Wi is delayed by (i) sample clocks, i being an integer, and an x-copy L1 Wx-code is delayed by (x) sample clocks;

transforming said first L1 W1-code into a L1 C1W1-code by said first MULTIPLIER MEANS C1;

transforming said second L1 W2-code into a L1 C2W2-code by said second MULTIPLIER MEANS C2;

performing the transformation of said L1 Wi-code into a L1 CiWi code by said (i) MULTIPLIER MEANS Ci for each (i), wherein said (i) is an integer greater than 1 and less than k;

transforming said L1 Wx-code into a L1 CxWx-code by said (x) MULTIPLIER MEANS Cx;

adding each said L1 CiWi-codes into an estimate of the output code function L1 Wout by said ADDER MEANS, wherein said output code function is equal to: Wout=C1W1+C2W2+ . . . CxWx;

dividing said SCLK signal by K to reduce the rate of said output code function by said dividing means: and producing an early (E), punctual (P), and a late (L) versions of said estimate of the output code function L1 Wout-code by said second SHIFT REGISTER MEANS; wherein said DIGITAL FILTER MEANS 1 reduces the bandwidth of said L1 W code estimate.

59. The method of claim 43, said DIGITAL FILTER MEANS 2 comprising a first L-bit SHIFT REGISTER MEANS, L being an integer, an X-number of MULTIPLIER MEANS, X being an integer, an ADDER MEANS, a dividing means, and a FLIP-FLOP MEANS; wherein said step of reducing the bandwidth of said I estimate of L2 W code by said DIGITAL FILTER MEANS 2 further comprises the steps of:

making an X- number of delayed copies of said I estimate of L2 W code by said first SHIFT REGISTER MEANS (W1,W2, . . . Wx), wherein a first copy of I estimate of L2 W 1-code is delayed by one sample clock, a second copy of I estimate of L2 W2-code is delayed by two sample clocks, an (i) copy of I estimate of L2 Wi is delayed by (i) sample clocks, i being an integer, and an x-copy of I estimate of L2 Wx-code is delayed by (x) sample clocks;

transforming said first I estimate of L2 W 1-code into a I estimate of L2 C1W1-code by said first MULTIPLIER MEANS C1;

transforming said second I estimate L2 W2-code into a I estimate of L2 C1W2-code by said second MULTIPLIER MEANS C2;

performing the transformation of said I estimate of L2 Wi-code into a I estimate of L2 CiWi code by said (i) MULTIPLIER MEANS Ci for each (i), wherein said i is an integer greater than 1 and less than k;

transforming said I estimate of L2 Wx -code into a I estimate of L2 CxWx-code by said (x) MULTIPLIER MEANS Cx;

adding each said I estimate of L2 CiWi-codes into an I estimate of the output code function L2 Wout-code by said ADDER MEANS, wherein said output code function is equal to: Wout=C1W1+C2W2+ . . . CxWx;

dividing said SCLK signal by K to reduce the rate of said output code function by said dividing means; and reducing the rate of said output code function by said FLIP-FLOP MEANS;

wherein said DIGITAL FILTER MEANS 2 reduces the bandwidth of said I estimate of L2 W code.

60. The method of claim 43, said DIGITAL FILTER MEANS 3 comprising a first L-bit SHIFT REGISTER MEANS, L being an integer, an X-number of MULTIPLIER MEANS, X being an integer, an ADDER MEANS, a dividing means, and a FLIP-FLOP MEANS; wherein said step of reducing the bandwidth of said Q estimate of L2 W code by said DIGITAL FILTER MEANS 3 further comprises the steps of:

making an X- number of delayed copies of said Q estimate of L2 W code by said first SHIFT REGISTER MEANS (W1,W2, . . . Wx), wherein a first copy of Q estimate of L2 W1-code is delayed by one sample clock, a second copy of Q estimate of L2 W2-code is delayed by two sample clocks, an (i) copy of Q estimate of L2 Wi is delayed by (i) sample clocks, i being an integer, and an x-copy of Q estimate of L2 Wx-code is delayed by (x) sample clocks;

transforming said first Q estimate of L2 W 1-code into a Q estimate of L2 C1W1-code by said first MULTIPLIER MEANS C1;

transforming said second Q estimate L2 W2-code into a Q estimate of L2 C2W2-code by said second MULTIPLIER MEANS C2;

performing the transformation of said Q estimate of L2 Wi-code into a Q estimate of L2 CiWi code by said (i) MULTIPLIER MEANS Ci for each (i), wherein said i is an integer greater than 1 and less than k;

transforming said Q estimate of L2 Wx -code into a Q estimate of L2 CxWx-code by said (x) MULTIPLIER MEANS Cx;

adding each said Q estimate of L2 CiWi-codes into an Q estimate of the output code function L2 Wout-code by said ADDER MEANS, wherein said output code function is equal to: Wout=C1W1+C2W2+ . . . CxWx;

dividing said SCLK signal by K to reduce the rate of said output code function by said dividing means; and reducing the rate of said output code function by said FLIP-FLOP MEANS;

wherein said DIGITAL FILTER MEANS 3 reduces the bandwidth of said Q estimate of L2 W code.

61. The method of claim 42, said block CORRELATORS MEANS 1 comprising a first UP/DOWN COUNTER MEANS 1, a first LATCH MEANS, a second UP/DOWN COUNTER MEANS 2, a second LATCH MEANS, a third UP/DOWN COUNTER MEANS 3, a third LATCH MEANS, a fourth UP/DOWN COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS 1 further comprises the steps of:

integrating said IE across a period defined by said C/A EPOCH signal by said first UP/DOWN COUNTER MEANS 1; wherein said UP/DOWN COUNTER MEANS 1 adds if the input is positive and subtracts if it is negative and is reset on EPOCH;

using said first LATCH MEANS for reading said integrated IE signal by said MICROPROCESSOR MEANS system;

integrating said IP across a period defined by said C/A EPOCH signal by said second UP/DOWN COUNTER MEANS 2;

using said second LATCH MEANS for reading said integrated IP signal by said MICROPROCESSOR MEANS system;

integrating said IL across a period defined by said C/A EPOCH signal by said third UP/DOWN COUNTER MEANS;

using said third LATCH MEANS for reading said integrated IL signal by said MICROPROCESSOR MEANS system;

integrating said QE across a period defined by said C/A EPOCH signal by said fourth UP/DOWN COUNTER MEANS 4;

using said fourth LATCH MEANS for reading said integrated QE signal by said MICROPROCESSOR MEANS system;

integrating said QP across a period defined by said C/A EPOCH signal by said fifth UP/DOWN COUNTER MEANS 5;

using said fifth LATCH MEANS for reading said integrated QP signal by said MICROPROCESSOR MEANS system;

integrating said QL across a period defined by said C/A EPOCH signal by said sixth UP/DOWN COUNTER MEANS 6; and using said sixth LATCH MEANS for reading said integrated QP signal by said MICROPROCESSOR MEANS system;

wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A code with said locally generated version of C/A code across a time period given by a multiple of L1 C/A EPOCH code; and wherein said IE,IL,QE, and QL are used by said code tracking loop by forming:

a code phase estimate=K1(IE−IL), when said carrier loop is locked; or a code phase estimate=$K1[(IE^2+QE^2)^{1/2}-(IL^2+QL^2)^{1/2}]$, when said carrier loop is not locked; K1 being an L1 code loop gain factor; and wherein said IP, and QP are used by said carrier tracking loop by forming:

a carrier phase estimate=arctan(QP/IP).

62. The method of claim 43, said block CORRELATORS MEANS 2 comprising a first UP/DOWN COUNTER MEANS 1, a first LATCH MEANS, a second UP/DOWN COUNTER MEANS 2, a second LATCH MEANS, a third UP/DOWN COUNTER MEANS 3, a third LATCH MEANS, a fourth up/down COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS 2 further comprises the steps of:

integrating said IE across a period defined by said C/A EPOCH signal by said first UP/DOWN COUNTER MEANS 1; wherein said UP/DOWN COUNTER MEANS adds if the input is positive and subtracts if it is negative and is reset on EPOCH;

using said first LATCH MEANS for reading said integrated IE signal by said MICROPROCESSOR MEANS system;

integrating said IP across a period defined by said C/A EPOCH signal by said second UP/DOWN COUNTER MEANS 2;

using said second LATCH MEANS for reading said integrated IP signal by said MICROPROCESSOR MEANS system;

integrating said IL across a period defined by said C/A EPOCH signal by said third UP/DOWN COUNTER MEANS 3;

using said third LATCH MEANS for reading said integrated IL signal by said MICROPROCESSOR MEANS system;

integrating said QE across a period defined by said C/A EPOCH signal by said fourth UP/DOWN COUNTER MEANS 4;

using said fourth LATCH MEANS for reading said integrated QE signal by said MICROPROCESSOR MEANS system;

integrating said QP across a period defined by said C/A EPOCH signal by said fifth UP/DOWN COUNTER MEANS 5;

using said fifth LATCH MEANS for reading said integrated QP signal by said MICROPROCESSOR MEANS system;

integrating said QL across a period defined by said C/A EPOCH signal by said sixth UP/DOWN COUNTER MEANS; and using said sixth LATCH MEANS for reading said integrated QL signal by said MICROPROCESSOR MEANS system; wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the correlated samples between filtered estimates of L1 and L2 W codes across a time period given by a multiple of L2 C/A EPOCH code; and wherein said IE,IL,QE, and QL are used by said code tracking loop by forming:

a code phase estimate=K2(IE–IL), when said carrier loop is locked; or a code phase estimate=$K2[(IE^2+QE^2)^{1/2}-(IL^2+QL^2)^{1/2}]$, when said carrier loop is not locked; K2 being an L2 code loop gain factor; and wherein said IP, and QP signals are used by said carrier tracking loop by forming:

a carrier phase estimate=arctan(QP/IP).

63. The method of claim 42, said CODE NCO MEANS comprising a n-bit ACCUMULATER MEANS, a n-bit LATCH MEANS, n being an integer, and a MULTIPLEXER MEANS; wherein said step of providing a clocking signal at C/A code rate and a clocking signal at P code rate for said CODE GENERATOR MEANS by said CODE NCO MEANS further comprises the steps of:

adding on each sample clock edge the output of said LATCH MEANS to the output of said MULTIPLEXER MEANS by said ACCUMULATER;

generating one of three n-bit values (N,M or SHIFT) by said MULTIPLEXER MEANS;

outputting under normal operation CODE NCO MEANS frequency=$(N \times SCLK)/(2^n-M+N)$ by said CODE NCO MEANS: and outputting under code phase shift operation code phase shift=$(M-SHIFT)/(2^n-M+N)$ by said CODE NCO MEANS.

64. The method of claim 42, said CODE NCO MEANS comprising a 12-bit ACCUMULATER MEANS, a 12-bit LATCH MEANS, and a MULTIPLEXER MEANS; wherein said step of providing a clocking signal at C/A code rate and a clocking signal at P code rate for said CODE GENERATOR MEANS by said CODE NCO MEANS further comprises the steps of:

adding on each sample clock edge the output of said LATCH MEANS to the output of said MULTIPLEXER MEANS by said ACCUMULATER;

generating one of three 12-bit values (N,M or SHIFT) by said MULTIPLEXER MEANS;

outputting under normal operation CODE NCO MEANS frequency=10.23 MHz by said CODE NCO MEANS; and outputting under code phase shift operation code phase shift=(2619–SHIFT)/2500 sample clocks by said CODE NCO MEANS.

65. The method of claim 42, said RESOLVER MEANS comprising a COUNTER MEANS, a COMPARATOR MEANS, and a FLIP-FLOP MEANS, wherein said step of altering the resulting digital delay further comprises the steps of:

clearing said COUNTER MEANS every millisecond on the edge of MSEC signal;

setting the output state of said FLIP-FLOP MEANS to digital 0 every millisecond on the edge of MSEC signal; and clocking said FLIP-FLOP MEANS by said COMPARATOR MEANS to the output state equal to digital 1 when said COUNTER MEANS reaches a value equal to said COMPARATOR MEANS input value; and repeating said process every millisecond;

wherein said resulting digital delay=(delay 1+(2500–m)/ 25000), m being a controllable mark/space ratio; and wherein said RESOLVER MEANS is used for providing a signal with controllable mark/space ration to toggle between said delay 1 and said delay 2.

66. The method of claim 41; said L1 TRACKER MEANS comprising a MULTIPLEXER MEANS 1, a CARRIER NCO MEANS 1, a CARRIER MIXER MEANS 1, a CODE GENERATOR MEANS, a CODE MIXER MEANS, a CODE NCO MEANS, a CODE MIXER MEANS 2, a DIGITAL DELAY MEANS 1, a DIGITAL FILTER MEANS 1, a RESOLVER MEANS, and a DIGITAL DELAY MEANS 2; said L2 comprising a CARRIER NCO MEANS 2, a CARRIER MIXER MEANS 2, a CODE MIXER MEANS 3, a DIGITAL FILTER MEANS 2, a DIGITAL FILTER MEANS 3, a CODE MIXER MEANS 4, and a block CORRELATORS MEANS 2; wherein said method further comprises the steps of:

locking L1 C/A code tracking loop by said MICROPROCESSOR MEANS;

locking L1 C/A carrier tracking loop by said MICROPROCESSOR MEANS;

computing the L2 carrier frequency aiding term by said MICROPROCESSOR MEANS using the value of L1 frequency;

applying said L2 frequency aiding term to CARRIER NCO MEANS 2; wherein said L1 and L2 satellite signals are separated in time by ionospheric delay;

adjusting said DIGITAL DELAY MEANS 1 and said DIGITAL DELAY MEANS 2 to compensate for the ionospheric delay between said L1 and said L2 signals until power is found in said L2 CORRELATORS MEANS 2;

locking the L2 carrier tracking loop using said MICROPROCESSOR MEANS; and locking the L2 code tracking loop using said MICROPROCESSOR MEANS; whereby the acquisition of the satellite signals L1 and L2 is achieved.

67. The method of claim 66, wherein said method further comprises the steps of:

reading said L1 CORRELATORS MEANS and said L2 CORRELATORS MEANS by said MICROPROCESSOR MEANS;

forming the L1 code tracking loop and applying the output to said CODE NCO MEANS;

forming the L1 carrier tracking loop and applying the output to said CARRIER NCO MEANS 1;

computing the L2 frequency aiding term;

forming the L2 code and carrier tracking loop and applying the output to said DIGITAL DELAY MEANS 1, said DIGITAL DELAY MEANS 2, and said CARRIER NCO MEANS 2;

performing the L1 and L2 carrier phase measurements by reading CARRIER NCO MEANS 1's output phase and CARRIER NCO MEANS 2's output phase at a chosen MSEC reference time;

performing the L1 and L2 code phase measurements by keeping track in said MICROPROCESSOR MEANS of what shifts have been applied to said CODE NCO MEANS and DIGITAL DELAY MEANS 1 and DIGITAL DELAY MEANS 2 respectively; whereby the tracking of said satellite signals L1 and a L2 is achieved.

68. A system for optimum correlation processing of L1 and L2 signals received from a SPS satellite by a SPS RECEIVING MEANS, said system comprising:

an n-bit RECEIVING MEANS, n being integer, comprising an n-bit A/D CONVERTER for receiving a known C/A code modulated on L1 carrier frequency, for receiving an unknown Y code-modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one n-bit DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal do not contain propagation noise;

(3) extracting of an estimate of said Y code from said L1 signal, and from said L2 signal, wherein said estimate signals contain propagation noise;

(4) correlating a locally generated replica of C/A code with the received L1 code for obtaining an estimate of L1 group delay (L1 pseudo-range) and L1 carrier phase;

(5) removing said P code from said locally extracted estimate of said L1 Y code to obtain a locally extracted estimate of said L1 W code;

(6) removing said P code from said locally extracted estimate of said L2 Y code to obtain a locally extracted estimate of said L2 W code; and (7) correlating said locally extracted estimate of said L1 W code with said locally extracted estimate of said L2 W code to obtain relative offset in group delay between L1 and L2 signals and for obtaining an independent estimate of L2 carrier phase;

wherein using said n-bit RECEIVING MEANS comprising an n-bit A/D CONVERTER and each said n-bit DIGITAL CHANNEL PROCESSING MEANS reduces quantization noise as compared to using a one-bit RECEIVING MEANS comprising a one-bit A/D CONVERTER and a one-bit DIGITAL CHANNEL PROCESSING MEANS.

69. A method for optimum correlation processing of L1 and L2 signals received from a SPS satellite by a correlation processing system; said system comprising an n-bit RECEIVING MEANS and at least one n-bit DIGITAL CHANNEL PROCESSING MEANS, n being an integer; said method comprising the steps of:

providing said n-bit RECEIVING MEANS comprising an n-bit A/D CONVERTER and each said n-bit DIGITAL CHANNEL PROCESSING MEANS;

receiving a known C/A code modulated on L1 carrier frequency, an unknown Y code modulated on L1 carrier frequency signal, an unknown Y code modulated on L2 carrier frequency signal by said n-bit RECEIVING MEANS; wherein said received. L1, and L2 signals contain propagation noise; and wherein said Y code comprises a known P code and an unknown W code;

generating local replica of said C/A code modulated on L1 carrier frequency signal by each said DIGITAL CHANNEL PROCESSING MEANS;

generating local replica of said P code modulated on L1 carrier frequency signal by each said DIGITAL CHANNEL PROCESSING MEANS; wherein said locally generated replica of L1 signal do not contain propagation noise;

extracting of an estimate of said Y code from said L1 signal, and from said L2 signal by said DIGITAL CHANNEL PROCESSING MEANS; wherein said estimate signals contain propagation noise;

correlating a locally generated replica of C/A code with the received L1 code for obtaining an estimate of L1 group delay (L1 pseudo-range) and L1 carrier phase;

removing said P code from said locally extracted estimate of said L1 Y code by said CHANNEL PROCESSOR to obtain a locally extracted estimate of said L1 W code;

removing said P code from said locally extracted estimate of said L2 Y code by said CHANNEL PROCESSOR to obtain a locally extracted estimate of said L2 W code; and correlating said locally extracted estimate of said L1 W code with said locally extracted estimate of said L2 W code to obtain relative offset in group delay between L1 and L2 signals and for obtaining an independent estimate of L2 carrier phase by said CHANNEL PROCESSOR; wherein using said n-bit RECEIVING MEANS and said n-bit DIGITAL CHANNEL PROCESSING MEANS reduces quantization noise as compared to using a one-bit RECEIVING MEANS and a one-bit DIGITAL CHANNEL PROCESSING MEANS.

* * * * *

UNITED STATES PATENT AND TRADEMARK OFFICE
CERTIFICATE OF CORRECTION

PATENT NO. : 5,541,606
DATED : July. 30, 1996
INVENTOR(S) : Gary Lennen

It is certified that error appears in the above-identified patent and that said Letters Patent is hereby corrected as shown below:

Col. 1-60 should be deleted and substituted with col. 1-58 as per attached.

Signed and Sealed this

Twenty-second Day of July, 1997

Attest:

BRUCE LEHMAN

Attesting Officer

Commissioner of Patents and Trademarks

W-CODE ENHANCED CROSS CORRELATION SATELLITE POSITIONING SYSTEM RECEIVER

BACKGROUND

The invention relates to a satellite positioning system (SPS) receiver capable of receiving satellite signals which have been modulated with an unknown security code. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in realtime by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeries of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k(=1,2,...24) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range ($R_i$) between the location of the i-th SPS satellite and the SPS receiver is equal to the speed of light c times ($\Delta t_i$), wherein ($\Delta t_i$) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range $R_i$ to the satellite but only the pseudo-range ($r_i$) to each SPS satellite.

After the SPS receiver determines the coordinates of the i-th SPS satellite by picking up transmitted ephemeries constants, the SPS receiver can obtain the solution of the set of the four equations for its unknown coordinates ($x_0, y_0, z_0$) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use. If the accuracy desired in the quantity being measured by the receiver is not great, it is sufficient to use only the L1 signal carrier. However, for applications where high resolution measurements or fast measurements are to be made, both the L1 carrier and the L2 carrier must also be used, which allows to eliminate the unknown component of the time delay of the signals by the ionosphere.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. It has been disclosed publicly that the secret Y-code is the modulo-two sum of the known P-code and the unknown W-code. Since the W-code is classified, the commercial GPS users employ different techniques to obtain the quasi-demodulation of the L2 signal.

The GPS signals are intended to be recovered by correlating each incoming signal with a locally generated replica of the code: P-code or C/A code. The result of such correlation is that the carrier in the GPS signals is totally suppressed when the modulating signal is a pseudorange code sequence like the P-code or the C/A code. Thus, the received L2 signal contains no component at the L2 frequency. For the survey applications it is important to be able to reconstruct the L2 carrier and to measure its phase. So long as the P code is not encrypted, the L2 carrier is easily recovered by correlation of the received signal with the locally generated P code replica. The locally generated code is adjusted in timing to provide an optimum correlation with the incoming signal. The correlation output is then a single narrowband peak centered at the carrier frequency. The carrier recovered by correlation provides the best available signal-to-noise ratio (SNR). Although the L2 carrier can not be recovered by this correlation process when the P code is encrypted, L2 can still be recovered by squaring (multiplying the signal by itself)the incoming signal. This has an effect of removing all biphase modulation from the signal, and producing a single-frequency output signal at twice the frequency of the suppressed carrier. Thus, the L2 carrier can be obtained by squaring, regardless of whether or not the modulating P code is encrypted. However, the squaring of the signal also squares the noise component of the signal. Thus, the resulting SNR is seriously degraded (by 30 dB or more) as compared with the ratio for the carrier recovered by correlation. Moreover, squaring provides the half-wavelength carrier phase which is different from the L2 real wavelength carrier phase.

The variation of the squaring technique is proposed by Counselman III in U.S. Pat. No. 4,667,203, wherein the incoming signal is divided into upper and lower sidebands, which are multiplied together to obtain the second harmonic of the carrier signal. However, the degradation of the SNR is the same as with squaring the entire signal.

U.S. Pat. No. 4,972,431 issued to Keegan, discloses a different approach to the quasi-demodulation of the L2 signal. The incoming encrypted P code GPS signal is not immediately squared. Instead, after mixing with a local oscillator signal to lower its frequency to an intermediate frequency, the encrypted P-code signal is correlated with a locally generated P-code signal. Since the locally generated P-code signal does not perfectly match the encrypted P-code sequence, the correlation does not produce a sharp peak in the frequency spectrum. The result of the correlation is filtered by a bandpass filter, and the reduced-bandwidth signal is squared. The squared signal is processed in a delay lock code loop to maximize the spectral peak. An error signal is generated and is fed back to control the generator of P code signal as to maximize the peak in the frequency spectrum of the output signal and to effectively lock onto the incoming L2 P code signal. Simultaneously, the second harmonic of the suppressed carrier signal resulting from the squaring process is processed to provide L2 carrier phase measurements. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve integer ambiguities.

In U.S. Pat. No. 5,293,170 issued to Lorenz, the integration of the L1 and L2 signals after demodulation by locally generated carrier and P-code signals, is repetitively accomplished over a duration that is estimated to be the period of the modulation code. And further, the modulated code period is estimated to be an integer multiple of P chips. The invention assumes the knowledge of the timing of the unknown W-code, however, such W-code timing information is not available to the commercial user and can not be recovered without knowledge of the classified W-code information.

SUMMARY

The present invention is unique because it allows to design a high SNR SPS receiver capable of processing the satellite signals with an unknown W-code without making any assumptions about the W-code timing information.

One aspect of the present invention is directed to a system for optimum correlation processing of L1 and L2 signals received from at least one SPS satellite by a SPS RECEIVER. The system includes a RECEIVER for: (1) receiving a known C/A-code modulated on L1 carrier frequency; (2) receiving an unknown Y-code modulated on L1 carrier frequency signal; and (3) receiving an unknown Y-code modulated on L2 carrier frequency signal. The received L1 and L2 signals contain propagation noise, and the Y-code includes a known P-code and an unknown W-code.

The system further includes at least one DIGITAL CHANNEL PROCESSOR for: (1) locally generating replica of the C/A -code modulated on L1 carrier frequency signal; (2) locally generating replica of the P-code modulated on L1 carrier frequency signal; (3) extracting of an estimate of the Y-code from the L1 signal, and from the L2 signal; (4) correlating a locally generated replica of C/A-code with the received L1 code for obtaining an estimate of L1 group delay (L1 pseudo-range) and L1 carrier phase; (5) removing the P-code from the locally extracted estimate of the L1 Y-code to obtain a locally extracted estimate of the L1 W-code; (6) removing the P-code from the locally extracted estimate of the L2 Y-code to obtain a locally extracted estimate of the L2 W-code; and (7) correlating the locally extracted estimate of the L1 W-code with the locally extracted estimate of the L2 W-code to obtain relative offset in group delay between L1 and L2 signals and for obtaining an independent estimate of L2 carrier phase.

The system further includes a MASTER OSCILLATOR and a FREQUENCY SYNTHESIZER, wherein the FREQUENCY SYNTHESIZER generates several timing signals (LO1, LO2, SCLK, and MSEC).

The RECEIVER includes a dual frequency patch ANTENNA for receiving the L1 and L2 satellite signals; a FILTER/low noise amplifier (LNA) for performing filtering and low noise amplification of the L1 and L2 signals; a DOWNCONVERTER for mixing and converting the L1 and L2 signals; and an IF PROCESSOR for transforming the converted L1 and L2 signals into digitally sampled quadrature versions of L1 and L2 signals (IL1, QL1, IL2, QL2).

The IF PROCESSOR includes four one-bit analog-to-digital (A/D) CONVERTERs for performing 1-bit quantization operation on the IL1, QL1, IL2 and QL2 signals. The IF PROCESSOR further includes four FLIP-FLOPs for sampling the IL1, IL2, QL1, and QL2 signals at sampling clock (SCLK) rate.

The DIGITAL CHANNEL PROCESSOR includes an L1 TRACKER for tracking L1 C/A code when Y code is ON and for tracking L1 P code when Y code is OFF; an L2 TRACKER for tracking an enhanced cross correlated W code when Y code is ON and for tracking L2 P code when Y code is OFF; and a MICROPROCESSOR system. The L1 TRACKER is fed by digitized inphase IL1 and quadrature QL1 of L1 signal outputted by the IF PROCESSOR. The L2 TRACKER is fed by digitized inphase IL2 and quadrature QL2 of L2 signal outputted by the IF PROCESSOR. The L1 TRACKER and the L2 TRACKER are synchronously clocked by the SCLK signal and synchronously referenced by the MSEC signal to local reference time. When Y code is ON the L2 TRACKER is fed from the L1 TRACKER by three signals: L1 P code, filtered estimate of L1 W code, and C/A code epoch (EP code). The MICROPROCESSOR system is fed by output signals from the L1 TRACKER and the L2 TRACKER; and the L1 TRACKER and the L2 TRACKER are fed by control signal from the MICROPROCESSOR.

The L1 TRACKER includes a CODE GENERATOR for providing a locally generated replica of C/A code and P-code; a MULTIPLEXER 1 for selecting a locally generated code C/A when Y code is ON and for selecting a locally generated P-code when Y code is OFF; and a carrier numerically controlled oscillator (CARRIER NCO 1). The L1 TRACKER further includes a CARRIER MIXER 1 for multiplying digitized inphase IL1 and QL1 signals having carrier frequency with outputted by the CARRIER NCO 1 inphase and quadrature components of digital carrier; wherein the CARRIER MIXER 1 outputs inphase IL1 and quadrature QL1 signals having zero carrier frequency. The L1 TRACKER also includes a CODE MIXER 1 for code correlating the CARRIER MIXER 1 output signals with the locally generated replica of C/A code; wherein when the L1 TRACKER's carrier tracking loop is closed via the CARRIER NCO 1 the input to the CODE MIXER 1 represents the satellite signal L1 C/A code; and wherein the CODE MIXER 1 performs the code correlation at 3 time points (early, punctual and late) on the autocorrelation function graph creating an early, a punctual and a late sample of the autocorrelation function.

The L1 TRACKER further includes a block CORRELATORS 1 for integrating the IE (inphase early), the IP (inphase punctual), the IL (inphase late), the QE (quadrature early), the QP (quadrature punctual), and the QL (quadrature late) versions of the correlated samples of the L1 C/A (or P) code with the locally generated version of C/A (or P) code across a time period given by a multiple of L1 C/A EPOCH codes. The CORRELATORS 1 output signal is fed to the MICROPROCESSOR system at a rate of L1 C/A code epoch, wherein the MICROPROCESSOR uses the CORRELATORS 1 output signal to develop feedback signals for the carrier tracking loop and for the code tracking loop.

The IE, IL, QE, and QL signals are used by the code tracking loop to form:: (1) a code phase estimate=K1(IE−IL), when the carrier loop is locked; or (2) a code phase estimate=K1[(IE$^2$+QE$^2$)$^{1/2}$−(IL$^2$+QL$^2$)$^{1/2}$], when the carrier loop is not locked; K1 is an L1 code loop gain factor. The IP, and QP signals are used by the carrier tracking loop by forming a carrier phase estimate=arctan(QP/IP).

The L1 TRACKER further includes the CODE NCO to provide a clock for the CODE GENERATOR which locally generates replicas of C/A code and P-code. The CODE NCO outputs under normal operation code NCO frequency=(N× SCLK)/(2$^n$−M+N), and (2) under code phase shift operation code phase shift=(M−SHIFT)/(2$^n$−M+N).

The L1 TRACKER further includes a CODE MIXER 2 for removing known L1 P code from the estimate of L1 Y code and for outputting an estimate of L1 W code; a DIGITAL DELAY 1 for delaying the L1 W code estimate; a DIGITAL FILTER 1 for reducing the bandwidth (BW) of the L1 W code estimate; a DIGITAL DELAY 2 for delaying the P code output from the CODE GENERATOR; and a RESOLVER for altering the resulting delay being a result of the relative time spent on each delay.

The L2 TRACKER includes a carrier numerically controlled oscillator (CARRIER NCO 2) for generating the inphase and quadrature components of digital carrier; a CARRIER MIXER 2 for mixing digitized inphase IL2 and QL2 signals having carrier frequency with inphase IL2 and quadrature QL2 signals having zero carrier frequency. When L2 carrier tracking loop is locked via the CARRIER NCO 2 the IL2 output signal contains an estimate of L2 Y code and the Q L2 output signal contains no signal power.

The CODE MIXER 3 is used by the L2 TRACKER further for outputting an I estimate of L2 W code and a Q estimate of L2 W code; a CODE MIXER 4 for correlating the I estimate of L2 W code and the Q estimate of L2 W code with a signal W1, wherein the signal W1 is the estimate of L1 W code sent by the L1 TRACKER. The CODE MIXER 4 performs the code correlation at 3 time points (early, punctual and late) on the autocorrelation function graph creating an early, a punctual and a late sample of the autocorrelation function.

The L2 TRACKER further includes the CODE MIXER 5 for code correlating the CARRIER MIXER 2 output I and Q signals with outputted by the L1 TRACKER P1 code, wherein said P1 code represents a locally generated replica of L2 P code. The CODE MIXER 5 also performs the code correlation at 3 time points (early, punctual and late) on the autocorrelation function graph creating an early, a punctual and a late sample of the autocorrelation function.

The MULTIPLEXER 2 is employed by the L2 TRACKER for selecting under the control of MICROPROCESSOR the mode of operation when Y code is ON and OFF. When Y code is OFF and satellite transmits the P code on L2 the MICROPROCESSOR selects the output of CODE MIXER 5. When Y code is ON the MICROPROCESSOR selects the output of CODE MIXER 4. The block CORRELATORS 2 connected to the MULTIPLEXER 2 is used for integrating the early, punctual and late samples of the autocorrelation function. The CORRELATORS 2 output signal is fed to the MICROPROCESSOR system at a rate of the L1 C/A code epoch (EP). The MICROPROCESSOR uses the CORRELATORS 2 output signal to develop feedback signals for the carrier tracking loop and for the code tracking loop.

The block CORRELATORS 2 is used by the L2 TRACKER for integrating the IE (inphase early), the IP (inphase punctual), the IL (inphase late), the QE (quadrature early), the QP (quadrature punctual), and the QL (quadrature late) version of the correlated samples between filtered estimate of L1 and L2 W-codes across a time period given by a multiple of L1 C/A EPOCH (EP) code.

The IE,IL,QE, and QL signals are used by the code tracking loop by forming: (1) a code phase estimate=K2(IE−IL), when the carrier loop is locked; or (2) a code phase estimate=K2[(IE$^2$+QE$^2$)$^{1/2}$−(IL$^2$+QL$^2$)$^{1/2}$], when the carrier loop is not locked; K2 is an L2-code loop gain factor.

The PQ, and PI codes are used by the carrier tracking loop by forming a carrier phase estimate=arctan(PQ/PI).

One more aspect of the present invention is directed to a method for optimum correlation processing of L1 and L2 signals received from a SPS satellite by a correlation processing system comprising a RECEIVER and at least one DIGITAL CHANNEL PROCESSOR.

The method includes the steps of: (1) providing the RECEIVER and at least one DIGITAL CHANNEL PROCESSOR; (2) receiving a known C/A-code modulated on L1 carrier frequency, an unknown Y code modulated on L1 carrier frequency signal, and an unknown Y code modulated on L2 carrier frequency signal by the RECEIVER; wherein the received L1, and L2 signals contain propagation noise; and wherein the Y code comprises a known P-code and an unknown W-code; (3) generating local replica of the C/A-code modulated on L1 carrier frequency signal by the DIGITAL CHANNEL PROCESSOR; (4) generating local replica of the P-code modulated on L1 carrier frequency signal by the DIGITAL CHANNEL PROCESSOR; wherein said locally generated replica of L1 signal does not contain propagation noise; (5) extracting of an estimate of the Y code from the L1 signal, and from the L2 signal by the DIGITAL CHANNEL PROCESSOR; wherein the estimate signals contain propagation noise; (6) correlating a locally generated replica of C/A-code with the received L1 code for obtaining an estimate of L1 group delay (L1 pseudo-range) and L1 carrier phase; (7) removing the P-code from the locally extracted estimate of the L1 Y code by the CHANNEL PROCESSOR to obtain a locally extracted estimate of the L1 W-code; (8) removing the P-code from the locally extracted estimate of the L2 Y code by the CHANNEL PROCESSOR to obtain a locally extracted estimate of the L2 W-code; and (9) correlating the locally extracted estimate of the L1 W-code with the locally extracted estimate of the L2 W-code to obtain relative offset in group delay between L1 and L2 signals and for obtaining an independent estimate of L2 carrier phase by the CHANNEL PROCESSOR.

The step of receiving L1 and L2 satellite signals further comprises the steps of: (1) receiving said L1 and L2 satellite signals by the dual frequency patch ANTENNA; (2) performing filtering and low noise amplification of the L1 and L2 signals by the FILTER/low noise AMPLIFIER (LNA), wherein the FILTER/LNA determines the noise/signal ratio of the received signals L1 and L2; (3) mixing and converting the L1 and L2 signals by the DOWNCONVERTER; (4) transforming the converted L1 and L2 signals into digitally sampled quadrature versions of L1 and L2 signals (IL1, QL1, IL2, QL2) by the IF PROCESSOR; and (5) generating several timing signals by the FREQUENCY SYNTHESIZER.

The method further includes the steps of: (1) tracking L1 C/A-code when Y code is ON and tracking L1 P-code when Y code is OFF by the L1 TRACKER; (2) tracking an enhanced cross correlated W-code when Y code is ON and tracking L2 P-code when Y code is OFF by the L2 TRACKER; and (3) feeding the MICROPROCESSOR system by output signals from the L1 TRACKER and the L2 TRACKER.

The step of tracking L1 C/A-code when Y code is ON and tracking L1 P-code when Y code is OFF by the L1 TRACKER further comprises the steps of: (1) feeding the L1 TRACKER by digitized inphase IL1 and quadrature QL1 of L1 signal generated by the IF PROCESSOR; (2) synchronously clocking the L1 TRACKER by the SCLK signal outputted by the FREQUENCY SYNTHESIZER; (3) synchronously referencing the L1 TRACKER by the MSEC signal outputted by the FREQUENCY SYNTHESIZER to local reference time; (4) feeding the L1 TRACKER by control signal from the MICROPROCESSOR; (5) providing a locally generated replica of C/A code and locally generated replica of P-code by the CODE GENERATOR; (6) selecting a locally generated code C/A when Y code is ON and selecting a locally generated P-code when Y code is OFF by the MULTIPLEXER 1; (7) generating inphase and quadrature components of digital carrier by the CARRIER NCO 1; (8) generating inphase IL1 and quadrature QL1 signals having zero carrier frequency by mixing digitized inphase IL1 and QL1 signals having carrier frequency with inphase and quadrature components of digital carrier by the CARRIER MIXER 1; (9) performing code correlation of the inphase IL1 and quadrature QL1 signals with the locally generated replica of C/A code by the CODE MIXER 1 at 3 time points (early, punctual and late) on the autocorrelation function graph creating an early, a punctual and a late sample of the autocorrelation function; (10) integrating the early, punctual and late samples of said autocorrelation function by the block CORRELATORS 1; (11) feeding the MICROPROCESSOR system by an output signal of the CORRELATORS 1 at a rate of L1 C/A code epoch, wherein the MICROPROCESSOR uses the CORRELATORS 1 output signal to develop feedback signals for the carrier tracking loop and for the code tracking loop; (12) providing a clocking signal at C/A code rate and a clocking signal at P code rate by the code numerically controlled oscillator ( CODE NCO); (13) driving the CODE GENERATOR by the C/A code clocking rate and the P code clocking rate; (14) providing a mechanism for alignment of the locally generated replica of C/A code with the incoming satellite C/A code by the CODE NCO; (15) generating an estimate of L1 W code by removing the local replica of L1 P code from the estimate of L1 Y code by the CODE MIXER 2; (16) delaying the L1 W code estimate by the DIGITAL DELAY 1 under the MICROPROCESSOR system control; (17) reducing the bandwidth of the L1 W code estimate by the DIGITAL FILTER 1; (18) sending the delayed and filtered L1 W code estimate to the L2 TRACKER; (19) delaying the P code output from the CODE GENERATOR by the DIGITAL DELAY 2; (20) sending the delayed P code to the L2 TRACKER; (21) altering the resulting delay by the RESOLVER; and (22) sending the L1 C/A code epoch (EP) to the L2 TRACKER.

The step of tracking an enhanced cross correlated W code when Y code is ON and tracking L2 P-code when Y code is OFF by the L2 TRACKER further comprises the steps of: (1) feeding the L2 TRACKER by digitized inphase IL2 and quadrature QL2 of L2 signal outputted by the IF PROCESSOR; (2) synchronously clocking the L2 TRACKER by the SCLK signal outputted by the FREQUENCY SYNTHESIZER; (3) synchronously referencing the L2 TRACKER by the MSEC signal outputted by the FREQUENCY SYNTHESIZER to local reference time; (4) feeding the L2 TRACKER when Y code is ON by the L1 P-code, the filtered estimate of L1 W code, and the C/A EP code generated by the L1 TRACKER; (5) feeding the L2 TRACKER by control signal from the MICROPROCESSOR; (6) generating IL2 and QL2 signals having carrier frequency by the CARRIER NCO MEANS 2; (7) generating inphase IL2 and quadrature QL2 signals having zero carrier frequency by mixing the digitized inphase IL2 and quadrature QL2 signals having carrier frequency with the inphase and quadrature components IL2 and QL2 of digital carrier generated by the CARRIER MIXER 2, wherein when L2 carrier tracking loop is locked via said CARRIER NCO 2 the generated IL2 output contains an estimate of L2 Y code and the generated QL2 output contains no signal power; (8) performing code correlation of the IL2 and QL2 having zero frequency signals with outputted by the L1 TRACKER P1 code by the CODE MIXER 3; wherein P1 code represents a locally generated replica of L2 P-code; (9) generating an I estimate of L2 W code and a Q estimate of L2 W code by the CODE MIXER 3; (10) reducing the bandwidth of the I estimate of L2 W code by the DIGITAL FILTER 2; (11) reducing the bandwidth of the Q estimate of L2 W code by the DIGITAL FILTER 3; (12) performing code correlation of the I estimate of L2 W code and the Q estimate of L2 W code with the estimate of L1 W code by the CODE MIXER 4 at 3 time points (early, punctual and late) on the autocorrelation function graph creating an early, a punctual and a late sample of the autocorrelation function; (13) performing code correlation of the I estimate of L2 W code and the Q estimate of L2 W code with the P1 code by the CODE MIXER 5; wherein the P1 code represents a locally generated replica of L2 P code; and wherein the CODE MIXER 5 performs the code correlation at 3 time points (early, punctual and late) on the autocorrelation function graph creating an early, a punctual and a late sample of the autocorrelation function; (14) selecting under the control of MICROPROCESSOR by the MULTIPLEXER 2 the mode of operation when Y code is ON and OFF; and wherein when Y code is OFF and satellite transmits the P code on L2 the MICROPROCESSOR selects the output of CODE MIXER 5; and wherein when Y code is ON the MICROPROCESSOR selects the output of CODE MIXER 4; (15) integrating early, punctual and late samples of the autocorrelation function by the block CORRELATORS 2; and (16) feeding the MICROPROCESSOR by output signals of the CORRELATORS 2, wherein the MICROPROCESSOR uses the CORRELATORS 2 output signals to develop feedback signals for the carrier tracking loop and for the code tracking loop.

Yet one more aspect of the present invention is directed to the methods of acquisition and to the method of tracking of the satellite signals L1 and L2.

The method of acquisition comprises the steps of: (1) locking L1 C/A code tracking loop the MICROPROCESSOR; (2) locking L1 C/A carrier tracking loop by the MICROPROCESSOR; (3) computing the L2 carrier frequency aiding term by the MICROPROCESSOR using the value of L1 frequency; (4) applying the L2 frequency aiding term to CARRIER NCO 2; wherein the L1 and L2 satellite signals are separated in time by ionospheric delay; (5) adjusting the DIGITAL DELAY 1 and the DIGITAL DELAY 2 to compensate for the ionospheric delay between the L1 and said L2 signals until power is found in the L2 CORRELATORS 2; (6) locking the L2 carrier tracking loop using the MICROPROCESSOR; and (7) locking the L2 code tracking loop using the MICROPROCESSOR.

The method of tracking of the satellite signals L1 and a L2 includes the steps of: (1) reading the L1 CORRELATORS and the L2 CORRELATORS by the MICROPROCESSOR; (2) forming the L1 code tracking loop and applying the output to the CODE NCO; (3) forming the L1 carrier tracking loop and applying the output to the CARRIER NCO 1; (4) computing the L2 frequency aiding term; (5) forming the L2 code and carrier tracking loop and applying the output to the DIGITAL DELAY 1, DIGITAL DELAY 2, and CARRIER NCO 2; (6) performing the L1 and L2 carrier phase measurements by reading CARRIER NCO 1's output phase and CARRIER NCO 2's output phase at a chosen MSEC reference time; and (7) performing the L1 and L2 code phase measurements by keeping track in the MICROPROCESSOR of what shifts have been applied to the CODE NCO and DIGITAL DELAY 1 and DIGITAL DELAY 2 respectively.

Yet another aspect of the present invention is directed to a system for optimum correlation processing of L1 and L2 signals received from at least one SPS satellite by a SPS RECEIVER. The system includes an n-bit RECEIVER, n being integer, comprising an n-bit A/D CONVERTER for receiving a known C/A code modulated on L1 carrier frequency, for receiving an unknown Y code modulated on L1 carrier frequency signal, and for receiving an unknown Y code modulated on L2 carrier frequency signal, wherein the received L1, and L2 signals contain propagation noise; and wherein the Y code comprises a known PP codecode and an unknown W code; and at least one n-bit DIGITAL CHANNEL PROCESSOR for: (1) locally generating replica of the C/A code modulated on L1 carrier frequency signal; (2) locally generating replica of the P code modulated on L1 carrier frequency signal, wherein the locally generated replica of L1 signal does not contain propagation noise; (3) extracting of an estimate of the Y code from the L1 signal, and from the L2 signal, wherein the estimate signals contain propagation noise; (4) correlating a locally generated replica of C/A code with the received L1 code for obtaining an estimate of L1 group delay (L1 pseudo-range) and L1 carrier phase; (5) removing the P code from the locally extracted estimate of the L1 Y code to obtain a locally extracted estimate of the L1 W code; (6) removing the P code from the locally extracted estimate of the L2 Y code to obtain a locally extracted estimate of the L2 W code; and (7) correlating the locally extracted estimate of L1 W code with the locally extracted estimate of L2 W code to obtain relative offset in group delay between L1 and L2 signals and for obtaining an independent estimate of L2 carrier phase; wherein using the n-bit RECEIVER comprising an n-bit A/D CONVERTER and the n-bit DIGITAL CHANNEL PROCESSOR reduces quantization noise as compared to using a one-bit RECEIVER comprising a one-bit A/D CONVERTER and a one-bit DIGITAL CHANNEL PROCESSOR.

One more aspect of the present invention is directed to the method for optimum correlation processing of L1 and L2 signals received from at least one SPS satellite by a correlation processing system; wherein the system includes an n-bit RECEIVER and at least one n-bit DIGITAL CHANNEL PROCESSOR, n being an integer; and wherein using the n-bit RECEIVER and the n-bit DIGITAL CHANNEL PROCESSOR reduces quantization noise as compared to using a one-bit RECEIVER and a one-bit DIGITAL CHANNEL PROCESSOR.

BRIEF DESCRIPTION OF THE DRAWINGS.

FIG. 1 illustrates a simplified block-diagram of the W code enhanced GPS RECEIVER having two major parts—a RECEIVER and a DIGITAL CHANNEL PROCESSOR.

FIG. 2 shows a FILTER/low noise amplifier LNA for filtering and amplifying L1 and L2 signals.

FIG. 3 depicts a MASTER OSCILLATOR for generating timing signals with reference frequency 10 MHz and 5 MHz.

FIG. 4 illustrates a FREQUENCY SYNTHESIZER for outputting a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

FIG. 5 shows a DOWNCONVERTER for converting a L1 signal into a 175.42 MHz signal and for converting a L2 signal into a 172.4 MHz signal.

FIG. 6 is an illustration of a IF (intermediate frequency) PROCESSOR for generating digitized output samples of the GPS signals with carrier frequencies of 420 KHz and 2.6 MHz respectively.

FIG. 7 depicts a DIGITAL CHANNEL PROCESSOR including an L1 TRACKER, an L2 TRACKER, and a MICROPROCESSOR SYSTEM.

FIG. 8 shows a L1 TRACKER for tracking L1 C/A code when Y code is ON.

FIG. 9 illustrates a L2 TRACKER for facilitating the combining of an estimate of the L1 W code with an estimate of the L2 W code.

FIG. 10a is a depiction of a first CARRIER (numerically controlled oscillator) NCO 1 for performing the carrier phase measurements of L1 signal.

FIG. 10b is an illustration of a second CARRIER (numerically controlled oscillator) NCO 2 for performing the carrier phase measurements of L2 signal.

FIG. 11a shows a first CARRIER MIXER 1 for mixing the sampled signal L1 at 420 kHz frequency to baseband frequency.

FIG. 11b illustrates a second CARRIER MIXER 2 for mixing the sampled signals L2 at 2.6 MHz frequency to 0 Hz frequency.

FIG. 12a depicts a first CODE MIXER 1 for correlating the L1 C/A code with a locally generated version of the C/A code.

FIG. 12b is an illustration of a second CODE MIXER 2 for mixing the L1 Y code with a locally generated version of the P code.

FIG. 12c is a depiction of a third CODE MIXER 3 for removing the P code from the estimated L1 Y code by mixing the estimated L1 Y code with a local replica of the known L1 P code.

FIG. 12d shows a fourth CODE MIXER 4 for code correlating the I and Q versions of the L2 signal with the E,P, and L samples of the locally generated estimate of the W1 code.

FIG. 12e illustrates a fifth CODE MIXER 5 for code correlating the I and Q versions of the L2 signal with the locally generated estimate of the L2 P code (P1 code).

FIG. 13 depicts a CODE GENERATOR for generating a signal P1 which can be used by the L2 TRACKER to remove P code from the estimated L2 Y code to produce an estimate of the L2 W code.

FIG. 14a shows a DIGITAL DELAY 1 for bringing the filtered L1 and L2 W code estimates into alignment to measure the range offset between L1 and L2 signals.

FIG. 14b illustrates a DIGITAL DELAY 2 for providing the delay of the P code output of the CODE GENERATOR which is used as P1 code by the L2 TRACKER.

FIG. 15a depicts a DIGITAL FILTER 1 for reducing the bandwidth of the L1 W code estimate to less than 12.5 MHz.

FIG. 15b shows a DIGITAL FILTER 2 for reducing the bandwidth of the I estimate of the L2 W code.

FIG. 15c is an illustration of a DIGITAL FILTER 3 for reducing the bandwidth of the Q estimate of the L2 W code.

FIG. 16a depicts a block CORRELATORS 1 for integrating the early, punctual and late samples of the autocorrelation function of the L1 C/A code (or L1 P code) signal over the period of the L1 C/A code epoch signal (1 KHz).

FIG. 16b shows a block CORRELATORS 2 for integrating the early, punctual and late samples of the autocorrelation function of the I and Q versions of the correlation between filtered estimates of L1 and L2 W codes over the period of the L1 C/A code epoch signal (1 KHz).

FIG. 17 illustrates a CODE NCO (numerically controlled oscillator) for providing a clock at C/A and P code rates that drives the CODE GENERATOR.

FIG. 18a depicts an ACQUISITION block diagram illustrating the signal acquisition phase of the MICROPROCESSOR SYSTEM.

FIG. 18b shows a TRACKING block diagram illustrating the signal tracking phase of the MICROPROCESSOR SYSTEM.

FIG. 19 illustrates a RESOLVER block for improving the hardware resolution of the L1 to L2 hardware range measurements.

FULL DESCRIPTION OF THE PREFERRED EMBODIMENT

FIG. 1 illustrates a block diagram 10 of the GPS RECEIVER capable of demodulating the L2 signal modulated by the secret W code which is the subject of the present invention. The signal L2 is-generated by at least one satellite. Each satellite generate different signals and they are processed by different DIGITAL CHANNEL PROCESSORS, which operate exactly the same way.

FIG. 1 is an overview of the GPS receiver, all elements of which are explained in detail below. The GPS signals (L1=1575.42 MHz, L2=1227.60 MHz) enter through a dual frequency patch ANTENNA 12. The GPS ANTENNA may be a magnetically mountable model 21423-00 commercially available from Trimble Navigation of Sunnyvale, Calif. The MASTER OSCILLATOR 28 provides the reference oscillator which drives all other clocks in the system. The FREQUENCY SYNTHESIZER 18 takes the output of the MASTER OSCILLATOR and generates important clock and local oscillator frequencies used throughout the system.

A FILTER/LNA 14 performs filtering and low noise amplification of both L1 and L2 signals. The noise figure of the RECEIVER system is dictated by the performance of the FILTER/LNA combination. The DOWNCONVERTER 16 mixes both L1 and L2 signals in frequency down to approximately 175 MHz and outputs the analogue L1 and L2 signals into an IF PROCESSOR 30. The IF PROCESSOR takes the analog L1 and L2 signals at approximately 175 MHz and converts them into the digitally sampled L1 and L2 inphase and quadrature signals at carrier frequencies 420 KHz for L1 and at 2.6 MHz for L2 signals respectively.

At least one DIGITAL CHANNEL PROCESSORS 32 input the digitally sampled L1 and L2 inphase and quadrature signals. All DIGITAL CHANNEL processors are identical by design and operate on identical input samples. Each DIGITAL CHANNEL PROCESSOR is designed to digitally track the L1 and L2 signals produced by one satellite by tracking code and carrier signals and to perform code and carrier phase measurements in conjunction with the MICROPROCESSOR SYSTEM 34. One DIGITAL CHANNEL PROCESSOR is capable of tracking one satellite in both L1 and L2 channels. MICROPROCESSOR SYSTEM is a general purpose computing device which facilitates tracking and measurements processes, providing pseudorange and carrier phase measurements for a NAVIGATION PROCESSOR 38. The NAVIGATION PROCESSOR performs the higher level function of combining measurements in such a way as to produce position, velocity and time information for the differential and surveying functions.

FIG.2 shows the detailed embodiment of the FILTER/LNA 40. The L1/L2 signal from the ANTENNA 12 is power split by POWERSPLITTER 44 into L1=1575.42 MHz signal 46 and L2=1227.60 MHz signal 48. The L1 and L2 signals are separately bandpass filtered by the BANDPASS FILTERs 50 and 52 with bandwidth BW=30 MHz. Filtered L1 signal 54 and L2 signal 56 are recombined in a POWER COMBINER 58 before being fed into the low noise amplifier LNA 60. The output signal 62 represents filtered and amplified L1/L2 signal at 1575.42MHz and 1227.60 MHz respectively.

The MASTER OSCILLATOR 70 is depicted in FIG. 3. The 5 MHz signal 76 is obtained by dividing the 10 MHz oscillator output signal 72 by 2 in the DIVIDE BY 2 block 74.

FIG. 4 illustrates the FREQUENCY SYNTHESIZER 80 which takes as an input the 5 MHz signal 82 provided by the MASTER OSCILLATOR and outputs a 1st LO1 signal 90, a 2nd LO2 signal 102, a SCLK signal 100, and a MSEC signal 104; wherein these timing signals are used by different blocks of the GPS RECEIVER.

The 5 MHz signal 82 is compared with the 5 MHz signal output from a block "DIVIDE BY 5" in a PHASE DETECTOR 84. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 86 filters out the high frequency voltage noise signal having a large phase error and outputs the low frequency noise signal 87 having a small phase error which is applied to a voltage controlled oscillator (VCO) 88. The low frequency noise signal 87 causes frequency change in the VCO output signal 90. When the loop is locked, the VCO output signal having a 1400 MHz frequency is used as the 1st LO1 (local oscillator) signal. By dividing the 1st LO1 signal by 8, a block 92 "DIVIDE BY 8" outputs the 2nd LO2 local oscillator signal 102 having 175 MHz. A block 94 "DIVIDE BY 7" divides the LO2 signal and outputs the sampling clock (SCLK) signal 100 having 25 MHz. A block 98 "DIVIDE BY 25000" further divides the SCLK signal and outputs the MSEC signal 104 having 1 KHz which is used by the system for measurement of local reference time. A "DIVIDE BY 5" block 96 is used to close the LO1 loop.

The DOWNCONVERTER 110 is depicted in detail in FIG. 5 which decreases the frequency of the L1/L2 signal outputted by the FILTER/LNA The L1/L2 signal output 62 from the FILTER/LNA shown in FIG. 2 (L1=1575.42 MHz; L2=1227.60 MHz) is split in a POWER SPLITTER 116 into two signals L1 signal 118 and L2 signal 120. The L1 and L2 signals are mixed separately by the 1st LO1 1400 MHz signal 90 (outputted by the FREQUENCY SYNTHESIZER in FIG. 4) in the MIXERs 122 and 124. The L1 signal 118 after mixing becomes an L1 signal 123 signal having 175.42 MHz frequency=(1575.42−1400) MHz which is bandpass filtered by the BANDPASS FILTER 126 having a bandwidth BW=30 MHz. This operation results in a L1 signal having a BW=30 MHz. Similarly, the L2 signal after being mixed in the BANDPASS FILTER 128 with BW=30 MHz becomes an L2 signal 132 having 172.40 MHz frequency and BW=30 MHz. The AMPLIFIERs 134 and 136 respectively amplify the L1 signal 130 and L2 signal 132 and output L1 signal 138 and L2 signal 140.

FIG. 6 describes an IF (intermediate frequency) PROCESSOR which has as input signals the L1 (175.42 MHz) signal 138 and the L2 (172.4 MHz) signal 140 outputted by the DOWNCONVERTER 110.(See FIG. 5). The IF PROCESSOR also uses the 2nd. LO2 signal 102 and the SCLK signal 100 outputted by the FREQUENCY SYNTHESIZER 80 (see FIG. 4) as its timing signals. The POWERSPLITTERs 142 and 170 split the L1 and the L2 signals into two L1 and L2 signals respectively. The inphase (I) version 102 and generated by a 171 block 90° the quadrature (Q) version 173 (175) of the 2nd LO2 signal (175 MHz) are multiplied by the L1 signal in the MULTIPLIERs 144, and 146 to produce the inphase version IL1 and the quadrature version QL1 of the L1 signal at frequency 420 KHz=175.42 MHz−175 MHz and at 25 MHz sampling rate. Similarly, the inphase IL2 and the quadrature QL2 versions of the L2 signal at frequency 2.6 MHz=(175 MHz−172.4 MHz) and at 25 MHz sampling rate are generated in the MULTIPLIERs 172 and 174. The IL1 signal is lowpass filtered by a LOWPASS FILTER 148 with the BW=12.5 MHz which satisfies the Nyquist Theorem for 25 MHz sampling rate of the IL1 signal, amplified by an AMPLIFIER 152, converted by an A/D CONVERTER 156, and sampled by clocking the input signal 157 through a 160 FLIP-FLOP 1 at sampling clock (SCLK) rate. The A/D conversion can be performed by using an L-bit quantization operation, L being an integer greater or equal to 1. If L=1, the 1-bit quantization is performed and the output signal 164 contains only the Most Significant Bit (MSB) of the IL1 signal at 420 KHz. The QL1 signal is similarly processed by a LOWPASS FILTER 150, an AMPLIFIER 154, an A/D CONVERTER 158, and a FLIP-FLOP 2, wherein the output 166 signal is a digitized QL1 signal at 420 KHz. The L2 signal is being processed by a LOWPASS FILTER 176 (178) an AMPLIFIER 180 (182), an A/D CONVERTER 184 (186), and a 188 (190) FLIP-FLOP 3(4) respectively to produce an inphase version IL2 ( quadrature version QL2) of the output signal 192 (194) at 2.6 MHz. Thus, the digital output of IF PROCESSOR block are the sampled versions of GPS signal with carrier frequencies of 420 KHz and 2.6 MHz respectively. The samples include all visible satellite carrier and codes at the respective frequencies.

A DIGITAL CHANNEL PROCESSOR 202 (the number of channels is equal to the number of satellites that are available for reception by the GPS ANTENNA) given in FIG. 7 includes two main subprocessors: an L1 TRACKER 204 and an L2 TRACKER 206 which are controlled by the MICROPROCESSOR SYSTEM 218. The inputs represent the digital signals IL1 164, IL2 192, QL1 166, and QL2 194 outputted by the IF PROCESSOR as shown in FIG. 6. The timing signals SCLK 100 and MSEC 104 are supplied by the FREQUENCY SYNTHESIZER 80 as depicted in FIG. 4. The L1 TRACKER 204 is designed to track L1 C/A code when Y code is ON (and to track L1 P code when Y code is OFF). The L2 TRACKER 206 is designed to track the enhanced W code cross correlation when Y code is ON (and to track L2 P code when Y code is OFF). Operation of the L2 TRACKER is dependent on three signals P1 208, W1 210, and EP 212 outputted by the L1 TRACKER when Y code is ON, wherein the P1 signal is a locally generated L1 P code, the W1 signal is a filtered estimate of L1 W code signal, and the EP signal is a C/A code epoch from an L1 C/A CODE GENERATOR. All signals in each digital channel processor are clocked synchronously with the sampling clock SCLK 100. MSEC signal 104 is used to synchronize each digital channel processor's measurements to local reference time. The MICROPROCESSOR SYSTEM 218 coordinates the performance of the L1 TRACKER and the L2 TRACKER by employing control signals 216, 214, and 220.

The L1 TRACKER 204 (see FIG. 7) designed for tracking L1 C/A code when Y code is ON and L1 P code when Y code is OFF is given in FIG. 8. The principles of the GPS signal tracking and acquisition are described in the article authored by J. J. Spilker and entitled "GPS Signal Structure and Performance Characteristics", pp 47–53, published in Global Positioning System, Vol. 1, by The Institute of Navigation, 1980, Alexandria, Va. This article is incorporated herein by reference.

The RECEIVER can track the received GPS signals having very low signal levels by using a Delay-Lock Loop. The essential element of the Delay-Lock Loop is the block 262 CORRELATORS 1, wherein the received code is multiplied by a reference code having a time offset $\tau<T$; T being a code chip interval. The code correlation is performed at 3 time points (E-early, P-punctual and L-late) on the autocorrelation function graph. The E, P, and L samples of the autocorrelation function are integrated in the block CORRELATOR 1. However, the CORRELATORs 1 output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (the block 270 CODE NCO) or clock. This clock CODE NCO in turn drives the CODE GENERATOR 268 in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The RECEIVER also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the user RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be 4 T if a single RECEIVER is time sequenced over the four satellites.

Referring again to FIG. 8, the locally generated code (C/A when Y code is ON, and P code when Y code is OFF) is selected under the control of the 264 MULTIPLEXER 1. The 244 CARRIER NCO 1 has output inphase I signal 248 and quadrature Q signal 250 which are inphase and quadrature digital carrier at a rate which is phase locked to incoming signals via MICROPROCESSOR control of its output frequency. The input sampled signals IL1 164 and QL1 166 (at carrier frequency 420 KHz) are sent to the 246 CARRIER MIXER 1 which uses the output signals I 248 and Q 250 from the CARRIER NCO 1 to perform the frequency translation of the IL1 and QL1 signals from 420 KHz to baseband frequency. Thus, the carrier frequency is removed at this stage. The CARRIER NCO 1 block also performs the carrier phase measurements on the edge of MSEC signal 104. The output samples of the CARRIER MIXER 1 (I signal 252 and Q signal 254) and a locally generated by a CODE GENERATOR 268 replica of C/A code 263 are fed to a 256 CODE MIXER 1 which performs the code correlation.

When the carrier tracking loop is closed (via CARRIER NCO 1) and Y code is ON, the L1 TRACKER 204 is locked to the L1 C/A code satellite signal. Thus, the I input 252 to the 256 CODE MIXER 1 represents the satellite signal L1 C/A code, and the Q input 254 to the CODE MIXER 1 represents L1 Y code signal. When Y code is OFF, the CARRIER MIXER 1 outputs the L1 P code signal in its I channel 252, and outputs L1 C/A code in its Q channel 254. The CODE MIXER 1 performs correlation of the L1 C/A code in I channel and L1 Y code in Q channel with a locally generated version of the C/A code (when Y code is ON), or performs correlation of the L1 P code in I channel and L1 C/A code in Q channel with a locally generated P code ( when Y code is OFF). The result is the autocorrelated function of the C/A code in I channel 258 and noise in Q channel 260 when Y code is ON, and the autocorrelated function of the P code in I channel 258 and noise in Q channel 260 when Y code is OFF. The code correlation is performed at 3 time points (E-early, P-punctual and L-late) on the autocorrelation function graph. The E, P, and L samples of the autocorrelation function 258 and 260 are integrated in the block 262 CORRELATORS 1. The block CORRELATORS 1 is read by the MICROPROCESSOR SYSTEM 263 at a rate of 1 KHz, which is the rate of the L1 C/A code epoch. (The L1 C/A code epoch is the rate at which C/A code repeats itself). The correlator values are used by the MICROPROCESSOR SYSTEM to develop feedback for the carrier tracking loop via CARRIER NCO 1 and code tracking loop via CODE NCO.

The CODE NCO 270 provides the clock at C/A code rate when Y code is ON, and at P code rate when Y code is OFF, that drives the CODE GENERATOR 268. The CODE NCO also provides the mechanism by which the local code can be shifted into alignment with the incoming satellite code to achieve the code tracking loop lock.

When the L1 TRACKER is locked to L1 C/A code, the Q output 251 of the CARRIER MIXER 1 represents an estimate of the L1 Y code which is fed to a CODE MIXER 2 (278). The CODE MIXER 2 removes P code from the estimated L1 Y code by mixing it with a local replica of the known L1 P code. The output 277 of the CODE MIXER 2 thus represents an estimate of the L1 W code having a bandwidth (BW) of 12.5 MHz. A DIGITAL FILTER 1 (274) takes this L1 W code estimate signal and reduces the BW to approximately 700 kHz. Thus, the output signal 210 from the DIGITAL FILTER 1 represents a filtered estimate of the L1 W code with the reduced BW. A DIGITAL DELAY 1 (276) is used to delay under the MICROPROCESSOR SYSTEM control the filtered L1 W code estimate so that it becomes aligned in time with the filtered L2 W code estimate formed in the L2 TRACKER (see discussion below). The delay created by the DIGITAL DELAY 1 which is sufficient to bring the filtered L1 and L2 W code estimates into alignment represents a measurement of the range offset between L1 and L2 signals. If the resolution of the digital delay is limited to SCLK then the range resolution in hardware will be 12 meters which is the period of 25 MHz clock. The hardware resolution of this range is improved using a RESOLVER circuit 242.

The RESOLVER circuit provides an output signal 243 which can be used to create a resulting delay which is the combination of two delays, wherein each register provides a delay equal to the sample clock SCLK. The resulting delay is proportional to the relative time spent on each delay created by registers 1 and 2. (See FIG. 14a for the DIGITAL DELAY 1 and FIG. 14b for the DIGITAL DELAY 2).

EXAMPLE 1

If 50% of time is spent on delay from register 1 (one SCLK) and 50% time on delay from register 2 (two SCLK), then resulting delay will be (1SCLK+2SCLK)/2=1.5 SCLK.

The delayed and filtered L1 W code estimate 210 is outputted as signal W1 or processing by the L2 TRACKER. The CODE GENERATOR P code output 269 is delayed in DIGITAL DELAY 2 to provide a signal P1 (208) which can be used by the L2 TRACKER as its locally generated L2 P code for removing P code from the L2Y code estimate and for producing an estimate of the L2 W code. The L1 C/A code epoch (EP) 212 is also sent to the L2 TRACKER for providing a timing signal for the L2 TRACKER's block CORRELATORS 2.

The L2 TRACKER 206 illustrated in FIG. 9 is designed to facilitate the combining of an estimate of the L1 W code with an estimate of the L2 W code, wherein the code and carrier tracking of the L2 signals is accomplished and the code and carrier measurements of the L2 signals are available.

Operation of CARRIER MIXER 2, CARRIER NCO 2, CODE MIXER 3 and 4, DIGITAL FILTERs 2 and 3, and CORRELATORS 2 are functionally equivalent to their L1 TRACKER's counterparts.

The CARRIER MIXER 2 (302) performs the frequency translation of the L2 signal. It takes the inphase I version of the L2 signal 198 and the quadrature version Q of the L2 signal 194 at carrier frequency 2.6 MHz generated by the IF PROCESSOR (as shown in FIG. 6). When the carrier tracking loop is locked, the CARRIER MIXER 2 outputs an IL2 signal 305 in a 12.5 MHz bandwidth. The Q output 306 contains no signal power when the L2 carrier tracking loop is locked. The CARRIER NCO MEANS 2 (300) provides the local oscillator for this frequency transition. The IL2 output 305 and the QL2 output 306 from the CARRIER MIXER 2 are fed into a CODE MIXER 3 (310) which performs the code correlation with P1 signal 208 (locally generated by the CODE GENERATOR of FIG. 8 estimate of the L2 P code). The output signals of CODE MIXER 3 represent I estimate 320 and Q estimate 322 of the L2 W code in a 12.5 MHz bandwidth, wherein the I estimate 320 is filtered in the DIGITAL FILTER 2 (324), and wherein the Q estimate 322 is filtered in the DIGITAL FILTER 3 (326). This filtering operation is identical to the operation performed on the estimate of L1 W code by the DIGITAL FILTER 1 (see FIG. 8). The filtered version in I(330) and Q (332) channels of the estimate of L2 W code having the reduced bandwidth are fed into a CODE MIXER 4 (328) where they are correlated with the estimate of L1 W code (W1 signal 210 generated by the L1 TRACKER as shown in FIG. 8). The output of the CODE MIXER 4 represents the I version 334 and the Q version 336 of the three samples E,P, and L of the correlation function between the filtered estimates of L1 and L2 W codes. The CODE MIXER 5 (308) performs the code correlation at 3 time points (E- early, P-punctual, and L-late) creating three samples of the correlation function between outputted by the CARRIER MIXER 2 signals in the channel I (305) and in the channel Q (306) with the P1 code 208 outputted by the L1 TRACKER.

A MULTIPLEXER 2 (318) selects under the control of the MICROPROCESSOR the mode of operation when Y code is ON and OFF. When Y code is OFF the MICROPROCESSOR selects the output of CODE MIXER 5, and when Y code is ON the MICROPROCESSOR selects the output of the CODE MIXER 4.

The signals outputted by the CODE MIXER 4 or 5 are integrated in the block 316 CORRELATORS 2 in the manner similar to the operation of the block CORRELATORS 1 in the L1 TRACKER described in FIG. 8 above. The CORRELATORS 2 is read by the MICROPROCESSOR SYSTEM 218 at a 1 KHz rate. The correlation sums (E, P, and L samples in the I and Q channels) are used by the MICROPROCESSOR SYSTEM to provide estimates of phases and to facilitate feedback signals for the code and carrier tracking loops.

FIG. 10a illustrates the CARRIER NCO 1 (244) used in the L1 TRACKER for removing the carrier frequency from the IL1 and QL1 signals. This device is described in the article "All-Digital GPS Receiver Mechanization" by Peter Ould and Robert VanWechel, pp. 25–35, "Global Positioning System", Vol. II, The Institute of Navigation, Alexandria, Va., 1984. This paper is incorporated herein by reference.

The CARRIER NCO 1 includes a 32-bit ACCUMULATOR 406 which is caused to overflow periodically at the desired output frequency. The ACCUMULATOR's L-top bits, L is an integer greater or equal to 1, can be used as the CARRIER NCO 1 output wave for producing a carrier mixing signal used by the CARRIER MIXER 1 ( see FIG. 8) for frequency translation. The L=1 results in the relatively strong quantization noise produced by the one-bit approximation of the output sine wave. For all practical purposes, L=3 is sufficient to significantly reduce the quantization noise.

The satellite speed is not constant even if the RECEIVER is not movable. The RECEIVER's quartz clock is not precise enough and keeps changing all the time. Those are the two main reasons why the frequency of the received satellite signal keeps changing. To accommodate for those changes the MICROPROCESSOR keeps the carrier tracking loop locked by continuously adjusting the frequency word outputted by the CARRIER NCO.

The average CARRIER NCO 1 output frequency Fout can be expressed as: Fout=(Wc/2$^n$)Fc; where Wc is the frequency word given by (B1 ... BL), Fc is the NCO clock frequency which is SCLK (25 MHz), n is the length of NCO frequency word in bits (a typical value might be 24 bits).

EXAMPLE 2

If we wish to generate the frequency Fout=420 KHz, we should use the frequency word: Wc=(Fout*2$^n$)/Fc=(420 KHz*2$^{24}$)/25 MHz=044D01(hex). The value of Wc is being continuously adjusted by the MICROPROCESSOR SYSTEM to keep the carrier tracking loop locked.

The MICROPROCESSOR controls the CARRIER NCO frequency by latching in a new frequency word (B1 ... Bn) in a LATCH 1 (404). The frequency word (B1 ... Bn) is added to the previous CARRIER NCO 1 output sum (Q1 . . . Qn) on each sample clock (SCLK) 100. The L-top bits of the ACCUMULATOR output wave (Q1 ... Ql) are used as the CARRIER NCO 1 output wave in the I channel 248.

The first two bits (R1R2) of the carrier Q output signal 432 are generated by a first ADDER 1 (414) by adding two bits (01) (428 and 430) to the two first bits S1(424) and S2 (424) of the CARRIER NCO MEANS 1 output signal 407 (S1 ... Sn). There are the following possibilities: (S1. S2)=(0,0)=0 degrees; (0,1)=90 degrees; (1,0)=180 degrees; (1,1)=270 degrees. A third LATCH 3 (416) generates a quadrature version Q of carrier output signal L1 (250) in the form of L-bit word (R1 R2 S3 ... SL)=(M1 ... ML) by clocking in at the rate of SCLK signal the 2-top bits (R1 R2) and the L-2 least significant bits (S3 ... SL).

When the carrier tracking loop is locked, the output of the CARRIER NCO represents the phase of the local carrier which provides the phase lock with the satellite signal. The top m bits (C1 ... Cm) latched by a second LATCH 2 (412) on the MSEC timing signal represent a carrier phase measurement at this time. FIG. 10b illustrates the CARRIER NCO 2 (300 in FIG. 9) which functions in the same way as the discussed above CARRIER NCO 1.

The CARRIER MIXER 1 (246) shown in FIG. 11a is used by the L1 TRACKER to perform the frequency translation of the IL1 signal (164) and QL1 signal (166) outputted by the IF PROCESSOR to the baseband frequency signals I (252) and Q (254) using the I (248) and Q (250) output frequency words of the CARRIER NCO 1 according to the standard complex mixing operation:

$$I_{out}=(IL1)^*I+(QL1)^*Q; Q_{out}=(IL1)^*Q-(QL1)^*I.$$

MULTIPLIERS (450, 452, 454 and 456) and ADDERS (458 and 460) are employed in the CARRIER MIXER 1 246 to perform these operations and to obtain the output signals Iout (252) and Qout (254). FIG. 11b illustrates the CARRIER MIXER 2 (300) employed by the L2 TRACKER to perform the same operation on the L2 signal.

The CODE MIXER 1 (256 in FIG. 8) depicted in FIG. 12a removes the code frequency from the satellite signals L1 and L2 and allows to demodulate the information contained in the L1 and L2 signals. The function of all CODE MIXERs is similar to the function of the CODE MIXER 1. The signals I (252) and Q (254) outputted by the CARRIER MIXER 1 are multiplied by the early (480), punctual (482), and late (484) samples of the locally generated by the CODE GENERATOR C/A code 263. This operation is performed by MULTIPLIERs 1 (490), (492), (494), (496), (498), and (500) resulting in the early (258,1), punctual (258,2) and late (258,3) samples of the I signal; and in the early (260, 1), punctual (260,2) and late (260,3) samples of the Q signal. The operation of the CODE MIXER 5 shown in FIG. 12e is analogous to the operation of the CODE MIXER 1.

FIG. 12b illustrates the CODE MIXER 2 (278 in FIG. 8), wherein the incoming L1 Y signal 251 is multiplied with the locally generated L1 P code (279) by the MULTIPLIER 502 to produce the W code signal 277. The CODE MIXER 3 (310 in FIG. 9) is shown in FIG. 12c, wherein the outputted by the CARRIER MIXER 2 inphase I signal 305 and quadrature Q signal 306 is multiplied by the MULTIPLIERs 504 and 506 with the P1 signal 208 outputted by the L1 TRACKER. FIG. 12d depicts the CODE MIXER 4 (328 in FIG. 9). The early sample 210, 1 of the W 1 signal outputted by the L1 TRACKER is multiplied by the MULTIPLIER 1 (508) with the I signal 330 produced by the DIGITAL FILTER 2 to generate the early sample of the I signal 334, 1. The MULTIPLIERs 510, and 512 operate in the same way producing the punctual samples of I signal 334,2 and the late sample of I signal 334, 3. The early, punctual and late samples of the Q signal are produced by the MULTIPLIERs 514, 516, and 518.

The CODE GENERATOR (268 in FIG. 8) shown in FIG. 13 is employed by the L1 TRACKER to locally generate replica of the C/A code 265, replica of P code 269, and EPOCH signal 212 which are used for the purposes of code correlation. The input 271 of the CODE NCO 270 provides the clock and is a nominal 10.23 MHz- the P code rate. The input signal 271 is divided by 10 by the block DIVIDE BY 10 (520) to provide the C/A code generator clock at 1.023 MHz. The C/A CODE GENERATOR 522 and the P CODE GENERATOR 524 are the standard shift register sequences described in the "Interface Control Document" of Rockwell International Corporation entitled "Navstar GPS Space Segment/Navigation User Interfaces", dated Sep. 26, 1984, as revised Dec. 19, 1986, hereinafter referred to as the "ICD-GPS-200". The C/A code repeats every millisecond and produces a standard timing signal at this rate known as a timing signal for both CORRELATORS 1 and 2.

The DIGITAL DELAY 1 (276 in FIG. 8) given in FIG. 14a is employed by the L1 TRACKER for digitally delaying the L1 (1575.42 MHz) signal relatively to the L2 (1227.60 MHz) signal in order to compensate for the ionospheric delay. The L2 signal is delayed more by the ionosphere than L1 signal. Thus, to align L1 and L2 signals inside the RECEIVER it is sufficient to artificially delay L1.

The L1 W signal 277 can be delayed by different sampling clock delays as dictated by the MICROPROCESSOR SYSTEM. A SHIFT REGISTER (1, 2, . . . k) 526 includes k different registers, k is an integer, wherein one register shifts the signal by one sample clock (25 MHz).

The DIGITAL DELAY 2 of FIG. 14b (272 in FIG. 8) has the same design as the DIGITAL DELAY 1. The DIGITAL DELAY 2 is used for delaying the L1 locally generated P code 279 by 2 sample clocks to obtain the clock signal P1 208 employed by the L2 TRACKER.

The DIGITAL FILTERs 1,2 and 3 are used to reduce the BW of the input signals (12.5 MHz) such that the output signals have the BW that is approximately equal to 700 KHz. The DIGITAL FILTER 1 (274 of FIG. 8) given in FIG. 15a is used to filter the estimate of the L1. W code 275. The output W signal (561) is given by: Wout=C1W1+C2W2+. . .+CxWx; wherein Cx is the Xth filter coefficient (558) and Wx is the Xth input which is the input W (275) shifted by X samples in the SHIFT REGISTER 550. The filter coefficients C1, C2, . . . Cx are multiplied by W1, W2, . . . Wn in the MULTIPLIERS 554, 556, . . . 558 respectively. The Wout signal 561 is reduced in sample frequency by a factor K by using a DIVIDE by K block 552. Early (210, 1), punctual (210,2) and late (210,3) samples of the estimated L1 W code signal are formed in the SHIFT REGISTER 562 using the Wout signal 561. The DIGITAL FILTER 2 (324) of FIG. 15b is similar to the DIGITAL CHANNEL 1, but only the single sample of the output signal 330 in the inphase I channel is formed. The DIGITAL FILTER 3 of FIG. 15c outputs the signal 332 in the Q channel.

The function of the CORRELATORS 1 (262 of FIG. 8) given in FIG. 16a is to integrate the correlated samples IE (inphase early), IP (inphase punctual), IL (inphase late), QE (quadrature early), QP (quadrature punctual), and QL (quadrature late) of the L1 C/A (or P) satellite code with the locally generated version of C/A (or) P code across a time period given by a multiple of C/A EPOCH signals. The input sample IE (334, 1) is integrated in an UP/DOWN COUNTER 630 across a period defined by the C/A EPOCH signal.212, wherein the COUNTER adds if the input is positive and subtracts if it is negative. At the end of the integration period the correlator summations are read by the MICROPROCESSOR using a LATCH 642. Each of the IP,IL,QE,QP,and QL samples is similarly integrated by a separate UP/DOWN COUNTER.

The resulting after integration values of IE,IL,QE, and QL are used by the code tracking loop by forming a code phase estimate=K1(IE−IL), when the carrier loop is locked, or by forming a code phase estimate=K1[(IE$^2$+QE$^2$)$^{1/2}$−(IL$^2$+QL$^2$)$^{1/2}$], when the carrier loop is not locked. K1 is a L1 code loop gain factor. The IP and QP are used by the carrier tracking loop which forms a carrier phase estimate= arctan(QP/IP). The block CORRELATORS 2 (316 of FIG. 9) given in FIG. 16b is functionally similar to the block CORRELATORS 1.

The CODE NCO (270 of FIG. 8) given in FIG. 17 provides a clock at 10.23 MHz for the CODE GENERATOR in its NORMAL mode of operation. It can also shift the CODE GENERATOR early or late under the MICROPROCESSOR control by shifting its output phase in its SHIFT mode. The CODE NCO output 271 controls the phase of the locally generated codes (P and C/A) and provides the code tracking loop feedback adjustment. The CODE NCO includes a 12-bit ADDER 662 and a 12-bit LATCH. On each sample clock edge the output of the LATCH 666 is added to the output of the MULTIPLEXER 660. In the NORMAL mode of operation the output of the MULTIPLEXER is a 12-bit number N unless Q12 is 1; if Q12 is equal to 1 the output is a 12-bit number M. Thus, in the NORMAL mode the CODE NCO outputs a frequency: CODE NCO out=(N× SCLK)/(2$^{12}$−M+N).

EXAMPLE 3

Given the clock SCLK=25 MHz, in order to obtain the CODE NCO output frequency=P code rate=10.23 MHz it is sufficient to choose N=1023 and M=2619. Under the SHIFT mode the shifting of the CODE NCO output frequency is accomplished by replacing the NORMAL mode MULTIPLEXER output (N or M) by SHIFT under the MICROPROCESSOR control. If this is the case, the code phase shift is given by: code phase shift=(M− SHIFT)/(2$^{12}$−M+N), where the code shift is measured in units of sample clocks. The code shift allows to accommodate for the shift in the CODE GENERATOR frequency required for the locking of the code tracking loop.

The RESOLVER of FIG. 19 (see 242 of FIG. 8) has the function to improve the hardware resolution of the L1 to L2 hardware range measurement. The (L2−L1) range is formed by aligning the L1 W code with the L2 W code via DIGITAL DELAY 1 and 2. The delay value is the offset range between L1 and L2. The digital delays being clocked at SCLK=25 MHz have the resolution of 12 meters=(speed_of_light/ SCLK). In order to gain more precision, it is sufficient to toggle the digital delay between the two delays, wherein the resulting delay is the average of the relative time spent on each delay. The RESOLVER output 243 provides a signal with a controllable mark/space ratio to toggle between the two delays. The COUNTER 680 and the FLIP-FLOP 684 are reset to digital 0 on the MSEC signal 104. The COUNTER counts until it reaches a COMPARATOR's (682) input value which is given by the CONTROL signal 216 provided by the MICROPROCESSOR. At this point the FLIP-FLOP is clocked to digital 1. This process is repeated every millisecond. The resulting delay is given by:

digital delay=delay 1+(25000−m)/25000 in sample clock units;

where m is a mark/space ratio.

The operation of the MICROPROCESSOR system is illustrated in FIGS. 18a and 18b. FIG. 18a depicts the signal acquisition phase. At first, the L1 C/A code is locked in the code and carrier tracking loops (690). The 50 Baud data message modulated in the C/A code contains a bit flag which indicates whether Y code is ON or OFF. If Y code is OFF, the RECEIVER will attempt to lock to L1 and L2 P codes in the normal manner. If Y code is ON, the L1 TRACKER will maintain the lock on the L1 C/A code while the RECEIVER attempts to lock the L2 signal in W code enhanced cross-correlation mode. With the L1 C/A code locked, the MICROPROCESSOR computes the L2 frequency from the L1 frequency. The L1 frequency is obtained from the current value of the frequency word written to the CARRIER NCO 1. The L2 carrier frequency is computed from the L1 carrier frequency: L2 carrier freq.=L1 carrier freq.×120/154. The input to the CARRIER NCO 2 is computed as follows:

CARRIER NCO 2 input=[(CARRIER NCO 1 input− $W_{L1n}$)×120/154]+$W_{L2n}$; where

CARRIER NCO 2 input=input word to CARRIER NCO 2;

CARRIER NCO 1 input=input word to CARRIER NCO 1;

$W_{l,1n}$=zero Doppler L1 frequency word;
$W_{l,2n}$=zero Doppler L2 frequency word;
120/154=frequency ratio between L1 and L2 carriers.

This process is called aiding (692). With the frequency aiding term applied to the CARRIER NCO 2 the L2 carrier will be very close in frequency to the incoming L2 signal frequency (<1.0 Hz difference) to accommodate for the L2 signal low signal-to-noise (SNR) ratio. After the aiding process all dynamics from the L2 carrier is removed except the relatively slow ionospheric offset between L1 and L2.

The next step is the adjustment (694) of the DIGITAL DELAYS 1 and 2 to compensate for the ionospheric offset between the L1 and L2 until the L2 power is found in the CORRELATORS 2. The MICROPROCESSOR forms three values to look for power in the CORRELATORS 2:

power1=$EI^2+EQ^2$;
power2=$PI^2+PQ^2$;
power3=$LI^2+LQ^2$.

If any power1,2, or 3 surpass a preset threshold, the power is declared found.

After the power is found in the L2 CORRELATORS, the L2 carrier tracking loop (696) is closed using: L2 estimated carrier phase=arctan (PQ/PI); and the L2 code tracking loop (698) is closed using: L2 estimated code phase=EI-LI. Thus, the acquisition of the satellite signals L1 and L2 has been accomplished.

FIG. 18b depicts the signal tracking operation. At first, both sets of CORRELATORS L1 and L2 are read by the MICROPROCESSOR system (700). Secondly, the L1 code and carrier tracking loops are formed and the digital voltage feedback signals are applied to the CODE NCO and to the CARRIER NCO 1 (702). The next step is the computation of the L2 frequency aiding term (704). The following step is the formation of the L2 code and carrier tracking loops and the application of the digital feedback signals to the DIGITAL DELAYS 1 and 2 and to the CARRIER NCO 2 (706). The L1 and L2 carrier and code phase measurements are then performed. The carrier phase measurements (708) are performed on L1 and L2 by reading the CARRIER NCO 1 and 2 output phase at a chosen MSEC reference time. The L1 and L2 code measurements (710) are performed by keeping track in the MICROPROCESSOR of what shifts have been applied to the CODE NCO and to the DIGITAL DELAYs respectively.

A system and a method for optimum correlation processing of L1 and L2 satellite signals which includes an n-bit RECEIVER, n being integer, and at least one n-bit DIGITAL CHANNEL PROCESSOR is also within the scope of the present invention. The n-bit RECEIVER comprising an n-bit A/D CONVERTER and the n-bit DIGITAL CHANNEL PROCESSOR reduces quantization noise as compared to the one-bit RECEIVER comprising a one-bit A/D CONVERTER and a one-bit DIGITAL CHANNEL PROCESSOR because the n-bit digital approximation of the sine signals is more precise than the 1-bit approximation.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for optimum correlation processing of L1 and L2 signals received from a SPS satellite by a SPS RECEIVER, said system comprising:

a RECEIVING MEANS for receiving a known C/A code modulated on L1 carrier frequency, for receiving an unknown Y code modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and at least one DIGITAL CHANNEL PROCESSING MEANS for:
   (1) locally generating replica of said C/A code modulated on L1 carrier frequency signal;
   (2) locally generating replica of said P code modulated on L1 carrier frequency signal, wherein said locally generated replica of L1 signal do not contain propagation noise;
   (3) extracting of an estimate of said Y code from said L1 signal, and from said L2 signal, wherein said estimate signals contain propagation noise;
   (4) correlating a locally generated replica of C/A code with the received L1 code for obtaining an estimate of L1 group delay (L1 pseudo-range) and L1 carrier phase;
   (5) removing said P code from said locally extracted estimate of said L1 Y code to obtain a locally extracted estimate of said L1 W code;
   (6) removing said P code from said locally extracted estimate of said L2 Y code to obtain a locally extracted estimate of said L2 W code; and
   (7) correlating said locally extracted estimate of said L1 W code with said locally extracted estimate of said L2 W code to obtain relative offset in group delay between L1 and L2 signals and for obtaining an independent estimate of L2 carrier phase.

2. The system of claim 1, wherein said RECEIVING MEANS further comprises:

a dual frequency patch ANTENNA MEANS for receiving said L1 and L2 satellite signals;

a FILTER/LNA MEANS conductively connected to said ANTENNA MEANS for performing filtering and low noise amplification of said L1 and L2 signals, wherein said FILTER/LNA determines the noise/signal ratio of the received signals L1 and L2;

a DOWNCONVERTER MEANS conductively connected to said FILTER/LNA MEANS for mixing and converting said L1 and L2 signals; and an IF PROCESSOR MEANS conductively connected to said DOWNCONVERTER MEANS for transforming said converted L1 and L2 signals into digitally sampled quadrature versions of L1 and L2 signals (IL1, QL1, IL2, QL2).

3. The system of claim 2 further comprising a MASTER OSCILLATOR MEANS and a FREQUENCY SYNTHESIZER MEANS conductively connected to said MASTER OSCILLATOR MEANS, to said IF PROCESSOR MEANS, to said DOWNCONVERTER MEANS, and to at least one said DIGITAL CHANNEL PROCESSING MEANS, wherein said FREQUENCY SYNTHESIZER MEANS generates several timing signals.

4. The system of claim 3, wherein said FILTER/LNA MEANS further comprises:

a POWER SPLITTER MEANS connected to said ANTENNA MEANS for power splitting a single L1/L2 signal received by said ANTENNA MEANS into two separate L1 and L2 signals;

two separate BANDPASS FILTER MEANS connected to said POWER SPLITTER MEANS for filtering said L1 and L2 signals independently; and a POWER COMBINER MEANS connected to said separate BANDPASS FILTER MEANS for power combining said L1 and L2 signals into one combined signal L1/L2 before feeding said combined L1/L2 signal into said LNA;

wherein said LNA outputs amplified and filtered combined L1/L2 signal.

5. The system of claim 3, wherein said FREQUENCY SYNTHESIZER MEANS further comprises:

a PHASE DETECTOR MEANS for comparing phases of two signals, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

a LOOP FILTER MEANS connected to said PHASE DETECTOR MEANS for filtering out high frequency voltage noise, wherein an output LOOP FILTER MEANS voltage signal includes a low frequency voltage noise;

a VOLTAGE CONTROLLED OSCILLATOR (VCO) MEANS connected to said LOOP FILTER MEANS, wherein a voltage signal at the input of said VCO causes frequency change in said VCO output signal, and wherein said VCO nominal output signal is locked to said reference signal; and wherein said VCO nominal output signal is used as 1st local oscillator (LO1) signal;

a first DIVIDER MEANS connected to said VCO to divide said VCO output signal to obtain 2nd local oscillator (LO2) signal;

a second DIVIDER MEANS connected to said first DIVIDER MEANS to divide said 2nd LO2 signal to obtain sampling clock (SCLK); and a third DIVIDER MEANS connected to said second DIVIDER MEANS to divide said 2nd LO2 signal to obtain a signal MSEC, wherein said signal MSEC is used for measurement of local reference time.

6. The system of claim 3, wherein said FREQUENCY SYNTHESIZER MEANS further comprises:

a "Divide by 5" block;

a PHASE DETECTOR MEANS connected to said block "Divide by 5" for comparing 5 MHz input signal from said MASTER OSCILLATOR MEANS with 5 MHz signal from said "Divide by 5" block, wherein minimum voltage output signal from said PHASE DETECTOR MEANS represents maximum phase alignment of two said 5 MHz signals;

a LOOP FILTER MEANS connected to said PHASE DETECTOR MEANS for filtering out high frequency voltage noise;

a VOLTAGE CONTROLLED OSCILLATOR (VCO) MEANS connected to said LOOP FILTER MEANS, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as a 1st local oscillator (LO1);

a "Divide by 8" block connected to said VCO to divide said 1400MHz VCO output signal by 8 to obtain a 175 MHz signal used as a 2nd LO2;

a "Divide by 7" block connected to said "Divide by 8" block to divide said 175 MHz signal by 7 to obtain a 25 MHz signal used as a sampling clock (SCLK); and a "Divide by 25000" block connected to said "Divide by 7" block to divide said 25 MHz signal by 25000 to obtain a 1 KHz signal (MSEC), wherein said MSEC signal is used for measurement of local reference time.

7. The system of claim 2, wherein said DOWNCONVERTER MEANS further comprises: a POWER SPLITTER MEANS connected to said FILTER/LNA MEANS and to said frequency/synthesizer for power splitting said FILTER/LNA MEANS output L1/L2 signal into two signals;

a first MULTIPLIER MEANS connected to said POWER SPLITTER MEANS for multiplying said L1 signal with said 1st LO1 signal, wherein a first mixed signal is produced;

a second MULTIPLIER MEANS connected to said POWER SPLITTER MEANS for multiplying said L2 signal with said 1st LO1 signal, wherein a second mixed signal is produced;

a first BANDPASS FILTER MEANS connected to said first MULTIPLIER MEANS for filtering said first mixed signal;

a second BANDPASS FILTER MEANS connected to said second MULTIPLIER MEANS for filtering said second mixed signal;

a first AMPLIFIER MEANS connected to said first BANDPASS FILTER MEANS for amplifying said first filtered signal; and a second AMPLIFIER MEANS connected to said second BANDPASS FILTER MEANS for amplifying said second filtered signal.

8. The system of claim 3, wherein said IF PROCESSOR MEANS further comprises:

a first POWER SPLITTER MEANS connected to said DOWNCONVERTER MEANS and to said FREQUENCY SYNTHESIZER MEANS for power splitting said L1 signal into two signals;

a second POWER SPLITTER MEANS connected to said DOWNCONVERTER MEANS and to said FREQUENCY SYNTHESIZER MEANS for power splitting said L2 signal into two signals;

a first MULTIPLIER MEANS for multiplying said L1 signal with an inphase (I) version of said 2nd LO2 signal to produce an IL1 signal;

a second MULTIPLIER MEANS for multiplying said L1 signal with a quadrature (Q) version of said 2nd LO2 signal to produce a QL1 signal;

a third MULTIPLIER MEANS for multiplying said L2 signal with an inphase (I) version of said 2nd LO2 signal to produce an IL2 signal;

a fourth MULTIPLIER MEANS for multiplying said L2 signal with a quadrature (Q) version of said 2nd LO2 signal to produce a QL2 signal;

a first AMPLIFIER MEANS connected to said first MULTIPLIER MEANS for amplifying said IL1 signal;

a second AMPLIFIER MEANS connected to said second MULTIPLIER MEANS for amplifying said QL1 signal;

a third AMPLIFIER MEANS connected to said third MULTIPLIER MEANS for amplifying said IL2 signal;

a fourth AMPLIFIER MEANS connected to said fourth MULTIPLIER MEANS for amplifying said QL2 signal;

a first one-bit analog-to-digital (A/D) CONVERTER MEANS connected to said first AMPLIFIER MEANS for performing 1-bit quantization operation on said IL1 signal;

a second one-bit analog-to-digital (A/D) CONVERTER MEANS connected to said second AMPLIFIER MEANS for performing 1-bit quantization operation on said QL1 signal;

a third one-bit analog-to-digital (A/D) CONVERTER MEANS connected to said third AMPLIFIER MEANS for performing 1-bit quantization operation on said IL2 signal;

a fourth one-bit analog-to-digital (A/D) CONVERTER MEANS connected to said fourth AMPLIFIER MEANS for performing 1-bit quantization operation on said QL2 signal;

a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP MEANS (FF3) connected to said third one-bit A/D CONVERTER for sampling said IL2 signal, wherein said sampling operation is performed by clocking said IL2 signal through said FF3 at sampling clock (SCLK) rate; and a fourth FLIP-FLOP MEANS (FF4) connected to said fourth one-bit A/D CONVERTER for sampling said QL2 signal, wherein said sampling operation is performed by clocking said QL2 signal through said FF4 at sampling clock (SCLK) rate.

9. The system of claim 8, wherein each said DIGITAL CHANNEL PROCESSING MEANS further comprises:

an L1 TRACKER MEANS for tracking L1 C/A code when Y code is ON and for tracking L1 P code when Y code is OFF;

an L2 TRACKER MEANS connected to said L1 TRACKER MEANS for tracking an enhanced cross correlated W code when Y code is ON and for tracking L2 P code when Y code is OFF; and a MICROPROCESSOR MEANS system connected to said L1 TRACKER MEANS and to said L2 TRACKER MEANS;

wherein said L1 TRACKER MEANS is fed by digitized inphase IL1 and quadrature QL1 of L1 signal outputted by said IF PROCESSOR MEANS; and wherein said L2 TRACKER MEANS is fed by digitized inphase IL2 and quadrature QL2 of L2 signal outputted by said IF PROCESSOR MEANS; and wherein each said L1 and L2 TRACKER MEANS are synchronously clocked by said SCLK signal and synchronously referenced by said MSEC signal to local reference time; said SCLK and MSEC signals being outputted by said FREQUENCY SYNTHESIZER MEANS; and wherein said L2 TRACKER MEANS when Y code is ON is fed from said L1 TRACKER MEANS by generated by said L1 TRACKER MEANS three signals: L1 P code, filtered estimate of L1 W code, and C/A code epoch (EP code); and wherein said MICROPROCESSOR MEANS system is fed by output signals from said L1 TRACKER MEANS and said L2 TRACKER MEANS; and wherein said L1 TRACKER MEANS and said L2 TRACKER MEANS are fed by control signal from said MICROPROCESSOR MEANS.

10. The system of claim 9, wherein said L1 TRACKER MEANS further comprises:

a CODE GENERATOR MEANS for providing a locally generated replica of C/A code and P code;

a MULTIPLEXER MEANS 1 connected to said CODE GENERATOR MEANS for selecting a locally generated code C/A when Y code is ON and for selecting a locally generated P code when Y code is OFF, said MULTIPLEXER MEANS 1 being controlled by said MICROPROCESSOR MEANS system;

a carrier numerically controlled oscillator (CARRIER NCO MEANS1) connected to said MULTIPLEXER MEANS 1;

a CARRIER MIXER MEANS 1 connected to said CARRIER NCO MEANS1 for multiplying outputted by said IF PROCESSOR MEANS digitized inphase IL1 and Q L1 signals having carrier frequency with outputted by said CARRIER NCO MEANS1 inphase and quadrature components of digital carrier; wherein said CARRIER MIXER MEANS 1 outputs inphase IL1 and quadrature Q L1 signals having zero carrier frequency;

a CODE MIXER MEANS 1 connected to said CARRIER MIXER MEANS 1, connected to said CODE GENERATOR MEANS and connected to said CARRIER NCO MEANS1 for code correlating said CARRIER MIXER MEANS 1 output signals with said locally generated replica of C/A code; wherein when said L1 TRACKER MEANS's carrier tracking loop is closed via said CARRIER NCO MEANS 1 the input to said CODE MIXER MEANS 1 represents the satellite signal L1 C/A code; and wherein said CODE MIXER MEANS 1 performs said code correlation at 3 time points (early, punctual and late) on the autocorrelation function graph creating an early, a punctual and a late sample of the autocorrelation function;

a block CORRELATORS MEANS 1 connected to said CODE MIXER MEANS 1 for integrating said early, punctual and late samples of said autocorrelation function; wherein said CORRELATORS MEANS 1 output signal is fed to said MICROPROCESSOR MEANS system at a rate of L1 C/A code epoch, and wherein said MICROPROCESSOR MEANS uses said CORRELATORS MEANS 1 output signal to develop feedback signals for the carrier tracking loop and for the code tracking loop;

a code numerically controlled oscillator ( CODE NCO MEANS) connected to said block CORRELATORS MEANS 1 and connected to said CODE GENERATOR MEANS for providing a clocking signal at C/A code rate and for providing a clocking signal at P code rate, said C/A code clocking rate and said P code clocking rate driving said CODE GENERATOR MEANS; said CODE NCO MEANS also providing a mechanism for aligning said locally generated replica of C/A code with said incoming satellite C/A code;

a CODE MIXER MEANS 2 connected to said CARRIER MIXER MEANS 1 and connected to said CODE GENERATOR MEANS, said CARRIER MIXER MEANS 1 outputting an estimate of L1 Y code as an input to said CODE MIXER MEANS 2, said CODE GENERATOR MEANS outputting said local replica of known L1 P code as input to said CODE MIXER MEANS 2, wherein said CODE MIXER MEANS 2 removes known L1 P code from said estimate of L1 Y code and outputs an estimate of L1 W code;

a DIGITAL DELAY MEANS 1 connected to said CODE MIXER MEANS 2 for delaying under said MICROPROCESSOR MEANS system control said L1 W code estimate;

a DIGITAL FILTER MEANS 1 connected to said DIGITAL DELAY MEANS 1 for reducing the bandwidth of said L1 W code estimate; wherein said delayed and filtered L1 W code estimate is sent for processing to said L2 TRACKER MEANS;

a DIGITAL DELAY MEANS 2 connected to said CODE GENERATOR MEANS for delaying said P code output from said CODE GENERATOR MEANS, wherein said delayed P code is sent to said L2 TRACKER MEANS; and a RESOLVER MEANS connected to said CARRIER NCO MEANS 1 for toggling the digital delay between the two delays in the DIGITAL DELAY 1 and in the DIGITAL DELAY 2, wherein the resulting delay is the average of the relative time spent on each said delay;

and wherein said L1 C/A code epoch (EP) is sent to said L2 TRACKER MEANS.

11. The system of claim 10, said L2 TRACKER MEANS further comprising:

a carrier numerically controlled oscillator (CARRIER NCO MEANS2);

a CARRIER MIXER MEANS 2 connected to said CARRIER NCO MEANS2 for mixing outputted by said IF PROCESSOR MEANS digitized inphase I L2 and Q L2 signals having carrier frequency with outputted by said CARRIER NCO MEANS2 inphase and quadrature components of digital carrier; wherein said CARRIER MIXER MEANS 2 outputs inphase I L2 and quadrature Q L2 signals having zero carrier frequency; and wherein when L2 carrier tracking loop is locked via said CARRIER NCO MEANS2 said I L2 output contains an estimate of L2 Y code and said Q L2 output contains no signal power;

a CODE MIXER MEANS 3 connected to said CARRIER MIXER MEANS 2 for code correlating said CARRIER MIXER MEANS 2 output I and Q signals with outputted by said L1 TRACKER MEANS P 1 code, wherein said P 1 code represents a locally generated replica of L2 P code, and wherein said CODE MIXER MEANS 3 outputs an I estimate of L2 W code and a Q estimate of L2 W code;

a DIGITAL FILTER MEANS 2 connected to said CODE MIXER MEANS 3 for reducing the bandwidth of said I estimate of L2 W code;

a DIGITAL FILTER MEANS 3 connected to said CODE MIXER MEANS 3 for reducing the bandwidth of said Q estimate of L2 W code;

a CODE MIXER MEANS 4 connected to said DIGITAL FILTER MEANS 2 and connected to said DIGITAL FILTER MEANS 3 for correlating said I estimate of L2 W code and said Q estimate of L2 W code with a signal W1, wherein said signal W1 is said estimate of L1 W code sent by said L1 TRACKER MEANS; and wherein said CODE MIXER MEANS 4 performs said code correlation at 3 time points (early, punctual and late) on the autocorrelation function graph creating an early, a punctual and a late sample of the autocorrelation function;

a CODE MIXER MEANS 5 connected to said CARRIER MIXER MEANS 2 for code correlating said CARRIER MIXER MEANS 2 output I and Q signals with outputted by said L1 TRACKER MEANS P1 code, wherein said P1 code represents a locally generated replica of L2 P code, and wherein said CODE MIXER MEANS 5 performs said code correlation at 3 time points (early, punctual and late) on the autocorrelation function graph creating an early, a punctual and a late sample of the autocorrelation function;

a MULTIPLEXER MEANS 2 connected to said CODE MIXER MEANS 5 and connected to said CODE MIXER MEANS 4 for selecting under the control of MICROPROCESSOR MEANS the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4; and a block CORRELATORS MEANS 2 connected to said MULTIPLEXER MEANS 2 for integrating said early, punctual and late samples of said autocorrelation function; wherein said CORRELATORS MEANS 2 output signal is fed to said MICROPROCESSOR MEANS system at a rate of sent by said L1 TRACKER MEANS said L1 C/A code epoch (EP), and wherein said MICROPROCESSOR MEANS uses said CORRELATORS MEANS 2 output signal to develop feedback signals for the carrier tracking loop and for the code tracking loop.

12. The system of claim 10, wherein said CARRIER NCO MEANS 1 further comprises:

an n-bit ACCUMULATOR MEANS, n being an integer, for adding a new frequency word (B1 ... Bn), B1 being the most significant bit (MSB), to a previous CARRIER NCO MEANS 1 output frequency word (Q1 ... Qn) on each sample clock, wherein said ACCUMULATOR MEANS is caused to overflow periodically at the predetermined output frequency;

a first LATCH MEANS 1 connected to said ACCUMULATOR MEANS for latching in said new frequency word B1 ... Bn under the control signal of said MICROPROCESSOR MEANS, wherein L-top bits of said ACCUMULATOR MEANS output wave are used as said CARRIER NCO MEANS 1 (I) output wave; L being an integer, L being less than n, L being greater or equal to 1; and wherein when the carrier tracking loop is locked L-top bits of said CARRIER NCO MEANS 1 output wave are used as the inphase version (I) of the carrier signal L1 which is phase locked with the satellite signal;

a first ADDER MEANS 1 for adding (01) to the 2-top bits (S1 S2) of the CARRIER NCO MEANS 1 output (S1 ... Sn) frequency word to obtain 2-top bits (R1 R2);

a third LATCH MEANS 3 connected to said first ADDER MEANS 1 for generating a quadrature version Q of carrier signal L1 by clocking in at the rate of SCLK signal said 2-top bits (R1 R2); and wherein said LATCH MEANS 3 generates said QL1 signal in the form of L-bit word (R1 R2 S3 ... SL);

a second LATCH MEANS 2 connected to said ACCUMULATOR MEANS for latching top m bits (C1 ... Cm), m being an integer (m<n), of the CARRIER NCO MEANS 1 output signal on the edge of the MSEC timing signal, wherein said (C1 ... Cm) signal represents a carrier phase measurement signal.

13. The system of claim 12, wherein said n-bit ACCUMULATOR MEANS with said L-bit output wave further comprises:

a second ADDER MEANS 2 connected to said first LATCH MEANS 1 for adding a frequency word (B1 . . . Bn), B1 being the most significant bit (MSB), to a previous CARRIER NCO MEANS1 frequency output (Q1 . . . Qn) on each sample clock; and a fourth LATCH MEANS 4 connected to said second ADDER MEANS 2 for generating said output CARRIER NCO MEANS1 signal (Q1 . . . Qn), wherein said fourth LATCH MEANS is caused to overflow at the rate of SCLK signal, and wherein L-top output bits of said fourth LATCH MEANS are used as said CARRIER NCO MEANS 1 output signal.

14. The system of claim 11, wherein said CARRIER NCO MEANS2 further comprises:

an n-bit ACCUMULATOR MEANS, n being an integer, for adding a new frequency word (B1 . . . Bn), B1 being the most significant bit (MSB), to a previous CARRIER NCO MEANS2 output frequency word (Q1 . . . Qn) on each sample clock, wherein said ACCUMULATOR MEANS is caused to overflow periodically at the predetermined output frequency;

a first LATCH MEANS 1 connected to said ACCUMULATOR MEANS for latching in said new frequency word B1 . . . Bn under the control signal of said MICROPROCESSOR MEANS, wherein L-top bits of said ACCUMULATOR MEANS output wave are used as said CARRIER NCO MEANS2 (I) output wave; L being an integer, L being less than n, L being greater or equal to 1; and wherein when the carrier tracking loop is locked L-top bits of said CARRIER NCO MEANS2 output wave are used as the inphase version (I) of the carrier signal L2 which is phase locked with the satellite signal;

a first ADDER MEANS 1 for adding (01) to the 2-top bits (S1 S2) of the CARRIER NCO MEANS2 output (S1 . . . Sn) frequency word to obtain 2-top bits (R1 R2);

a third LATCH MEANS 3 connected to said first ADDER MEANS 1 for generating a quadrature version Q of carrier signal L2 by clocking in at the rate of SCLK signal said 2-top bits (R1 R2); and wherein said LATCH MEANS 3 generates said QL2 signal in the form of L-bit word (R1 R2 S3 . . . SL);

a second LATCH MEANS 2 connected to said ACCUMULATOR MEANS for latching top m bits (C1 . . . Cm) of the CARRIER NCO MEANS1 output signal on the edge of the MSEC timing signal, m being an integer, m being less than n; wherein said (C1 . . . Cm) signal represents a carrier phase measurement signal.

15. The system of claim 14, wherein said n-bit ACCUMULATOR MEANS with said L-bit output wave further comprises:

a second ADDER MEANS 2 connected to said first LATCH MEANS 1 for adding a frequency word (B1 . . . Bn), B1 being the most significant bit (MSB), to a previous CARRIER NCO MEANS2 frequency output (Q1 . . . Qn) on each sample clock; and a fourth LATCH MEANS 4 connected to said second ADDER MEANS 2 for generating said output CARRIER NCO MEANS2 signal (Q1 . . . Qn), wherein said fourth LATCH MEANS 4 is caused to overflow at the rate of SCLK signal, and wherein L-top output bits of said fourth LATCH MEANS are used as said CARRIER NCO MEANS2 output signal.

16. The system of claim 10, wherein said CARRIER MIXER MEANS 1 further comprises:

a first MULTIPLIER MEANS 1, wherein said first MULTIPLIER MEANS 1 performs a multiplication operation of L-bits of IL1 satellite carrier signal and L-bits of inphase version I of carrier frequency, and wherein said first MULTIPLIER MEANS 1 outputs a $(IL1)^*I$ signal;

a second MULTIPLIER MEANS 2, wherein said second MULTIPLIER MEANS 2 performs a multiplication operation of L-bits of QL1 satellite carrier signal and L-bits of quadrature version Q of carrier frequency, and wherein said second MULTIPLIER MEANS 2 outputs a $(QL1)^*Q$ signal;

a first ADDER MEANS 1 connected to said first MULTIPLIER MEANS 1 and connected to said second MULTIPLIER MEANS 2 for adding said $(IL1)^*I$ signal and said $(QL1)^*Q$ signal;

a third MULTIPLIER MEANS 3, wherein said third MULTIPLIER MEANS 3 performs a multiplication operation of L-bits of IL1 satellite carrier signal and L-bits of quadrature version Q of carrier frequency, and wherein said third MULTIPLIER MEANS 3 outputs a $(IL1)^*Q$ signal;

a fourth MULTIPLIER MEANS 4, wherein said fourth MULTIPLIER MEANS 4 performs a multiplication operation of L-bits of QL1 satellite carrier signal and L-bits of inphase version I of carrier frequency, and wherein said fourth MULTIPLIER MEANS 4 outputs a $(QL1)^*I$ signal; and a second ADDER MEANS 2 connected to said third MULTIPLIER MEANS 3 and connected to said fourth MULTIPLIER MEANS 4 for subtracting said $(QL1)^*I$ signal from said $(IL1)^*Q$ signal.

17. The system of claim 11, wherein said CARRIER MIXER MEANS 2 further comprises:

a first MULTIPLIER MEANS 1, wherein said first MULTIPLIER MEANS 1 performs a multiplication operation of L-bits of IL2 satellite carrier signal and L-bits of inphase version I of carrier frequency, and wherein said first MULTIPLIER MEANS 1 outputs a $(IL2)^*I$ signal;

a second MULTIPLIER MEANS 2, wherein said second MULTIPLIER MEANS 2 performs a multiplication operation of L-bits of QL2 satellite carrier signal and L-bits of quadrature version Q of carrier frequency, and wherein said second MULTIPLIER MEANS 2 outputs a $(QL2)^*Q$ signal;

a first ADDER MEANS 1 connected to said first MULTIPLIER MEANS 1 and connected to said second MULTIPLIER MEANS 2 for adding said $(IL2)^*I$ signal and said $(QL2)^*Q$ signal;

a third MULTIPLIER MEANS 3, wherein said third MULTIPLIER MEANS 3 performs a multiplication operation of L-bits of IL2 satellite carrier signal and L-bits of quadrature version Q of carrier frequency, and wherein said third MULTIPLIER MEANS 3 outputs a $(IL2)^*Q$ signal;

a fourth MULTIPLIER MEANS 4, wherein said fourth MULTIPLIER MEANS 4 performs a multiplication operation of L-bits of QL2 satellite carrier signal and L-bits of inphase version I of carrier frequency, and wherein said fourth MULTIPLIER MEANS 4 outputs a $(QL2)^*I$ signal; and a second ADDER MEANS 2 connected to said third MULTIPLIER MEANS 3 and connected to said fourth MULTIPLIER MEANS 4 for subtracting said $(QL2)^*I$ signal from said $(IL2)^*Q$ signal.

18. The system of claim 10, wherein said CODE MIXER MEANS 1 further comprises:
- a first MULTIPLIER MEANS 1 for multiplying said incoming I signal with an early version (E) of said local C/A code;
- a second MULTIPLIER MEANS 2 for multiplying said incoming I signal with a punctual version (P) of said local C/A code;
- a third MULTIPLIER MEANS 3 for multiplying said incoming I signal with a late version (L) of said local C/A code;
- a fourth MULTIPLIER MEANS 4 for multiplying said incoming Q signal with an early version (E) of said local C/A code;
- a fifth MULTIPLIER MEANS 5 for multiplying said incoming Q signal with a punctual version (P) of said local C/A code; and
- a sixth MULTIPLIER MEANS 6 for multiplying said incoming Q signal with a late version (L) of said local C/A code.

19. The system of claim 10, wherein said CODE MIXER MEANS 2 further comprises:
- a MULTIPLIER MEANS for multiplying said incoming L1Y code estimate with said locally generated L1P code, wherein said MULTIPLIER MEANS outputs an L1W code estimate.

20. The system of claim 11, wherein said CODE MIXER MEANS 3 further comprises:
- a first MULTIPLIER MEANS 1 for multiplying said incoming I estimate of L2Y code with said locally generated P code (P1), wherein said first MULTIPLIER MEANS 1 outputs an I estimate of L2 W code; and
- a second MULTIPLIER MEANS 2 for multiplying said incoming Q estimate of L2Y code with said locally generated P code (P1), wherein said second MULTIPLIER MEANS 2 outputs a Q estimate of L2 W code.

21. The system of claim 11, wherein said CODE MIXER MEANS 4 further comprises:
- a first MULTIPLIER MEANS 1 for multiplying L-bit of said I estimate of L2 W code at early time point (E) on the autocorrelation function graph with L-bit of said estimate of L1W code, said first MULTIPLIER MEANS creating an early (E) I correlation between estimate of L2 W code and estimate of L1W code;
- a second MULTIPLIER MEANS 2 for multiplying L-bit of said I estimate of L2 W code at punctual time point (P) on the autocorrelation function graph with L-bit of said estimate of L1W code, said second MULTIPLIER MEANS creating a punctual (P) I correlation between estimate of L2 W code and estimate of L1W code;
- a third MULTIPLIER MEANS 3 for multiplying L-bit of said I estimate of L2 W code at late time point (L) on the autocorrelation function graph with L-bit of said estimate of L1W code, said third MULTIPLIER MEANS 3 creating a late (L) I correlation between estimate of L2 W code and estimate of L1W code;
- a fourth MULTIPLIER MEANS 4 for multiplying L-bit of said Q estimate of L2 W code at early time point (E) on the autocorrelation function graph with L-bit of said estimate of L1W code, said fourth MULTIPLIER MEANS 4 creating an early (E) Q correlation between estimate of L2 W code and estimate of L1W code;
- a fifth MULTIPLIER MEANS 5 for multiplying L-bit of said Q estimate of L2 W code at punctual time point (P) on the autocorrelation function graph with L-bit of said estimate of L1W code, said fifth MULTIPLIER MEANS 5 creating a punctual (P) Q correlation between estimate of L2 W code and estimate of L1W code; and
- a sixth MULTIPLIER MEANS 6 for multiplying L-bit of said Q estimate of L2 W code at late time point (L) on the autocorrelation function graph with L-bit of said estimate of L1W code, said sixth MULTIPLIER MEANS creating a late (L) Q correlation between estimate of L2 W code and estimate of L1W code.

22. The system of claim 12, wherein said CODE MIXER MEANS 5 further comprises:
- a first MULTIPLIER MEANS 1 for multiplying said I estimate of L2 W code with an early version (E) of said local P1 code;
- a second MULTIPLIER MEANS 2 for multiplying said I estimate of L2 W code with a punctual version (P) of said local P1 code;
- a third MULTIPLIER MEANS 3 for multiplying said I estimate of L2 W code with a late version (L) of said local P1 code;
- a fourth MULTIPLIER MEANS 4 for multiplying said I estimate of L2 W code with an early version (E) of said local C/A code;
- a fifth MULTIPLIER MEANS 5 for multiplying said Q estimate of L2 W code with a punctual version (P) of said local C/A code; and
- a sixth MULTIPLIER MEANS 6 for multiplying said Q estimate of L2 W code with a late version (L) of said local C/A code.

23. The system of claim 10, wherein said CODE GENERATOR MEANS further comprises:
- a first dividing means for dividing an input signal from said CODE NCO MEANS to provide a C/A CODE GENERATOR MEANS clock signal;
- a C/A CODE GENERATOR MEANS connected to said first dividing means for clocking said C/A CODE GENERATOR MEANS clock signal into a C/A code signal and into an EPOCH signal under the control of said MICROPROCESSOR MEANS, wherein said EPOCH signal is used as a timing signal for said CORRELATORS MEANS 1 and said CORRELATORS MEANS 2; and
- a P CODE GENERATOR MEANS, wherein said P CODE GENERATOR MEANS is clocked by said CODE NCO MEANS signal under the control of said MICROPROCESSOR MEANS.

24. The system of claim 10, wherein said DIGITAL DELAY MEANS 1 further comprises:
- a SHIFT REGISTER MEANS (1 ... k) for delaying said L-bit L1W code estimate by i-sample clocks, wherein said (i) is an integer greater or equal to 1 and less or equal to k, and wherein said integer (i) is selected under the control of said MICROPROCESSOR MEANS, and wherein said delayed L1W code estimate is aligned with said filtered L2 W code estimate; and
- a MULTIPLEXER MEANS for outputting said delayed L1W code estimate.

25. The system of claim 10, wherein said DIGITAL DELAY MEANS 2 further comprises:
- a SHIFT REGISTER MEANS (1 ... k) for delaying said locally generated L1 P code by i-sample clocks, wherein said (i) is an integer greater or equal to 1 and less or equal to k, and wherein said integer (i) is selected under the control of said MICROPROCES- SOR MEANS, wherein said delayed locally generated P1 code is aligned with said L2 P code; and a MULTIPLEXER MEANS for outputting said delayed locally generated P1 code.

26. The system of claim 10, wherein said DIGITAL FILTER MEANS 1 further comprises:

a first L-bit SHIFT REGISTER MEANS (W1,W2, ... Wx), X being an integer, for making an X- number of delayed copies of said estimate of L1 W code, wherein a first copy L1 W1-code is delayed by one sample clock, a second copy L1 W2-code is delayed by two sample clocks, an (i) copy L1 Wi is delayed by (i) sample clocks, i being an integer, and an x-copy L1 Wx-code is delayed by (x) sample clocks;

an X-number of MULTIPLIER MEANS (C1, ... Cx), wherein a first MULTIPLIER MEANS C1 transforms said first L1 W1-code into a L1 C1W1-code, wherein a second MULTIPLIER MEANS C2 transforms said second L1 W2-code into a L1 C2W2-code, and wherein an (i) MULTIPLIER MEANS Ci transform said L1 Wi-code into a L1 CiWi code, and wherein an (x) MULTIPLIER MEANS transforms said L1 Wx-code into a L1 CxWx-code;

an ADDER MEANS connected to each of said Ci MULTIPLIER MEANS for adding each said L1 CiWi-codes into an estimate of the output code function L1 Wout code, wherein said output code function is equal to:

Wout=C1W1+C2W2+ ... CxWx;

a dividing means for dividing said SCLK signal by K to reduce the rate of said output code function, K being an integer; and a second k-bit SHIFT REGISTER MEANS, k being an integer (k>1), connected to said ADDER MEANS for producing an early (E), punctual (P), and a late (L) versions of said estimate L1 of Wout code;

wherein said DIGITAL FILTER MEANS 1 reduces the bandwidth of said L1 W code estimate.

27. The system of claim 11, wherein said DIGITAL FILTER MEANS 2 further comprises:

a first L-bit SHIFT REGISTER MEANS (W1 ,W2, ... Wx), X being an integer, for making an X- number of delayed copies of said I estimate of L2 W code, wherein a first copy of I estimate of L2 W1-code is delayed by one sample clock, a second copy of I estimate of L2 W2-code is delayed by two sample clocks, an (i) copy of I estimate of L2 Wi is delayed by (i) sample clocks, i being an integer, and an x-copy of I estimate of L2 Wx-code is delayed by (x) sample clocks;

an X-number of MULTIPLIER MEANS (C1, ... Cx), wherein a first MULTIPLIER MEANS C1 transforms said first I estimate of L2 W 1-code into a L2 C1W1-code, wherein a second MULTIPLIER MEANS C2 transforms said second I estimate of L2 W2-code into a L2 C2W2-code, and wherein an (i) MULTIPLIER MEANS Ci transform said I estimate of L2 Wi-code into a L2 CiWi code, and wherein an (x) MULTIPLIER MEANS transforms said I estimate of L2 Wx -code into an L2 CxWx-code;

an ADDER MEANS connected to each of said Ci MULTIPLIER MEANS for adding each said L2 CiWi-codes into an I estimate of the output code function L2 Wout code, wherein said output code function is equal to:

Wout=C1W1+C2W2+ ... CxWx;

a DIVIDING MEANS for dividing said SCLK signal by K to reduce the rate of said output code function, K being an integer; and a FLIP-FLOP MEANS connected to said DIVIDING MEANS and connected to said ADDER MEANS for reducing the rate of said output code function;

wherein said DIGITAL FILTER MEANS 2 reduces the bandwidth of said I estimate of L2 W code.

28. The system of claim 11, wherein said DIGITAL FILTER MEANS 3 further comprises:

a first L-bit SHIFT REGISTER MEANS (W1,W2, ... Wx), X being an integer, for making an X- number of delayed copies of said Q estimate of L2 W code, wherein a first copy of Q estimate of L2 W1-code is delayed by one sample clock, a second copy of Q estimate of L2 W2-code is delayed by two sample clocks, an (i) copy of Q estimate of L2 Wi is delayed by (i) sample clocks, i being an integer, and an x-copy of Q estimate of L2 Wx-code is delayed by (x) sample clocks;

an X-number of MULTIPLIER MEANS (C1, ... Cx), wherein a first MULTIPLIER MEANS C1 transforms said first Q estimate of L2 W1-code into a L2 C1W1-code, wherein a second MULTIPLIER MEANS C2 transforms said second Q estimate of L2 W2-code into a L2 C2W2-code, and wherein an (i) MULTIPLIER MEANS Ci transform said Q estimate of L2 Wi-code into a L2 CiWi code, and wherein an (x) MULTIPLIER MEANS transforms said Q estimate of L2 Wx-code into an L2 CxWx-code;

an ADDER MEANS connected to each of said Ci MULTIPLIER MEANS for adding each said L2 CiWi-codes into a Q estimate of the output code function L2 Wout code, wherein said output code function is equal to:

Wout=C1W1+C2W2+ ... CxWx;

a DIVIDING MEANS for dividing said SCLK signal by K to reduce the rate of said output code function; K being an integer; and a FLIP-FLOP MEANS connected to said dividing means and connected to said ADDER MEANS for reducing the rate of said output code function;

wherein said DIGITAL FILTER MEANS 3 reduces the bandwidth of said Q estimate of L2 W code.

29. The system of claim 10, wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A (or P) code with said locally generated version of C/A (or P) code across a time period given by a multiple of L1 C/A EPOCH code; and wherein said IE,IL,QE, and QL are used by said code tracking loop by forming:

a code phase estimate=$K1(IE-IL)$, when said carrier loop is locked; or a code phase estimate=$K1[(IE^2+QE^2)^{1/2}-(IL^2+QL^2)^{1/2}]$, when said carrier loop is not locked; where K1 is a L1 code loop gain factor; and wherein said IP, and QP are used by said carrier tracking loop by forming:

a carrier phase estimate=arctan(QP/IP); said block CORRELATORS MEANS 1 further comprising:

a first UP/DOWN COUNTER MEANS 1 for integrating said IE across a period defined by said C/A EPOCH signal; wherein said UP/DOWN COUNTER MEANS 1 adds if the input is positive and subtracts if it is negative and is reset on EPOCH; and a first LATCH MEANS connected to said first UP/DOWN COUNTER MEANS 1 for reading by said MICROPROCESSOR MEANS system said integrated by said UP/DOWN COUNTER MEANS 1 said IE signal;

a second UP/DOWN COUNTER MEANS 2 for integrating said IP across a period defined by said C/A EPOCH signal; wherein said UP/DOWN COUNTER MEANS 2 adds if the input is positive and subtracts if it is negative and is reset on EPOCH; and a second LATCH MEANS connected to said second UP/DOWN COUNTER MEANS 2 for reading by said, MICROPROCESSOR MEANS system said integrated by said UP/DOWN COUNTER MEANS 2 said IP signal;

a third UP/DOWN COUNTER MEANS 3 for integrating said IL signal across a period defined by said C/A EPOCH signal; wherein said UP/DOWN COUNTER MEANS 3 adds if the input is positive and subtracts if it is negative and is reset on EPOCH; and a third LATCH MEANS connected to said third UP/DOWN COUNTER MEANS 3 for reading by said MICROPROCESSOR MEANS system said integrated by said UP/DOWN COUNTER MEANS 3 said IL signal;

a fourth UP/DOWN COUNTER MEANS 4 for integrating said QE signal across a period defined by said C/A EPOCH signal; wherein said UP/DOWN COUNTER MEANS 4 adds if the input is positive and subtracts if it is negative and is reset on EPOCH; and a fourth LATCH MEANS connected to said fourth UP/DOWN COUNTER MEANS 4 for reading by said MICROPROCESSOR MEANS system said integrated by said UP/DOWN COUNTER MEANS 4 said QE signal;

a fifth UP/DOWN COUNTER MEANS 5 for integrating said QP signal across a period defined by said C/A EPOCH signal; wherein said UP/DOWN COUNTER MEANS 5 adds if the input is positive and subtracts if it is negative and is reset on EPOCH; and a fifth LATCH MEANS connected to said fifth UP/DOWN COUNTER MEANS 5 for reading by said MICROPROCESSOR MEANS system said integrated by said UP/DOWN COUNTER MEANS 5 said QP signal;

a sixth UP/DOWN COUNTER MEANS 6 for integrating said QL across a period defined by said C/A EPOCH signal; wherein said UP/DOWN COUNTER MEANS 6 adds if the input is positive and subtracts if it is negative and is reset on EPOCH; and a sixth LATCH MEANS connected to said sixth UP/DOWN COUNTER MEANS 6 for reading by said MICROPROCESSOR MEANS system said integrated by said UP/DOWN COUNTER MEANS 6 said QL signal.

30. The system of claim 11, wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the correlated samples between filtered estimate of L1 and L2 W codes across a time period given by a multiple of L1 C/A EPOCH (EP) code; and wherein said IE,IL,QE, and QL are used by said code tracking loop by forming:

a code phase estimate=$K2(IE-IL)$, when said carrier loop is locked; or a code phase estimate=$K2[(IE^2+QE^2)^{1/2}-(IL^2+QL^2)^{1/2}]$, when said carrier loop is not locked; K2 being an L2-code loop gain factor; and wherein said PQ, and PI codes are used by said carrier tracking loop by forming:

a carrier phase estimate=$\arctan(PQ/PI)$; said block CORRELATORS MEANS 2 further comprising:

a first UP/DOWN COUNTER MEANS 1 for integrating said IE across a period defined by said C/A EPOCH signal; wherein said UP/DOWN COUNTER MEANS 1 adds if the input is positive and subtracts if it is negative and is reset on EPOCH; and a first LATCH MEANS connected to said first UP/DOWN COUNTER MEANS 1 for reading by said MICROPROCESSOR MEANS system said integrated by said UP/DOWN COUNTER MEANS 1 said IE signal;

a second UP/DOWN COUNTER MEANS 2 for integrating said IP across a period defined by said C/A EPOCH signal; wherein said UP/DOWN COUNTER MEANS 2 adds if the input is positive and subtracts if it is negative and is reset on EPOCH; and a second LATCH MEANS connected to said second UP/DOWN COUNTER MEANS 2 for reading by said MICROPROCESSOR MEANS system said integrated by said UP/DOWN COUNTER MEANS 2 said IP signal;

a third UP/DOWN COUNTER MEANS 3 for integrating said IL across a period defined by said C/A EPOCH signal; wherein said UP/DOWN COUNTER MEANS 3 adds if the input is positive and subtracts if it is negative and is reset on EPOCH; and a third LATCH MEANS connected to said third UP/DOWN COUNTER MEANS 3 for reading by said MICROPROCESSOR MEANS system said integrated by said UP/DOWN COUNTER MEANS 3 said IL signal;

a fourth UP/DOWN COUNTER MEANS 4 for integrating said QE across a period defined by said C/A EPOCH signal; wherein said UP/DOWN COUNTER MEANS 4 adds if the input is positive and subtracts if it is negative and is reset on EPOCH; and a fourth LATCH MEANS connected to said fourth UP/DOWN COUNTER MEANS 4 for reading by said MICROPROCESSOR MEANS system said integrated by said UP/DOWN COUNTER MEANS 4 said QE signal;

a fifth UP/DOWN COUNTER MEANS 5 for integrating said QP across a period defined by said C/A EPOCH signal; wherein said UP/DOWN COUNTER MEANS 5 adds if the input is positive and subtracts if it is negative and is reset on EPOCH; and a fifth LATCH MEANS connected to said fifth UP/DOWN COUNTER MEANS 5 for reading by said. MICROPROCESSOR MEANS system said integrated by said UP/DOWN COUNTER MEANS 5 QP signal;

a sixth UP/DOWN COUNTER MEANS 6 for integrating said QL code across a period defined by said C/A EPOCH signal; wherein said UP/DOWN COUNTER MEANS 6 adds if the input is positive and subtracts if it is negative and is reset on EPOCH; and a sixth LATCH MEANS connected to said sixth UP/DOWN COUNTER MEANS 6 for reading by said MICROPROCESSOR MEANS system said integrated by said UP/DOWN COUNTER MEANS 6 said QL signal.

31. The system of claim 10, wherein said CODE NCO MEANS provides a clock for said CODE GENERATOR MEANS which generates said locally generated replica of C/A code and P code; said CODE NCO MEANS further comprising:

a n-bit ACCUMULATOR MEANS, n being an integer, comprising:

a n-bit ADDER MEANS; and a n-bit LATCH MEANS connected to said n-bit ADDER MEANS; and a MULTIPLEXER MEANS connected to said n-bit ACCUMULATOR MEANS;

wherein on each sample clock edge the output of said LATCH MEANS is added to the output of said MULTIPLEXER MEANS by said ADDER MEANS;

and wherein said MULTIPLEXER MEANS outputs one of three n-bit values (N,M or SHIFT); and wherein said CODE NCO MEANS under normal operation outputs:

CODE NCO MEANS frequency=$(N \times SCLK)/(2^n-M+N)$; and wherein said CODE NCO MEANS under code phase shift operation outputs:

code phase shift=$(M-SHIFT)/(2^n-M+N)$.

32. The system of claim 10, wherein said CODE NCO MEANS provides a clock for said CODE GENERATOR MEANS which generates said locally generated replica of C/A code and P code; said CODE NCO MEANS further comprising:

a 12-bit ACCUMULATOR MEANS comprising:

a 12-bit ADDER MEANS; and a 12-bit LATCH MEANS connected to said 12-bit ADDER MEANS; and a MULTIPLEXER MEANS connected to said 12-bit ACCUMULATOR MEANS; wherein on each sample clock edge the output of said LATCH MEANS is added to the output of said MULTIPLEXER MEANS by said ADDER MEANS; and wherein said MULTIPLEXER MEANS outputs one of three 12-bit values (N=1023, M=2619, or SHIFT); and wherein said CODE NCO MEANS under normal operation outputs:

CODE NCO MEANS frequency=10.23 MHz; and wherein said CODE NCO MEANS under code phase shift operation outputs:

code phase shift=(2619-SHIFT)/2500 sample clocks.

33. The system of claim 10, wherein said RESOLVER MEANS further comprises:

a COUNTER MEANS;

a COMPARATOR MEANS connected to said COUNTER MEANS; and a FLIP-FLOP MEANS connected to said. COMPARATOR MEANS;

wherein said COUNTER MEANS is reset every millisecond on the MSEC signal; and wherein the output state of said FLIP-FLOP MEANS is set to digital 0 every millisecond on the MSEC signal; and wherein when said COUNTER MEANS reaches a value equal to said COMPARATOR MEANS input value said FLIP-FLOP MEANS is clocked by said COMPARATOR MEANS to the output state equal to digital 1; and wherein said process is repeated every millisecond; and wherein said resulting digital delay=(delay 1+(2500-m)/25000), m being a controllable mark/space ratio; and wherein said RESOLVER MEANS is used for providing a signal with said controllable mark/space ratio to toggle between said delay 1 and said delay 2.

34. A method for optimum correlation processing of L1 and L2 signals received from a SPS satellite by a correlation processing system; said system comprising a RECEIVING MEANS and at least one DIGITAL CHANNEL PROCESSING MEANS; said method comprising the steps of:

providing said RECEIVING MEANS and at least one said DIGITAL, CHANNEL PROCESSING MEANS;

receiving a known C/A code modulated on L1 carrier frequency, an unknown Y code modulated on L1 carrier frequency signal, an unknown Y code modulated on L2 carrier frequency signal by said RECEIVING MEANS; wherein said received L1, and L2 signals contain propagation noise; and wherein said Y code comprises a known P code and an unknown W code;

generating local replica of said C/A code modulated on L1 carrier frequency signal by each said DIGITAL, CHANNEL PROCESSING MEANS;

generating local replica of said P code modulated on L1 carrier frequency signal by said DIGITAL CHANNEL PROCESSING MEANS; wherein said locally generated replica of L1 signal do not contain propagation noise;

extracting of an estimate of said Y code from said L1 signal, and from said L2 signal by said DIGITAL CHANNEL PROCESSING MEANS; wherein said estimate signals contain propagation noise;

correlating a locally generated replica of C/A code with the received L1 code for obtaining an estimate of L1 group delay (L1 pseudo-range) and L1 carrier phase;

removing said P code from said locally extracted estimate of said L1 Y code by said CHANNEL PROCESSOR to obtain a locally extracted estimate of said L1 W code;

removing said P code from said locally extracted estimate of said L2 Y code by said DIGITAL CHANNEL PROCESSOR MEANS to obtain a locally extracted estimate of said L2 W code; and correlating said locally extracted estimate of said L1 W code with said locally extracted estimate of said L2 W code to obtain relative offset in group delay between L1 and L2 signals and for obtaining an independent estimate of L2 carrier phase by said CHANNEL PROCESSOR.

35. The method of claim 34, said RECEIVING MEANS comprising a dual frequency patch ANTENNA MEANS, a FILTER/LNA MEANS, a DOWNCONVERTER MEANS, an IF PROCESSOR MEANS. a MASTER OSCILLATOR MEANS, and a FREQUENCY SYNTHESIZER MEANS; wherein said step of receiving L1 and L2 satellite signals further comprises the steps of:

receiving said L1 and L2 satellite signals by said dual frequency patch ANTENNA MEANS;

performing filtering and low noise amplification of said L1 and L2 signals by said FILTER/LNA MEANS, wherein said FILTER/LNA MEANS determines the noise/signal ratio of the received signals L1 and L2;

mixing and converting said L1 and L2 signals by said DOWNCONVERTER MEANS;

transforming said converted L1 and L2 signals into digitally sampled quadrature versions of L1 and L2 signals (IL1, QL1, IL2, QL2) by said IF PROCESSOR MEANS; and generating several timing signals by said FREQUENCY SYNTHESIZER MEANS.

36. The method of claim 35, said FILTER/LNA MEANS comprising a POWER SPLITTER MEANS, two separate BANDPASS FILTER MEANS, and a POWER COMBINER MEANS; said step of performing filtering and low noise amplification of said L1 and L2 signals by said FILTER/LNA MEANS further comprises the steps of:

power splitting said single L1/L2 signal received by said ANTENNA MEANS into two separate L1 and L2 signals by said POWER SPLITTER MEANS;

filtering said L1 and L2 signals independently by said two separate BANDPASS FILTER MEANS;

combining said L1 and L2 signals into one combined signal L1/L2 before feeding said combined L1/L2 signal into said LNA by said POWER COMBINER MEANS.

37. The method of claim 36, said FREQUENCY SYNTHESIZER MEANS further comprising a PHASE DETECTOR MEANS, a LOOP FILTER MEANS, a VOLTAGE CONTROLLED OSCILLATOR (VCO) MEANS, a first DIVIDER MEANS, a second DIVIDER MEANS, and a third DIVIDER MEANS; wherein said step of generating several timing signals by said FREQUENCY SYNTHESIZER MEANS further comprises the steps of:

comparing phases of two signals by said PHASE DETECTOR MEANS, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

filtering out high frequency voltage noise by said LOOP FILTER MEANS, wherein output LOOP FILTER MEANS voltage signal includes a low frequency voltage noise;

generating a 1st local oscillator (LO) signal by said VCO, wherein voltage signal at the input of said VCO causes frequency change in said VCO output signal, and wherein said VCO nominal output signal is locked to said reference signal;

dividing said 1st LO1 signal by said first DIVIDER MEANS to obtain a 2nd local oscillator (LO2) signal;

dividing said 2nd LO2 signal by said second DIVIDER MEANS to obtain a sampling clock (SCLK); and dividing said 2nd LO2 signal by said third DIVIDER MEANS to obtain a signal used for measurement of local reference time.

38. The method of claim 36, said FREQUENCY SYNTHESIZER MEANS further comprising a "Divide by 5" block, a PHASE DETECTOR MEANS, a LOOP FILTER MEANS, a VOLTAGE CONTROLLED OSCILLATOR (VCO) MEANS, a "Divide by 8" block, a "Divide by 7" block, and a "Divide by 25000" block; wherein said step of generating several timing signals by said FREQUENCY SYNTHESIZER MEANS further comprises the steps of:

comparing 5 MHz input signal from said MASTER OSCILLATOR MEANS with 5 MHz signal from said "Divide by 5" block by said PHASE DETECTOR MEANS, wherein a minimum voltage output signal from said PHASE DETECTOR MEANS represents maximum phase alignment of two said 5 MHz signals;

filtering out high frequency voltage noise by said LOOP FILTER MEANS;

generating a 1st local oscillator (LO1) signal by said VOLTAGE CONTROLLED OSCILLATOR (VCO) MEANS, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as said 1st local oscillator (LO1);

dividing said 1st LO1 1400 MHz signal by said "Divide by 8" block to obtain a 175 MHz signal, wherein said 175 MHz signal is used as a 2nd LO2 signal;

dividing said 2nd LO2 175 MHz signal by said "Divide by 7" block to obtain a 25 MHz signal, wherein said 25 MHz signal is used as a sampling clock (SCLK); and dividing said 25 MHz signal by said "Divide by 25000" block to obtain a 1 KHz signal, wherein said 1 KHz signal (MSEC) is used for measurement of local reference time.

39. The method of claim 35, said DOWNCONVERTER MEANS comprising a POWER SPLITTER MEANS, a first MULTIPLIER MEANS, a second MULTIPLIER MEANS, a first BANDPASS FILTER MEANS, a second BANDPASS FILTER MEANS, a first AMPLIFIER MEANS, and a second AMPLIFIER MEANS; wherein said step of mixing and converting said L1 and L2 signals by said DOWNCONVERTER MEANS further comprises the steps of:

splitting said FILTER/LNA MEANS output L1/L2 signal into two signals L1 and L2 by said POWER SPLITTER MEANS;

producing a first mixed signal by multiplying said L1 signal with said 1st LO1 signal by said first MULTIPLIER MEANS;

producing a second mixed signal by multiplying said L2 signal with said 1st LO1 signal by said second MULTIPLIER MEANS;

filtering said first mixed signal by said first BANDPASS FILTER MEANS;

filtering said second mixed signal by said second BANDPASS FILTER MEANS;

amplifying said first filtered signal by said first AMPLIFIER MEANS; and amplifying said second filtered signal by said second AMPLIFIER MEANS.

40. The method of claim 35, said IF PROCESSOR MEANS comprising a first POWER SPLITTER MEANS, a second POWER SPLITTER MEANS, a first MULTIPLIER MEANS, a second MULTIPLIER MEANS, a third MULTIPLIER MEANS, a fourth MULTIPLIER MEANS, a first AMPLIFIER MEANS, a second AMPLIFIER MEANS, a third AMPLIFIER MEANS, a fourth AMPLIFIER MEANS, a first one-bit A/D CONVERTER, a second one-bit A/D CONVERTER, a third one-bit A/D CONVERTER, a fourth one-bit A/D CONVERTER, a first FLIP-FLOP MEANS (FF1), a second FF2, a third FF3, and a fourth FF4; wherein said step of transforming said converted L1 and L2 signals into digitally sampled quadrature versions of L1 and L2 signals (IL1, QL1, IL2, QL2) further comprises the steps of:

splitting said L1 signal into two signals by said first POWER SPLITTER MEANS;

splitting said L2 signal into two signals by said second POWER SPLITTER MEANS;

producing an IL1 signal by multiplying said L1 signal with an inphase (I) version of said 2nd LO2 signal by said first MULTIPLIER MEANS;

producing a QL1 signal by multiplying said L1 signal with a quadrature (Q) version of said 2nd LO2 signal by said second MULTIPLIER MEANS;

producing an IL2 signal by multiplying said L2 signal with an inphase (I) version of said 2nd LO2 signal by said third MULTIPLIER MEANS;

producing a QL2 signal by multiplying said L2 signal with a quadrature (Q) version of said 2nd LO2 signal by said fourth MULTIPLIER MEANS;

amplifying said IL1 signal by said first AMPLIFIER MEANS;

amplifying said QL1 signal by said second AMPLIFIER MEANS;

amplifying said IL2 signal by said third AMPLIFIER MEANS;

amplifying said QL2 signal by said fourth AMPLIFIER MEANS;

performing one-bit quantization operation on said IL1 signal by said first one-bit analog-to-digital (A/D) CONVERTER MEANS;

performing one-bit quantization operation on said QL1 signal by said second one-bit analog-to-digital (A/D) CONVERTER MEANS;

performing one-bit quantization operation on said IL2 signal by said third one-bit analog-to-digital (A/D) CONVERTER MEANS;

performing one-bit quantization operation on said QL2 signal by said fourth one-bit analog-to-digital (A/D) CONVERTER MEANS;

sampling said IL1 signal by clocking said IL1 signal through said FF1 at sampling clock (SCLK) rate;

sampling said QL1 signal by clocking said QL1 signal through said FF2 at sampling clock (SCLK) rate;

sampling said IL2 signal by clocking said IL2 signal through said FF3 at sampling clock (SCLK) rate; and sampling said QL2 signal by clocking said QL2 signal through said FF4 at sampling clock (SCLK) rate.

41. The method of claim 34, each said DIGITAL CHANNEL PROCESSING MEANS comprising a L1 TRACKER MEANS, a L2 TRACKER MEANS, and a MICROPROCESSOR MEANS system; said method further comprising the steps of:

tracking L1 C/A code when Y code is ON and tracking L1 P code when Y code is OFF by said L1 TRACKER MEANS;

tracking an enhanced cross correlated W code when Y code is ON and tracking L2 P code when Y code is OFF by said L2 TRACKER MEANS; and feeding said MICROPROCESSOR MEANS system by output signals from said L1 TRACKER MEANS and said L2 TRACKER MEANS.

42. The method of claim 41, said L1 TRACKER MEANS comprising a MULTIPLEXER MEANS 1, a carrier numerically controlled oscillator (CARRIER NCO MEANS1), a CARRIER MIXER MEANS 1, a CODE GENERATOR MEANS, a CODE MIXER MEANS 1, a block CORRELATORS MEANS 1, a code numerically controlled oscillator (CODE NCO MEANS), a CODE MIXER MEANS 2, a DIGITAL DELAY MEANS 1, a DIGITAL FILTER MEANS 1, a RESOLVER MEANS, and a DIGITAL DELAY MEANS 2; wherein said step of tracking L1 C/A code when Y code is ON and tracking L1 P code when Y code is OFF by said L1 TRACKER MEANS further comprises the steps of:

feeding said L1 TRACKER MEANS by digitized inphase IL1 and quadrature QL1 of L1 signal generated by said IF PROCESSOR MEANS;

synchronously clocking said L1 TRACKER MEANS by said SCLK signal outputted by said FREQUENCY SYNTHESIZER MEANS;

synchronously referencing said L1 TRACKER MEANS by said MSEC signal to local reference time, said MSEC signal being outputted by said FREQUENCY SYNTHESIZER MEANS;

feeding said L1 TRACKER MEANS by control signal from said MICROPROCESSOR MEANS;

providing a locally generated replica of C/A code and locally generated replica of P code by said CODE GENERATOR MEANS;

selecting a locally generated code C/A when Y code is ON and selecting a locally generated P code when Y code is OFF by said MULTIPLEXER MEANS 1;

generating inphase and quadrature components of digital carrier by said CARRIER NCO MEANS1;

generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1;

performing code correlation of said inphase IL1 and quadrature QL1 signals with said locally generated replica of C/A code by said CODE MIXER MEANS 1; wherein when said L1 TRACKER MEANS carrier tracking loop is closed via said CARRIER NCO MEANS1; and wherein said CODE MIXER MEANS 1 performs said code correlation at 3 time points (early, punctual and late) on the autocorrelation function graph creating an early, a punctual and a late sample of the autocorrelation function;

integrating said early, punctual and late samples of said autocorrelation function by said block CORRELATORS MEANS 1;

feeding said MICROPROCESSOR MEANS system by an output signal of said CORRELATORS MEANS 1 at a rate of L1 C/A code epoch, wherein said MICROPROCESSOR MEANS uses said CORRELATORS MEANS 1 output signal to develop feedback signals for the carrier tracking loop and for the code tracking loop;

providing a clocking signal at C/A code rate and a clocking signal at P code rate by said code numerically controlled oscillator (CODE NCO MEANS);

driving said CODE GENERATOR MEANS by said C/A code clocking rate and said P code clocking rate;

providing a mechanism for alignment of said locally generated replica of C/A code with said incoming satellite C/A code by said CODE NCO MEANS;

generating an estimate of L1 W code by removing said local replica of L1 P code from said estimate of L1 Y code by said CODE MIXER MEANS 2;

delaying said L1 W code estimate by said DIGITAL DELAY MEANS 1 under said MICROPROCESSOR MEANS system control;

reducing the bandwidth of said L1 W code estimate by said DIGITAL FILTER MEANS 1;

sending said delayed and filtered L1 W code estimate to said L2 TRACKER MEANS;

delaying said P code output from said CODE GENERATOR MEANS by said DIGITAL DELAY MEANS 2;

sending said delayed P code to said L2 TRACKER MEANS;

altering the resulting delay by said RESOLVER MEANS; and sending said L1 C/A code epoch (EP) to said L2 TRACKER MEANS.

43. The method of claim 41, said L2 TRACKER MEANS comprising a CARRIER NCO MEANS 2, a CARRIER MIXER MEANS 2, a CODE MIXER MEANS 3, a DIGITAL FILTER MEANS 2, a DIGITAL FILTER MEANS 3, a CODE MIXER MEANS 4, a CODE MIXER MEANS 5, a MULTIPLEXER MEANS 2, and a block CORRELATORS MEANS 2; wherein said step of tracking an enhanced cross correlated W code when Y code is ON and tracking L2 P code when Y code is OFF by said L2 TRACKER MEANS further comprises the steps of:

feeding said L2 TRACKER MEANS by digitized inphase IL2 and quadrature QL2 of L2 signal outputted by said IF PROCESSOR MEANS;

synchronously clocking said L2 TRACKER MEANS by said SCLK signal outputted by said FREQUENCY SYNTHESIZER MEANS;

synchronously referencing said L2 TRACKER MEANS by said MSEC signal to local reference time, said MSEC signal being outputted by said FREQUENCY SYNTHESIZER MEANS;

feeding said L2 TRACKER MEANS when Y code is ON by said L1 P code, said filtered estimate of L1 W code, and said C/A EP code generated by said L1 TRACKER MEANS;

feeding said L2 TRACKER MEANS by control signal from said MICROPROCESSOR MEANS;

generating IL2 and QL2 signals having carrier frequency by said CARRIER NCO MEANS2;

generating inphase IL2 and quadrature QL2 signals having zero carrier frequency by mixing said digitized inphase IL2 and quadrature QL2 signals having carrier frequency with said inphase and quadrature components IL2 and QL2 of digital carrier generated by said CARRIER MIXER MEANS 2, wherein when L2 carrier tracking loop is locked via said CARRIER NCO MEANS2 said generated IL2 output contains an estimate of L2Y code and said generated QL2 output contains no signal power;

performing code correlation of said IL2 and QL2 having zero frequency signals with outputted by said L1 TRACKER MEANS P1 code by said CODE MIXER MEANS 3; wherein said P1 code represents a locally generated replica of L2 P code;

generating an I estimate of L2 W code and a Q estimate of L2 W code by said CODE MIXER MEANS 3;

reducing the bandwidth of said I estimate of L2 W code by said DIGITAL FILTER MEANS 2;

reducing the bandwidth of said Q estimate of L2 W code by said DIGITAL FILTER MEANS 3;

performing code correlation of said I estimate of L2 W code and said Q estimate of L2 W code with said estimate of L1 W code by said CODE MIXER MEANS 4; wherein said CODE MIXER MEANS 4 performs said code correlation at 3 time points (early, punctual and late) on the autocorrelation function graph creating an early, a punctual and a late sample of the autocorrelation function;

performing code correlation of said I estimate of L2 W code and Q estimate of L2 W code with said P1 code by said CODE MIXER MEANS 5; wherein said P1 code represents a locally generated replica of L2 P code; and wherein said CODE MIXER MEANS 5 performs said code correlation at 3 time points (early, punctual and late) on the autocorrelation function graph creating an early, a punctual and a late sample of the autocorrelation function;

selecting under the control of MICROPROCESSOR MEANS by said MULTIPLEXER MEANS 2 the mode of operation when Y code is ON and OFF; and wherein when Y code is OFF and satellite transmits the P code on L2 said MICROPROCESSOR MEANS selects the output of CODE MIXER MEANS 5; and wherein when Y code is ON said MICROPROCESSOR MEANS selects the output of CODE MIXER MEANS 4;

integrating early, punctual and late samples of said autocorrelation function by said block CORRELATORS MEANS 2; and feeding said MICROPROCESSOR MEANS by output signals of said CORRELATORS MEANS 2, wherein said MICROPROCESSOR MEANS uses said CORRELATORS MEANS 2 output signals to develop feedback signals for the carrier tracking loop and for the code tracking loop.

44. The method of claim 42, said CARRIER NCO MEANS1 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS1 further comprises the steps of:

adding a new frequency word (B1 ... Bn), B1 being the most significant bit (MSB), to a previous CARRIER NCO MEANS1 output frequency word (Q1 ... Qn) on each sample clock by said n-bit ACCUMULATOR MEANS; wherein said ACCUMULATOR MEANS is caused to overflow periodically at the predetermined output frequency;

latching in said new frequency word (B1 ... Bn) under the control signal of said MICROPROCESSOR MEANS by said first LATCH MEANS 1; wherein L-top bits of said ACCUMULATOR MEANS output wave are used as an inphase version I of said CARRIER NCO MEANS1 output wave; L being an integer equal or greater to 1; and wherein when the carrier tracking loop is locked L-top bits of said CARRIER NCO MEANS1 output wave are used as the inphase version I of the carrier signal L1 which is phase locked with the satellite signal;

adding (01) binary code to the two top bits (S1 S2) of the CARRIER NCO MEANS1 output (S1 ... Sn) frequency word to obtain 2-top bits (R1 R2) by said first ADDER MEANS 1;

generating a quadrature version Q of carrier signal L1 by clocking in at the rate of the SCLK signal said 2-top bits (R1 R2) by said third LATCH MEANS; wherein said LATCH MEANS 3 generates said QL1 signal in the from of L-bit word (R1 R2 S3 ... SL); and latching top m bits (C1 ... Cm) of the CARRIER NCO MEANS1 output signal on the edge of the MSEC timing signal by said second LATCH MEANS 2; m being an integer less than n; wherein said (C1 ... Cm) signal represents a carrier phase measurement signal.

45. The method of claim 44, said n-bit ACCUMULATOR MEANS comprising a second ADDER MEANS 2, and a fourth LATCH MEANS 4, wherein said step of adding a new frequency word (B1 ... Bn), B1 being the most significant bit (MSB), to a previous CARRIER NCO 1 output frequency word (Q1 ... Qn) on each sample clock by said n-bit ACCUMULATOR MEANS further comprises the steps of:

adding said frequency word (B1 ... Bn) to a previous CARRIER NCO 1 frequency output (Q1 ... Qn) on each sample clock by said second ADDER MEANS; and generating said CARRIER NCO MEANS 1 output signal (Q1 ... Qn) by said fourth LATCH MEANS; wherein said fourth LATCH MEANS is caused to overflow at the rate of SCLK signal; and wherein L-top output bits of said fourth LATCH MEANS 4 are used as said CARRIER NCO MEANS 1 output signal.

46. The method of claim 43, said CARRIER NCO MEANS 2 comprising an n-bit ACCUMULATOR MEANS, n being an integer, a first LATCH MEANS 1, a second LATCH MEANS 2, a first ADDER MEANS 1, a third LATCH MEANS 3, and a second LATCH MEANS 2, wherein said step of generating inphase and quadrature components of digital carrier by said CARRIER NCO MEANS 1 further comprises the steps of:

adding a new frequency word (B1 ... Bn), B1 being the most significant bit (MSB), to a previous CARRIER NCO MEANS 2 output frequency word (Q1 ... Qn) on each sample clock by said n-bit ACCUMULATOR MEANS; wherein said ACCUMULATOR MEANS is caused to overflow periodically at the predetermined output frequency;

latching in said new frequency word (B1... Bn) under the control signal of said MICROPROCESSOR MEANS by said first LATCH MEANS 1; wherein L-top bits of said ACCUMULATOR MEANS output wave are used as an inphase version I of said CARRIER NCO MEANS 2 output wave; L being an integer equal or greater to 1; and wherein when the carrier tracking loop is locked L-top bits of said CARRIER NCO MEANS 2 output wave are used as the inphase version I of the carrier signal L2 which is phase locked with the satellite signal;

adding (01) binary code to the two top bits (S1 S2) of the CARRIER NCO MEANS 2 output (S1 ... Sn) frequency word to obtain 2-top bits (R1 R2) by said first ADDER MEANS 1;

generating a quadrature version Q of carrier signal L2 by clocking in at the rate of the SCLK signal said 2-top bits (R1 R2) by said third LATCH MEANS; wherein said LATCH MEANS 3 generates said QL2 signal in the from of L-bit word (R1 R2 S3 ... SL); and latching top m bits (C1 ... Cm) of the CARRIER NCO MEANS 2 output signal on the edge of the MSEC timing signal by said second LATCH MEANS 2; m being an integer less than n; wherein said (C1 ... Cm) signal represents a carrier phase measurement signal.

47. The method of claim 46, said n-bit ACCUMULATOR MEANS comprising a second ADDER MEANS 2, and a fourth LATCH MEANS 4, wherein said step of adding a new frequency word (B1 ... Bn), B1 being the most significant bit (MSB), to a previous CARRIER NCO MEANS 2 output frequency word (Q1 ... Qn) on each sample clock by said n-bit ACCUMULATOR MEANS further comprises the steps of:

adding said frequency word (B1 ... Bn) to a previous CARRIER NCO MEANS 2 frequency output (Q1 ... Qn) on each sample clock by said second ADDER MEANS; and generating said CARRIER NCO MEANS 2 output signal (Q1 ... Qn) by said fourth LATCH MEANS; wherein said fourth LATCH MEANS is caused to overflow at the rate of SCLK signal; and wherein L-top output bits of said fourth LATCH MEANS 4 are used as said CARRIER NCO MEANS 2 output signal.

48. The method of claim 42, said CARRIER MIXER MEANS 1 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL1 and quadrature QL1 signals having zero carrier frequency by mixing digitized inphase IL1 and QL1 signals having carrier frequency with inphase and quadrature components of digital carrier by said CARRIER MIXER MEANS 1 further comprises the steps of:

generating a $(IL1)^*I$ signal by performing a multiplication operation of an inphase version I of L1 satellite carrier signal and an inphase version I of carrier frequency by said first MULTIPLIER MEANS 1;

generating a $(QL1)^*Q$ signal by performing a multiplication operation of a quadrature version Q of L1 satellite carrier signal and a quadrature version Q of carrier frequency by said second MULTIPLIER MEANS 2, adding said $(IL1)^*I$ signal and said $(QL1)^*Q$ signal by said first ADDER MEANS 1;

generating a $(IL1)^*Q$ signal by performing a multiplication operation of an inphase version I of L1 satellite carrier signal and a quadrature version Q of carrier frequency by said third MULTIPLIER MEANS 3;

generating a $(QL1)^*I$ signal by performing a multiplication operation of a quadrature version Q of L1 satellite carrier signal and an inphase version I of carrier frequency by said fourth MULTIPLIER MEANS 4; and subtracting said $(QL1)^*I$ signal from said $(IL1)^*Q$ signal by said second ADDER MEANS 2.

49. The method of claim 43, said CARRIER MIXER MEANS 2 comprising a first MULTIPLIER MEANS 1, a second MULTIPLIER MEANS 2, a first ADDER MEANS 1, a third MULTIPLIER MEANS 3, a fourth MULTIPLIER MEANS 4 and a second ADDER MEANS 2, wherein said step of generating inphase IL2 and quadrature QL2 signals having zero carrier frequency by mixing digitized inphase IL2 and QL2 signals having carrier frequency with inphase and quadrature components of digital carrier by said CARRIER MIXER MEANS 2 further comprises the steps of:

generating a $(IL2)^*I$ signal by performing a multiplication operation of an inphase version I of L2 satellite carrier signal and an inphase version I of carrier frequency by said first MULTIPLIER MEANS 1;

generating a $(QL2)^*Q$ signal by performing a multiplication operation of a quadrature version Q of L2 satellite carrier signal and a quadrature version Q of carrier frequency by said second MULTIPLIER MEANS 2, adding said $(IL2)^*I$ signal and said $(QL2)^*Q$ signal by said first ADDER MEANS 1;

generating a $(IL2)^*Q$ signal by performing a multiplication operation of an inphase version I of L2 satellite carrier signal and a quadrature version Q of carrier frequency by said third MULTIPLIER MEANS 3;

generating a $(QL2)^*I$ signal by performing a multiplication operation of a quadrature version Q of L2 satellite carrier signal and an inphase version I of carrier frequency by said fourth MULTIPLIER MEANS 4; and subtracting said (QL2)*I signal from said (IL2)*Q signal by said second ADDER MEANS 2.

50. The method of claim 42, said CODE MIXER MEANS 1 comprising a first MULTIPLIER MEANS 1, a second MULTIPLIER MEANS 2, a third MULTIPLIER MEANS 3, a fourth MULTIPLIER MEANS, a fifth MULTIPLIER MEANS, and a sixth MULTIPLIER MEANS; wherein the step of performing code correlation of said inphase IL1 and quadrature QL1 signals with said locally generated replica of C/A code by said CODE MIXER MEANS 1 at 3 time points (early, punctual and late) on the autocorrelation function graph creating an early, a punctual and a late sample of the autocorrelation function, further comprises the steps of:

multiplying said incoming I signal with an early version (E) of said local C/A code by said first MULTIPLIER MEANS;

multiplying said incoming I signal with a punctual version (P) of said local C/A code by said second MULTIPLIER MEANS;

multiplying said incoming I signal with a late version (L) of said local C/A code by said third MULTIPLIER MEANS;

multiplying said incoming Q signal with an early version (E) of said local C/A code by said fourth MULTIPLIER MEANS;

multiplying said incoming Q signal with a punctual version (P) of said local C/A code by said fifth MULTIPLIER MEANS; and multiplying said incoming Q signal with a late version (L) of said local C/A code by said sixth MULTIPLIER MEANS.

51. The method of claim 42, said CODE MIXER MEANS 2 comprising a MULTIPLIER MEANS, said step of generating an estimate of L1 W code by removing said local replica of L1 P code from said estimate of L1 Y code by said CODE MIXER MEANS 2 further comprises the step of:

generating a L1 W code estimate by multiplying said incoming L1 Y code estimate with said locally generated L1 P code by said MULTIPLIER MEANS.

52. The method of claim 43, said CODE MIXER MEANS 3 comprising a first MULTIPLIER MEANS, and a second MULTIPLIER MEANS, wherein said step of performing code correlation of said IL2 and QL2 having zero frequency signals with a locally generated replica L2 P code (P1 code) by said CODE MIXER MEANS 3, further comprises the steps of:

generating an I estimate of L2 W code by multiplying said incoming I estimate of L2 Y code with said locally generated L2 P code (P1 code) by said first MULTIPLIER MEANS; and generating a Q estimate of L2 W code by multiplying said incoming Q estimate of L2 Y code with said locally generated L2 P code (P1) by said second MULTIPLIER MEANS.

53. The method of claim 43, said CODE MIXER MEANS 4, comprising a first MULTIPLIER MEANS, a second MULTIPLIER MEANS, a third MULTIPLIER MEANS, a fourth MULTIPLIER MEANS, a fifth MULTIPLIER MEANS, and a sixth MULTIPLIER MEANS; wherein said step of performing correlation of said I estimate of L2 W code and said Q estimate of L2 W code with said estimate of L1 W code by said CODE MIXER MEANS 4 at 3 time points (early, punctual and late) on the autocorrelation graph creating an early, a punctual and a late sample of the autocorrelation function, further comprises the steps of:

multiplying said I estimate of L2 W code at early time point (E) on the autocorrelation function graph with said estimate of L1 W code and creating an early (E) I correlation between estimate of L2 W code and estimate of L1 W code by said first MULTIPLIER MEANS;

multiplying said I estimate of L2 W code at punctual time point (P) on the autocorrelation function graph with said estimate of L1 W code and creating a punctual (P) I correlation between estimate of L2 W code and estimate of L1 W code by said second MULTIPLIER MEANS;

multiplying said I estimate of L2 W code at late time point (L) on the autocorrelation function graph with said estimate of L1 W code and creating a late (L) I correlation between estimate of L2 W code and estimate of L1 W code by said third MULTIPLIER MEANS;

multiplying said Q estimate of L2 W code at early time point (E) on the autocorrelation function graph with said estimate of L1 W code and creating an early (E) Q correlation between estimate of L2 W code and estimate of L1 W code by said fourth MULTIPLIER MEANS;

multiplying said Q estimate of L2 W code at punctual time point (P) on the autocorrelation function graph with said estimate of L1 W code and creating a punctual (P) Q correlation between estimate of L2 W code and estimate of L1 W code by said fifth MULTIPLIER MEANS; and multiplying said Q estimate of L2 W code at late time point (L) on the autocorrelation function graph with said estimate of L1 W code and creating a late (L) Q correlation between estimate of L2 W code and estimate of L1 W code by said sixth MULTIPLIER MEANS.

54. The method of claim 43, said CODE MIXER MEANS 5 further comprising a first MULTIPLIER MEANS 1, a second MULTIPLIER MEANS 2, a third MULTIPLIER MEANS 3, a fourth MULTIPLIER MEANS 4, a fifth MULTIPLIER MEANS 5, and a sixth MULTIPLIER MEANS 6; wherein said step of performing of code correlation by said CODE MIXER MEANS 5 at 3 time points (early, punctual and late) on the autocorrelation function graph creating an early, a punctual and a late sample of the autocorrelation function, further comprises the steps of:

multiplying said I estimate of L2 W code with an early version (E) of said local P1 code by said first MULTIPLIER MEANS 1;

multiplying said I estimate of L2 W code with a punctual version (P) of said local P1 code by said second MULTIPLIER MEANS 2;

multiplying said I estimate of L2 W code with a late version (L) of said local P1 code by said third MULTIPLIER MEANS 3;

multiplying said I estimate of L2 W code with an early version (E) of said local C/A code by said fourth MULTIPLIER MEANS 4;

multiplying said Q estimate of L2 W code with a punctual version (P) of said local C/A code by said fifth MULTIPLIER MEANS 5; and multiplying said Q estimate of L2 W code with a late version (L) of said local C/A code by said sixth MULTIPLIER MEANS 6.

55. The method of claim 42, said CODE GENERATOR MEANS comprising a first dividing means, a C/A CODE GENERATOR MEANS, and a P CODE GENERATOR MEANS; wherein said step of providing a locally generated replica of C/A code by said CODE GENERATOR MEANS further comprises the steps of:

provided a C/A CODE GENERATOR MEANS clock signal by dividing an input signal from said CODE NCO MEANS by said first dividing means;

transforming said C/A CODE GENERATOR MEANS clock signal into a C/A code signal and into an EPOCH signal under the control of said MICROPROCESSOR MEANS by said C/A CODE GENERATOR MEANS, wherein said EPOCH signal is used as a timing signal for said CORRELATORS MEANS 1 and said CORRELATORS MEANS 2; and clocking said P CODE GENERATOR MEANS by said CODE NCO MEANS signal under the control of said MICROPROCESSOR MEANS.

56. The method of claim 42, said DIGITAL DELAY MEANS 1 comprising a SHIFT REGISTER MEANS (1 .. . k) and a MULTIPLEXER MEANS, wherein said step of delaying said L1 W code estimate by said DIGITAL DELAY MEANS 1 under said MICROPROCESSOR MEANS system control further comprises the steps of:

delaying said locally generated L1 W code estimate by i-sample clocks by said SHIFT REGISTER MEANS (1 ... k), wherein said (i) is an integer greater or equal to 1 and less or equal to k, and wherein said integer (i) is selected under the control of said MICROPROCESSOR MEANS, and wherein said delayed locally generated L1 W code estimate is aligned with said filtered L2 W code estimate; and outputting said delayed locally generated L1 W code estimate by said MULTIPLEXER MEANS.

57. The method of claim 42, said DIGITAL DELAY MEANS 2 comprising a SHIFT REGISTER MEANS (1 .. . k), and a MULTIPLEXER MEANS, wherein said step of delaying said P code output from said CODE GENERATOR MEANS by said DIGITAL DELAY MEANS 2 further comprises the steps of:

delaying said locally generated L1 P code by i-sample clocks by said SHIFT REGISTER MEANS (1 ... k), wherein said (i) is an integer greater or equal to 1 and less or equal to k, and wherein said integer (i) is selected under the control of said. MICROPROCESSOR MEANS, and wherein said delayed locally generated P1 code is aligned with said L2 P code; and outputting said delayed locally generated P1 code by said MULTIPLEXER MEANS.

58. The method of claim 42, said DIGITAL FILTER MEANS 1 comprising a first L-bit SHIFT REGISTER MEANS, L being an integer, an X-number of MULTIPLIER MEANS, X being an integer, an ADDER MEANS, a dividing means, and a second SHIFT REGISTER MEANS; wherein said step of reducing the bandwidth of said L1 W code estimate by said DIGITAL FILTER MEANS 1 further comprises the steps of:

making an X- number of delayed copies of said estimate of L1 W code by said first SHIFT REGISTER MEANS (W1,W2, ... Wx), wherein a first copy L1 W1-code is delayed by one sample clock, a second copy L1 W2-code is delayed by two sample clocks, an (i) copy L1 Wi is delayed by (i) sample clocks, i being an integer, and an x-copy L1 Wx-code is delayed by (x) sample clocks;

transforming said first L1 W1-code into a L1 C1W1-code by said first MULTIPLIER MEANS C1;

transforming said second L1 W2-code into a L1 C2W2-code by said second MULTIPLIER MEANS C2;

performing the transformation of said L1 Wi-code into a L1 CiWi code by said (i) MULTIPLIER MEANS Ci for each (i), wherein said (i) is an integer greater than 1 and less than k;

transforming said L1 Wx-code into a L1 CxWx-code by said (x) MULTIPLIER MEANS Cx;

adding each said L1 CiWi-codes into an estimate of the output code function L1 Wout by said ADDER MEANS, wherein said output code function is equal to: Wout=C1W1+C2W2+ ... CxWx;

dividing said SCLK signal by K to reduce the rate of said output code function by said dividing means; and producing an early (E), punctual (P), and a late (L) versions of said estimate of the output code function L1 Wout-code by said second SHIFT REGISTER MEANS; wherein said DIGITAL FILTER MEANS 1 reduces the bandwidth of said L1 W code estimate.

59. The method of claim 43, said DIGITAL FILTER MEANS 2 comprising a first L-bit SHIFT REGISTER MEANS, L being an integer, an X-number of MULTIPLIER MEANS, X being an integer, an ADDER MEANS, a dividing means, and a FLIP-FLOP MEANS; wherein said step of reducing the bandwidth of said 1 estimate of L2 W code by said DIGITAL FILTER MEANS 2 further comprises the steps of:

making an X- number of delayed copies of said 1 estimate of L2 W code by said first SHIFT REGISTER MEANS (W1,W2, ... Wx), wherein a first copy of 1 estimate of L2 W 1-code is delayed by one sample clock, a second copy of 1 estimate of L2 W2-code is delayed by two sample clocks, an (i) copy of 1 estimate of L2 Wi is delayed by (i) sample clocks, i being an integer, and an x-copy of 1 estimate of L2 Wx-code is delayed by (x) sample clocks;

transforming said first 1 estimate of L2 W 1-code into a 1 estimate of L2 C1W1-code by said first MULTIPLIER MEANS C1;

transforming said second 1 estimate L2 W2-code into a 1 estimate of L2 C1W2-code by said second MULTIPLIER MEANS C2;

performing the transformation of said 1 estimate of L2 Wi-code into a 1 estimate of L2 CiWi code by said (i) MULTIPLIER MEANS Ci for each (i), wherein said i is an integer greater than 1 and less than k;

transforming said 1 estimate of L2 Wx -code into a 1 estimate of L2 CxWx-code by said (x) MULTIPLIER MEANS Cx;

adding each said 1 estimate of L2 CiWi-codes into an 1 estimate of the output code function L2 Wout-code by said ADDER MEANS, wherein said output code function is equal to: Wout=C1W1+C2W2+ ... CxWx;

dividing said SCLK signal by K to reduce the rate of said output code function by said dividing means; and reducing the rate of said output code function by said FLIP-FLOP MEANS;

wherein said DIGITAL FILTER MEANS 2 reduces the bandwidth of said 1 estimate of L2 W code.

60. The method of claim 43, said DIGITAL FILTER MEANS 3 comprising a first L-bit SHIFT REGISTER MEANS, L being an integer, an X-number of MULTIPLIER MEANS, X being an integer, an ADDER MEANS, a dividing means, and a FLIP-FLOP MEANS; wherein said step of reducing the bandwidth of said Q estimate of L2 W code by said DIGITAL FILTER MEANS 3 further comprises the steps of:

making an X- number of delayed copies of said Q estimate of L2 W code by said first SHIFT REGISTER MEANS (W1,W2, ... Wx), wherein a first copy of Q estimate of L2 W1-code is delayed by one sample clock, a second copy of Q estimate of L2 W2-code is delayed by two sample clocks, an (i) copy of Q estimate of L2 Wi is delayed by (i) sample clocks, i being an integer, and an x-copy of Q estimate of L2 Wx-code is delayed by (x) sample clocks;

transforming said first Q estimate of L2 W 1-code into a Q estimate of L2 C1W1-code by said first MULTIPLIER MEANS C1;

transforming said second Q estimate L2 W2-code into a Q estimate of L2 C2W2-code by said second MULTIPLIER MEANS C2;

performing the transformation of said Q estimate of L2 Wi-code into a Q estimate of L2 CiWi code by said (i) MULTIPLIER MEANS Ci for each (i), wherein said i is an integer greater than 1 and less than k;

transforming said Q estimate of L2 Wx -code into a Q estimate of L2 CxWx-code by said (x) MULTIPLIER MEANS Cx;

adding each said Q estimate of L2 CiWi-codes into an Q estimate of the output code function L2 Wout-code by said ADDER MEANS, wherein said output code function is equal to: Wout=C1W1+C2W2+ ... CxWx;

dividing said SCLK signal by K to reduce the rate of said output code function by said dividing means; and reducing the rate of said output code function by said FLIP-FLOP MEANS;

wherein said DIGITAL FILTER MEANS 3 reduces the bandwidth of said Q estimate of L2 W code.

61. The method of claim 42, said block CORRELATORS MEANS 1 comprising a first UP/DOWN COUNTER MEANS 1, a first LATCH MEANS, a second UP/DOWN COUNTER MEANS 2, a second LATCH MEANS, a third UP/DOWN COUNTER MEANS 3, a third LATCH MEANS, a fourth UP/DOWN COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS 1 further comprises the steps of:

integrating said IE across a period defined by said C/A EPOCH signal by said first UP/DOWN COUNTER MEANS 1; wherein said UP/DOWN COUNTER MEANS 1 adds if the input is positive and subtracts if it is negative and is reset on EPOCH;

using said first LATCH MEANS for reading said integrated IE signal by said MICROPROCESSOR MEANS system;

integrating said IP across a period defined by said C/A EPOCH signal by said second UP/DOWN COUNTER MEANS 2;

using said second LATCH MEANS for reading said integrated IP signal by said MICROPROCESSOR MEANS system;

integrating said IL across a period defined by said C/A EPOCH signal by said third UP/DOWN COUNTER MEANS;

using said third LATCH MEANS for reading said integrated IL signal by said MICROPROCESSOR MEANS system;

integrating said QE across a period defined by said C/A EPOCH signal by said fourth UP/DOWN COUNTER MEANS 4;

using said fourth LATCH MEANS for reading said integrated QE signal by said MICROPROCESSOR MEANS system;

integrating said QP across a period defined by said C/A EPOCH signal by said fifth UP/DOWN COUNTER MEANS 5;

using said fifth LATCH MEANS for reading said integrated QP signal by said MICROPROCESSOR MEANS system;

integrating said QL across a period defined by said C/A EPOCH signal by said sixth UP/DOWN COUNTER MEANS 6; and using said sixth LATCH MEANS for reading said integrated QP signal by said MICROPROCESSOR MEANS system;

wherein said block CORRELATORS MEANS 1 is used for integrating said IE (inphase early), said IP (inphase punctual), said IL (inphase late), said QE (quadrature early), said QP (quadrature punctual), and said QL (quadrature late) versions of the correlated samples of said L1 C/A code with said locally generated version of C/A code across a time period given by a multiple of L1 C/A EPOCH code; and wherein said IE,IL,QE, and QL are used by said code tracking loop by forming:

a code phase estimate=$K1(IE-IL)$, when said carrier loop is locked; or a code phase estimate=$K1[(IE^2+QE^2)^{1/2}-(IL^2+QL^2)^{1/2}]$, when said carrier loop is not locked; K1 being an L1 code loop gain factor; and wherein said IP, and QP are used by said carrier tracking loop by forming:

a carrier phase estimate=$\arctan(QP/IP)$.

62. The method of claim 43, said block CORRELATORS MEANS 2 comprising a first UP/DOWN COUNTER MEANS 1, a first LATCH MEANS, a second UP/DOWN COUNTER MEANS 2, a second LATCH MEANS, a third UP/DOWN COUNTER MEANS 3, a third LATCH MEANS, a fourth up/down COUNTER MEANS 4, a fourth LATCH MEANS, a fifth UP/DOWN COUNTER MEANS 5, a fifth LATCH MEANS, a sixth UP/DOWN COUNTER MEANS 6, and a sixth LATCH MEANS; wherein said step of integrating said early, punctual and late samples of said autocorrelation function by said block CORRELATORS MEANS 2 further comprises the steps of:

integrating said IE across a period defined by said C/A EPOCH signal by said first UP/DOWN COUNTER MEANS 1; wherein said UP/DOWN COUNTER MEANS adds if the input is positive and subtracts if it is negative and is reset on EPOCH;

using said first LATCH MEANS for reading said integrated IE signal by said MICROPROCESSOR MEANS system;

integrating said IP across a period defined by said C/A EPOCH signal by said second UP/DOWN COUNTER MEANS 2;

using said second LATCH MEANS for reading said integrated IP signal by said MICROPROCESSOR MEANS system;

integrating said IL across a period defined by said C/A EPOCH signal by said third UP/DOWN COUNTER MEANS 3;

using said third LATCH MEANS for reading said integrated IL signal by said MICROPROCESSOR MEANS system;

integrating said QE across a period defined by said C/A EPOCH signal by said fourth UP/DOWN COUNTER MEANS 4;

using said fourth LATCH MEANS for reading said integrated QE signal by said MICROPROCESSOR MEANS system;

integrating said QP across a period defined by said C/A EPOCH signal by said fifth UP/DOWN COUNTER MEANS 5;

using said fifth LATCH MEANS for reading said integrated QP signal by said MICROPROCESSOR MEANS system;

integrating said QL across a period defined by said C/A EPOCH signal by said sixth UP/DOWN COUNTER MEANS; and using said sixth LATCH MEANS for reading said integrated QL signal by said MICROPROCESSOR MEANS system; wherein said block CORRELATORS MEANS 2 is used for integrating said IE (inphase early), said IP (inphase punctual), said IL (inphase late), said QE (quadrature early), said QP (quadrature punctual), and said QL (quadrature late) version of the correlated samples between filtered estimates of L1 and L2 W codes across a time period given by a multiple of L2 C/A EPOCH code; and wherein said IE,IL,QE, and QL are used by said code tracking loop by forming:

a code phase estimate=$K2(IE-IL)$, when said carrier loop is locked; or a code phase estimate=$K2[(IE^2+QE^2)^{1/2}-(IL^2+QL^2)^{1/2}]$, when said carrier loop is not locked; K2 being an L2 code loop gain factor; and wherein said IP, and QP signals are used by said carrier tracking loop by forming:

a carrier phase estimate=$\arctan(QP/IP)$.

63. The method of claim 42, said CODE NCO MEANS comprising a n-bit ACCUMULATOR MEANS, a n-bit LATCH MEANS, n being an integer, and a MULTIPLEXER MEANS; wherein said step of providing a clocking signal at C/A code rate and a clocking signal at P code rate for said CODE GENERATOR MEANS by said CODE NCO MEANS further comprises the steps of:

adding on each sample clock edge the output of said LATCH MEANS to the output of said MULTIPLEXER MEANS by said ACCUMULATER:

generating one of three n-bit values (N,M or SHIFT) by said MULTIPLEXER MEANS;

outputting under normal operation CODE NCO MEANS frequency=$(N \times SCLK)/(2^n-M+N)$ by said CODE NCO MEANS: and outputting under code phase shift operation code phase shift=$(M-SHIFT)/(2^n-M+N)$ by said CODE NCO MEANS.

64. The method of claim 42, said CODE NCO MEANS comprising a 12-bit ACCUMULATER MEANS, a 12-bit LATCH MEANS, and a MULTIPLEXER MEANS; wherein said step of providing a clocking signal at C/A code rate and a clocking signal at P code rate for said CODE GENERATOR MEANS by said CODE NCO MEANS further comprises the steps of:

adding on each sample clock edge the output of said LATCH MEANS to the output of said MULTIPLEXER MEANS by said ACCUMULATER;

generating one of three 12-bit values (N,M or SHIFT) by said MULTIPLEXER MEANS;

outputting under normal operation CODE NCO MEANS frequency=10.23 MHz by said CODE NCO MEANS; and outputting under code phase shift operation code phase shift=$(2619-SHIFT)/2500$ sample clocks by said CODE NCO MEANS.

65. The method of claim 42, said RESOLVER MEANS comprising a COUNTER MEANS, a COMPARATOR MEANS, and a FLIP-FLOP MEANS, wherein said step of altering the resulting digital delay further comprises the steps of:

clearing said COUNTER MEANS every millisecond on the edge of MSEC signal;

setting the output state of said FLIP-FLOP MEANS to digital 0 every millisecond on the edge of MSEC signal; and clocking said FLIP-FLOP MEANS by said COMPARATOR MEANS to the output state equal to digital 1 when said COUNTER MEANS reaches a value equal to said COMPARATOR MEANS input value; and repeating said process every millisecond;

wherein said resulting digital delay=(delay 1+$(2500-m)/25000$), m being a controllable mark/space ratio; and wherein said RESOLVER MEANS is used for providing a signal with controllable mark/space ration to toggle between said delay 1 and said delay 2.

66. The method of claim 41; said L1 TRACKER MEANS comprising a MULTIPLEXER MEANS 1, a CARRIER NCO MEANS 1, a CARRIER MIXER MEANS 1, a CODE GENERATOR MEANS, a CODE MIXER MEANS, a CODE NCO MEANS, a CODE MIXER MEANS 2, a DIGITAL DELAY MEANS 1, a DIGITAL FILTER MEANS 1, a RESOLVER MEANS, and a DIGITAL DELAY MEANS 2; said L2 comprising a CARRIER NCO MEANS 2, a CARRIER MIXER MEANS 2, a CODE MIXER MEANS 3, a DIGITAL FILTER MEANS 2, a DIGITAL FILTER MEANS 3, a CODE MIXER MEANS 4, and a block CORRELATORS MEANS 2; wherein said method further comprises the steps of:

locking L1 C/A code tracking loop by said MICROPROCESSOR MEANS;

locking L1 C/A carrier tracking loop by said MICROPROCESSOR MEANS;

computing the L2 carrier frequency aiding term by said MICROPROCESSOR MEANS using the value of L1 frequency;

applying said L2 frequency aiding term to CARRIER NCO MEANS 2; wherein said L1 and L2 satellite signals are separated in time by ionospheric delay;

adjusting said DIGITAL DELAY MEANS 1 and said DIGITAL DELAY MEANS 2 to compensate for the ionospheric delay between said L1 and said L2 signals until power is found in said L2 CORRELATORS MEANS 2;

locking the L2 carrier tracking loop using said MICROPROCESSOR MEANS; and locking the L2 code tracking loop using said MICROPROCESSOR MEANS; whereby the acquisition of the satellite signals L1 and L2 is achieved.

67. The method of claim 66, wherein said method further comprises the steps of:
- reading said L1 CORRELATORS MEANS and said L2 CORRELATORS MEANS by said MICROPROCESSOR MEANS;
- forming the L1 code tracking loop and applying the output to said CODE NCO MEANS;
- forming the L1 carrier tracking loop and applying the output to said CARRIER NCO MEANS 1;
- computing the L2 frequency aiding term;
- forming the L2 code and carrier tracking loop and applying the output to said DIGITAL DELAY MEANS 1, said DIGITAL DELAY MEANS 2, and said CARRIER NCO MEANS 2;
- performing the L1 and L2 carrier phase measurements by reading CARRIER NCO MEANS 1's output phase and CARRIER NCO MEANS 2's output phase at a chosen MSEC reference time;
- performing the L1 and L2 code phase measurements by keeping track in said MICROPROCESSOR MEANS of what shifts have been applied to said CODE NCO MEANS and DIGITAL DELAY MEANS 1 and DIGITAL DELAY MEANS 2 respectively; whereby the tracking of said satellite signals L1 and a L2 is achieved.

68. A system for optimum correlation processing of L1 and L2 signals received from a SPS satellite by a SPS RECEIVING MEANS, said system comprising:
- an n-bit RECEIVING MEANS, n being integer, comprising an n-bit A/D CONVERTER for receiving a known C/A code modulated on L1 carrier frequency, for receiving an unknown Y code-modulated on L1 carrier frequency signal, and for receiving an unknown Y code modulated on L2 carrier frequency signal from at least one satellite; wherein said received L1, and L2 signals contain propagation noise; and wherein said Y code comprises a known P code and an unknown W code; and
- at least one n-bit DIGITAL CHANNEL PROCESSING MEANS for:
  (1) locally generating replica of said C/A code modulated on L1 carrier frequency signal;
  (2) locally generating replica of said P code modulated on L1 carrier frequency signal, wherein said locally generated replica of L1 signal do not contain propagation noise;
  (3) extracting of an estimate of said Y code from said L1 signal, and from said L2 signal, wherein said estimate signals contain propagation noise;
  (4) correlating a locally generated replica of C/A code with the received L1 code for obtaining an estimate of L1 group delay (L1 pseudo-range) and L1 carrier phase;
  (5) removing said P code from said locally extracted estimate of said L1 Y code to obtain a locally extracted estimate of said L1 W code;
  (6) removing said P code from said locally extracted estimate of said L2 Y code to obtain a locally extracted estimate of said L2 W code; and
  (7) correlating said locally extracted estimate of said L1 W code with said locally extracted estimate of said L2 W code to obtain relative offset in group delay between L1 and L2 signals and for obtaining an independent estimate of L2 carrier phase;

wherein using said n-bit RECEIVING MEANS comprising an n-bit A/D CONVERTER and each said n-bit DIGITAL CHANNEL PROCESSING MEANS reduces quantization noise as compared to using a one-bit RECEIVING MEANS comprising a one-bit A/D CONVERTER and a one-bit DIGITAL CHANNEL PROCESSING MEANS.

69. A method for optimum correlation processing of L1 and L2 signals received from a SPS satellite by a correlation processing system; said system comprising an n-bit RECEIVING MEANS and at least one n-bit DIGITAL CHANNEL PROCESSING MEANS, n being an integer; said method comprising the steps of:
- providing said n-bit RECEIVING MEANS comprising an n-bit A/D CONVERTER and each said n-bit DIGITAL CHANNEL PROCESSING MEANS;
- receiving a known C/A code modulated on L1 carrier frequency, an unknown Y code modulated on L1 carrier frequency signal, an unknown Y code modulated on L2 carrier frequency signal by said n-bit RECEIVING MEANS; wherein said received, L1, and L2 signals contain propagation noise; and wherein said Y code comprises a known P code and an unknown W code;
- generating local replica of said C/A code modulated on L1 carrier frequency signal by each said DIGITAL CHANNEL PROCESSING MEANS;
- generating local replica of said P code modulated on L1 carrier frequency signal by each said DIGITAL CHANNEL PROCESSING MEANS; wherein said locally generated replica of L1 signal do not contain propagation noise;
- extracting of an estimate of said Y code from said L1 signal, and from said L2 signal by said DIGITAL CHANNEL PROCESSING MEANS; wherein said estimate signals contain propagation noise;
- correlating a locally generated replica of C/A code with the received L1 code for obtaining an estimate of L1 group delay (L1 pseudo-range) and L1 carrier phase;
- removing said P code from said locally extracted estimate of said L1 Y code by said CHANNEL PROCESSOR to obtain a locally extracted estimate of said L1 W code;
- removing said P code from said locally extracted estimate of said L2 Y code by said CHANNEL PROCESSOR to obtain a locally extracted estimate of said L2 W code; and
- correlating said locally extracted estimate of said L1 W code with said locally extracted estimate of said L2 W code to obtain relative offset in group delay between L1 and L2 signals and for obtaining an independent estimate of L2 carrier phase by said CHANNEL PROCESSOR; wherein using said n-bit RECEIVING MEANS and said n-bit DIGITAL CHANNEL PROCESSING MEANS reduces quantization noise as compared to using a one-bit RECEIVING MEANS and a one-bit DIGITAL CHANNEL PROCESSING MEANS.

* * * * *